(12) United States Patent
Valls Angles

(10) Patent No.: US 11,529,683 B2
(45) Date of Patent: Dec. 20, 2022

(54) METHOD FOR THE OBTAINING COST EFFECTIVE POWDER

(71) Applicant: INNOMAQ 21, S.L., Madrid (ES)

(72) Inventor: Isaac Valls Angles, Rubí (ES)

(73) Assignee: INNOMAQ 21, S.L., Madrid (ES)

(*) Notice: Subject to any disclaimer, the term of this patent is extended or adjusted under 35 U.S.C. 154(b) by 31 days.

(21) Appl. No.: 17/263,117

(22) PCT Filed: Jul. 29, 2019

(86) PCT No.: PCT/EP2019/070379
§ 371 (c)(1),
(2) Date: Jan. 25, 2021

(87) PCT Pub. No.: WO2020/021122
PCT Pub. Date: Jan. 30, 2020

(65) Prior Publication Data
US 2021/0187611 A1 Jun. 24, 2021

(30) Foreign Application Priority Data

Jul. 27, 2018 (ES) .............................. ES201800179
Nov. 30, 2018 (EP) ..................................... 18382878

(51) Int. Cl.
*B22F 9/10* (2006.01)
*B33Y 70/00* (2020.01)
(Continued)

(52) U.S. Cl.
CPC ................ *B22F 9/10* (2013.01); *B22F 1/052* (2022.01); *B22F 1/065* (2022.01); *B22F 9/082* (2013.01);
(Continued)

(58) Field of Classification Search
CPC .. B22F 9/10; B22F 1/052; B22F 1/065; B22F 9/082; B22F 2009/0844; B22F 2201/20;
(Continued)

(56) References Cited

U.S. PATENT DOCUMENTS 2,305,172 A  12/1942 Otto
2,356,599 A  8/1944 Landgraf
(Continued)

FOREIGN PATENT DOCUMENTS

GB            2 111 536 A       7/1983
WO  PCT/EP2015/051632         1/2015
WO       2015/110668 A2        7/2015

OTHER PUBLICATIONS

T.A. Harris, Friction and Wear of Rolling-Element Bearings, Friction, Lubrication, and Wear Technology, vol. 18, ASM Handbook, ASM International, 1992, p. 499-514. (Year: 1992).*

(Continued)

*Primary Examiner* — Anthony J Zimmer
*Assistant Examiner* — Nazmun Nahar Shams
(74) *Attorney, Agent, or Firm* — Ladas & Parry LLP

(57) ABSTRACT

A production method of particulate materials, through centrifugal atomization (CA) is disclosed. The method is suitable for obtaining fine spherical powders with exceptional morphological quality and extremely low content, or even absence, of nonspherical shape particles and internal voids. An appropriate cost effective method for industrial scale production of metal alloy, intermetallic, metal matrix composite or metal-like material powders in large batches is also disclosed. The atomization technique can be extended to other than the centrifugal atomization with rotating element techniques.

20 Claims, 3 Drawing Sheets

(51) Int. Cl.
*B22F 9/08* (2006.01)
*B22F 1/052* (2022.01)
*B22F 1/065* (2022.01)

(52) U.S. Cl.
CPC ....... *B33Y 70/00* (2014.12); *B22F 2009/0844* (2013.01); *B22F 2201/20* (2013.01); *B22F 2202/17* (2013.01); *B22F 2304/10* (2013.01)

(58) Field of Classification Search
CPC .... B22F 2202/17; B22F 2304/10; B22F 9/12; B22F 2009/086; B33Y 70/00
See application file for complete search history.

(56) References Cited

U.S. PATENT DOCUMENTS

| | | | |
|---|---|---|---|
| 4,069,045 A | 1/1978 | Lundgren | |
| 4,078,873 A | 3/1978 | Holiday et al. | |
| 4,343,750 A | 8/1982 | Holiday et al. | |
| 4,374,074 A | 2/1983 | Ueda et al. | |
| 4,629,407 A * | 12/1986 | Amlinger | B22F 9/082 425/7 |
| 4,731,517 A | 3/1988 | Cheney | |
| 5,540,575 A * | 7/1996 | Takano | F16C 33/3806 384/613 |
| 2002/0094297 A1 | 7/2002 | Satoh et al. | |

OTHER PUBLICATIONS

H Jones and M H Burden 1971 J. Phys. E: Sci. Instrum. 4 671 (Year: 1971).*
ISR_for_International_Application_PCT/EP2019/070379.
Written Opinion_for_International_Application_PCT/EP2019/070379.

* cited by examiner

METHOD FOR THE OBTAINING COST EFFECTIVE POWDER

RELATED APPLICATION

This application is an application under 35 U.S.C. 371 of International Application No. PCT/EP2019/070379 filed on 29 Jul. 2019, which claims the benefit of Spanish Application No.: P201800179 filed 27 Jul. 2018 and EP Applications No.: 18382878.9 filed 30 Nov. 2018, the disclosures of which are incorporated in their entirety by reference herein.

FIELD OF THE INVENTION

The present invention relates to a method for producing metal-based alloy powders, or particulate materials, by means of centrifugal atomization; principally through the rotating disk atomization technique. The method disclosed is designed for making rapidly solidified metallic powders. Amongst others, the invention allows the production of fine and very fine highly spherical powders with narrow particle size distribution in a cost effective way. Moreover the method disclosed permits to obtain spherical powder or particulate material with extremely low content, or even absence of non-spherical-shape particles mixed within (sausage shape, tear shape, ellipsoid shape, broken sphere shape) and other non-spherical shapes mixed within, and also extremely low content or even absence of voids within the spheres and hollow spheres, which was until now unavoidable for centrifugal atomization of very fine powder. The method disclosed also enables the production of powders of very challenging alloys through atomization (very high melting point, alloys containing elements which strongly react with oxygen, etc).

SUMMARY

Atomization is the dominant method for producing metal and pre-alloyed powders from solder low melting point alloys, aluminum, copper, iron, low-alloy steels, stainless steels, tool steels, titanium and superalloys, among others. Although there is a great diversity of methods, processes and techniques of atomization, particularly water and gas atomization have continued to dominate the production of high melting point metallic powders. Both techniques are relatively simple to implement but with lower energy efficiency, in addition to the well-known features of the produced powder; e.g. irregular shape, low surface quality, relative high internal porosity, relative wide particle size distributions (high geometric standard deviation $\sigma_g$, around 2.0-2.3), etc. Also those techniques present further challenges when trying to obtain powders containing elements that strongly react with oxygen like is the case for example of lithium and scandium amongst others. Even when very high purity gas is employed for the atomization with the associated cost increase a high loss of such reactive elements occurs, and while lithium is quite expensive, scandium even much more. For an aluminum alloy containing around 0.5% by weight scandium, it is quite common having to add four times as much scandium in the melt pool, which can represent a cost increase in the metal powder of even 60 €/kg just due to the loss of this alloying element. In the case of lithium, magnesium-lithium alloys with lithium contents above 10% by weight are just about impossible to process. On the other hand, other techniques, such as the centrifugal atomization (CA) exhibits, under certain process conditions, a higher energy efficiency. However, such type of processes are often technically more complex than the previous aforementioned techniques. And when managed, a high quality powder can be obtained with a small fraction of non-spherical irregular particles, which increases when trying to manufacture smaller particles, and which in many cases is impossible to be separated, especially when very fine powders are involved. Despite often being a small fraction, this non-spherical particles often jeopardize the usability of the whole powder due to their presence for many applications.

There are two principal types of centrifugal atomization: rotating electrode and rotating disk. Rotating electrode centrifugal atomization consists of having an electrode of the metal, alloy, intermetallic or metal matrix composite to be produced, rotating at very high speed and melted on its tip by a high power laser, electron beam or concentrated plasma. The centrifugal melt atomization of metals in a rotating element is a liquid metal-fed physical method to produce powders, where a liquid stream of molten metal (also referred as liquid metal) is poured onto a rotating disk or similar and it is broken and dispersed, under the action of centrifugal forces, into a fine powder particulate matters that subsequently solidify in contact with the atmosphere.

Rotating electrode with plasma, electron beam or laser melting, is a technique which has been stablished for the production of very high quality spherical powders, but the existing solutions are very cost intensive.

The centrifugal melt atomization of metals in a rotating element has been stablished for the production of not so fine low melting point solder alloys.

In PCT/EP2015/051632, a method is described for the centrifugal atomization with rotating disk, leading to the successful atomization of some difficult alloys, and even some fine powders of those and other alloys, but the application is silent about taking any special measures to get rid of the small fraction of non-spherical powders that occur in all centrifugal atomization methods unless very specific measures are taken to counteract this effect.

Traditionally, tool steel powders are produced by gas or water atomization methods. In general terms, water atomized tool steel powders exhibit irregular shaped particles and are suitable for die compaction and sintering to higher theoretical density. Although gas atomized tool steel powders exhibit spherical or near-spherical particles with high apparent densities, which thus may requires hot or cold isostatic pressing consolidation. The key factor of powder metallurgy of tool steels is based mainly on the uniform microstructure that can be obtained, compared to forged and conventionally produced products, and the higher homogeneity in its chemical composition. This situation, for example, leads to excellent values of toughness and less distortion during heat treatment, redounding in an increase of the tool service life. The same can be said for most metal alloy powders, although recently some systems based on the direct reduction of titanium oxide powders are being developed.

Because the general concept for centrifugal atomization with a rotating element was developed a long time back, and since many different scientific teams have been dealing with the technology in different places and different moments in time, it is generally accepted by the scientific community that this technology has some unavoidable physical limitations that provide little hope to further extend its usage beyond the present state of utilization for the production of rather coarse low melting point metallic, or metallic-like powders.

The two major limitations of the technique based on the well studied physical principles of operation are the exponential relation between the mean particle size attainable and the rotating speed of the rotating element breaking the liquid. Thus at low rotating speeds a small rotating speed increment induces a great reduction in the mean particle size of the atomized powder. But this effect becomes smaller and smaller until extreme high rotating speed increments are required for an irrelevant decrease in the particle size (FIG. 1), in fact taking into account the probable rotating speeds attainable in the next 20 years there is a minimum theoretically attainable size with this technology which does depend on the chemistry of the powder being produced. In fact if the attainable rotating speed in the next 20 years would be 10 times higher than expected, this would lead to almost no change in the minimum attainable mean particle size with this technology.

Mean particle size and particle size distribution amplitude are extremely important, since they make the difference to the technology being a rarity which looks well in scientific congresses to a technology which can possibly be implemented in an industrial way. This is so because of the direct extreme impact of these two factors in the production cost of the manufactured powder. One can attain fine or even very fine powder with a high mean particle size and a very broad particle size distribution, but then only a very small fraction of the produced powder is fine, and thus its cost is very high, making it only usable for scientific research. On the other hand a technology providing a fine or very fine mean particle size and a narrow particle size distribution leads to most of the powder being atomized being fine.

The other main limitation of the technology concerns the production of higher melting point alloys. In fact, powders of alloys with a melting point above 700 K have been produced at laboratory scale with the consciousness that the solutions are not scalable at industrial scale. Even powders with melting points above 1300 K or even Ni, Ti and Fe based alloys have been atomized at laboratory scale but in this case even at the laboratory scale only very small quantities can be atomized so the industrial scalability of the technique is far more illusory. It is known that when attempting larger production lots the morphological quality of the obtained powder decreases. Alloys containing elements with high reactivity to oxygen are even more challenging and rather utopic.

In summary, the challenge addressed by this invention is double, since the limitations of centrifugal atomization with a rotating element are twofold:

- the possibility of producing extremely fine powders,
- and the possibility of producing highly reactive and difficult alloys, in both cases with the following technical effect: to obtain spherical powder or particulate material with very low content of sausages, tear shapes, and other non-spherical shapes mixed within, and also with extremely low content or absence of voids and hollow spheres, which is always the case for centrifugal atomization of very fine powder, one of the big challenges is to attain that at industrial level with practicable associated costs and without the known morphological quality decay. The inventor has found that in some applications, the disclosed method is suitable for obtaining surprisingly narrow particle size distributions of fine and spherical powders with exceptional morphological qualities. Furthermore, the disclosed method is suitable for producing powders with a higher metallic tone, which is preferred in some applications by the end users. The powder production method disclosed is also suitable for particulate materials production with practically total absence of particles containing a thick oxide crust and with exceptional low or nule internal voids. The inventor has also found that in some applications the method disclosed in this document allows the production of fine powder at surprisingly lower cost than observed in the methods disclosed in the state of the art. The ability of a powder to flow is a direct function of interparticle friction. The method disclosed it is also suitable for obtaining particle size distributions of fine and spherical powders with exceptional flowability properties. In addition, when following the method disclosed the levels of micro-segregation of the atomized powders are surprisingly lower than expected.

With great surprise the inventor has found that in the case of attainable mean particle size through big batch centrifugal atomization with a rotating element the existing models, as often the case, are incomplete but very surprisingly they ignore a combination of variables that seems to be more relevant that almost all other variables which are being taken into account in the models. The inventor has found a way to obtain powder even much finer than in PCT/EP2015/051632 and even more important with the practical absence of small fractions of non-spherical and/or void powder, which for such fine powder fractions is very important to limit given the high difficulty to separate and the annoyance they represent in certain applications. The combination of variables leading to the solution of the problem came about out of despair, after having tried all rational choices, when conducting tests with random combination of process variables and being lucky at it.

STATE OF THE ART

In the following paragraphs the state of the art of atomization and relevant aspects of it will be briefly revised, although excellent comprehensive literature reviews on the subject exist [Metal Powder Industry, ISBN-13: 978-187895415, 1992; Oxford University Press, ISBN-13: 978-0198562580, 1994; ASM International, ISBN-13: 978-0871703873, 1998; Metal Powder Industry, ISBN-13: 978-0976205715, 2005]. Melt atomization is the transformation of a bulk liquid into a spray of liquid droplets in a surrounding atmosphere. The bulk liquid is formed by melting a substance which is a solid at normal conditions of pressure and temperature (20° C. and 1 atm) and the end-product, after atomization stage and subsequent cooling, is a powder. Metal atomization is the most common method that allows the production of metallic powder over a wide range of compositions and particle sizes. Centrifugal melt atomization with a rotation element (also known as spinning disk, spinning cup or rotating atomization) is defined as the liquid metal-fed physical method to obtain powders where a liquid stream of molten metal is poured on a spinning disk (SDA) or similar and it is dispersed, under the action of centrifugal forces exerted by the rotating mean, into a spray of droplets, flakes or ribbons that subsequently solidify in contact with the atmosphere [ASM International, ISBN-13: 978-0871703873, pp. 35-52, 1998].

In FIG. 1 one can see that the attainable mean particle size depends on the material being processed and also the rotation speed of the atomization element amongst others, but as can be seen the dependence with speed is exponential and presents a saturation effect. Hydraulic height, quantity of material processed per unit time and other variables also play a role, but their contribution to particle size is almost negligible to the two variables depicted (nature of atomized liquid and rotation speed) especially when they are kept at levels in which an industrial production makes sense. From this picture, it is clear that cost effective production of fine and very fine powders through the centrifugal atomization method with a rotation element can be disregarded. Also, centrifugal atomization of very spherical powders always comes along with a small to medium fraction of non-spherical powder which for fine, medium or coarse powders is not given too much importance because it can be separated, therefore only contributing negatively to the yield, but for very fine powders, the separation becomes extremely difficult or even impossible, but since such extremely fine powders are theoretically not possibly achieved through centrifugal atomization (see FIG. 1) not too much thought is devoted to this fraction and very often not even mentioned. US 2002/0094297 Describes the description of powders for small laboratory batches. The disk is directly refrigerated by water (quenching disk) and the minimum particle size attainable is 177 microns. It does not attain spherical powder and is silent about the methods used to eliminate sausage shape particles, satellites, splat, and other non-spherical particles and also voids in particles and hollow particles. Among many other things it does not describe how pressure has to be controlled as a function of rotating speed of the disk.

U.S. Pat. No. 4,374,074 Method for the production of rather coarse fibers and particles (around 400 microns—as can also be seen in the attainable sizes graphic for spherical particles) of typical foundry disregarded products like: blast furnace slag, steel shot and molten flux. Method without any protuberance on the disk is silent about the methods used to eliminate sausage shape particles, satellites, splat, and other non-spherical particles and also voids in particles and hollow particles. Among many other things it does not describe how pressure has to be controlled as a function of rotating speed of the disk. The rotation speed of the disk is quite restricted when processing high temperature materials.

U.S. Pat. No. 2,356,599 Method for producing metal powder through comminuting with some blades in a rotation disk to break down material. It does not attain spherical powder and is silent about the methods used to eliminate sausage shape particles, satellites, splat, and other non-spherical particles and also voids in particles and hollow particles. Among many other things it does not describe how pressure has to be controlled as a function of rotating speed of the disk. It uses a refrigeration liquid which comes in direct contact with the comminuted material.

U.S. Pat. No. 4,731,517 Method for the production of fine spherical powder. The disk does not contain protuberances. It is silent about the methods used to eliminate sausage shape particles, satellites, splat, and other non-spherical particles and also voids in particles and hollow particles. It provides some pictures of the obtained powder.

U.S. Pat. No. 2,305,172. Method for producing rather coarse metal powder (around 300 microns) through comminuting with some blades in a rotation disk to break down material. It does not attain spherical powder and is silent about the methods used to eliminate sausage shape particles, satellites, splat, and other non-spherical particles and also voids in particles and hollow particles. Among many other things it does not describe how pressure has to be controlled as a function of rotating speed of the disk. It uses a refrigeration liquid to cool down the disk.

In PCT/EP2015/051632 a method for the production of fine powders through centrifugal atomization with high production rates and even high melting point alloys is disclosed. But PCT/EP2015/051632 does not teach how to obtain very fine powders with extremely low fraction or even absence of non-spherical particles. It does also not teach how to produce very fine powders of alloys containing elements very reactive to oxygen.

However, when the centrifugal atomization with a rotating element technique is applied to higher melting point metals, it is difficult to operate at industrial conditions. Also, the premature solidification of liquid (skull) on the rotating element and the problems of out-of-balance forces, erosion, thermal fatigue and compatibility of materials result in an extremely short live and thus heavy maintenance costs of the rotating disk assembly, so that the method is only envisaged as laboratory scale for demonstration purposes and always associated to the production of very small batches. To try to overcome this many solutions involve water cooling, but this has not only an effect on the morphology of the powder but also on the surface oxidation which is not acceptable for most applications intended for very fine powders with little or no non-spherical fraction, and even much less plausible for alloys with phases or elements that strongly react with oxygen. One known example to this is the rapid solidification rate process (RSR), developed by Pratt & Whitney-United Technologies (U.S. Pat. Nos. 4,078,873A and 4,343,750 A) for making superalloy powders, this technique is one of the most recognized technique of centrifugal atomization with rotating element for high melting point alloys. In order to overcome the handling issues of high melting point and aggressive alloys, the process employs a high-speed water-cooled rotating disk combined with a high flow helium gas which is kept pressurized outside the chamber and allowed to expand and the undercool when entering the chamber to increase the solidification rates of the powder. The largest RSR facilities can handle batches up to 900 kg with a spray chamber of about 5 m in diameter and a closed-loop helium recirculation system. The production rate reaches up to 1100 kg/h for Ni-based superalloys. In this case, also the use of high volumes of helium is another drawback due to its marked contribution in the cost. The biggest drawback of all is the need to use water cooling for the disk which has a marked negative impact on the powder quality for many alloy systems. As a result of these disadvantages, water and gas atomization have continued to dominate the production of high melting point metallic powders.

Surprisingly enough, and from a technical standpoint, the centrifugal atomization with a rotating element technique is not progressing as quickly as expected as a consequence of the high cost of the produced powder and it is possible that the very limited success of this kind of technique, applied to the high melting point materials, is due to technical and economic difficulties related to the quality and properties of the obtained powders; such as morphology, surface quality, microstructure (at different levels; e.g. nano and femto), small production volumes, productivity ratios (yield), costs, etc. Especially also for the production of very fine powders, probably due to the conclusions drawn from the existing models depicted in FIG. 1.

Atomization of melts has many applications and advantages for metal powder production and the main difficulty in the development of the technics was the lack of appropriate materials and methods for handling molten metals. At the same time, some of the most attractive benefits are the high degree of flexibility in alloying, the control of impurities and the homogeneity of the chemical composition provoking that pre-alloyed powders can only be produced by this mean. Several atomization techniques have been developed for producing metallic powder and pre-alloyed powder from ferrous and non-ferrous alloys. Some of these techniques have been extensively developed and applied to large scale production (more than 95% of atomization capacity worldwide), including two-fluid atomization, e.g. gas atomization, water atomization and oil atomization, vacuum atomization and rotating electrode atomization.

Finally it should be noted that centrifugal or rotating atomization methods are by far more energy efficient than water or gas atomization and also leads to a much narrower particle size distribution with a geometric standard deviation ranging between 1.2 and 1.4. This technique can operate at high cooling rates, up to $1.0 \cdot 10^{5 \circ}$ C./s. In a simple model, droplet formation involves a force balance between the acceleration force, due to rotation, and liquid surface tension force. Accordingly, it is well established that the mean diameter of centrifugal atomized particles ($D_{50}$) is predominantly controlled by the angular velocity, the diameter of the rotating element, the metal surface tension/density ratio, the molten metal feed rate and viscosity; in decreasing order of importance.

Notwithstanding the above-mentioned advantages, centrifugal atomization and especially centrifugal disk atomization, is not extensively used on an industrial scale for powder production due to some technical limitations. Several researchers claim that the realization of the full potential of centrifugal atomization for industrial applications is also prohibited by the lack of in-depth scientific understanding of the process and reliable designs [Modelling Simul. Mater. Sci. Eng. Vol. 12, pp. 959-971, 2004, Powder Metall., Vol. 47, pp. 168-172, 2004; Proc. of Int. Conf. on Spray Deposition and Melt Forming, Bremen Universität, pp. 1-6, 2006].

The change from one technique to another technique of atomization not only causes an evident change in morphology, surface quality, particle size distribution, and even composition of the obtained powder, also promotes a noticeable and marked difference in the powder microstructural characteristics. It is well established that microstructural features in atomized powders are controlled by the relationship between the solidification rate, the thermal gradient and the cooling rate, also influenced by the operating conditions of the process and the physical properties of the metal to atomize. The formation of the resulting microstructure (planar, cellular, dendritic or dendritic-like microstructures) strongly depends on the combination of these variables, and others less well understood.

PCT/EP2015/051632 oversees some of the required conditions for the obtaining of fine and very fine powders. It also oversees some combination of characteristics required for the obtaining of powders with extremely small or even absence of fraction of non-spherical powders, which is again very critical for some applications of very fine powders (like is the case of Additive Manufacturing amongst others). Furthermore it provides not insight for the obtaining of challenging atomized powders due to their low melting point, lightness and/or extreme reactivity. The document is also silent about some presented solutions in the present document about the rotating element system and the liquid atmosphere purposeful interaction.

However, and contrary to what has been observed and mentioned, the present inventor has found that, taking certain precautions, the centrifugal atomization with a rotating element technique can be made suitable for the mass production of fine and very fine powders as well as the mass production of powders of materials with very low melting point or high reactivity and can also be turned into the most cost effective and environmentally friendly the steel powders and saving a large amount of energy. Even more surprisingly, it is possible to clearly surpass the theoretical limit of minimum size of powder for the technology and most important doing so with an extremely low amount or even absence of powder fraction which is not spherical.

DETAILED DESCRIPTION OF THE INVENTION

Figure 1:
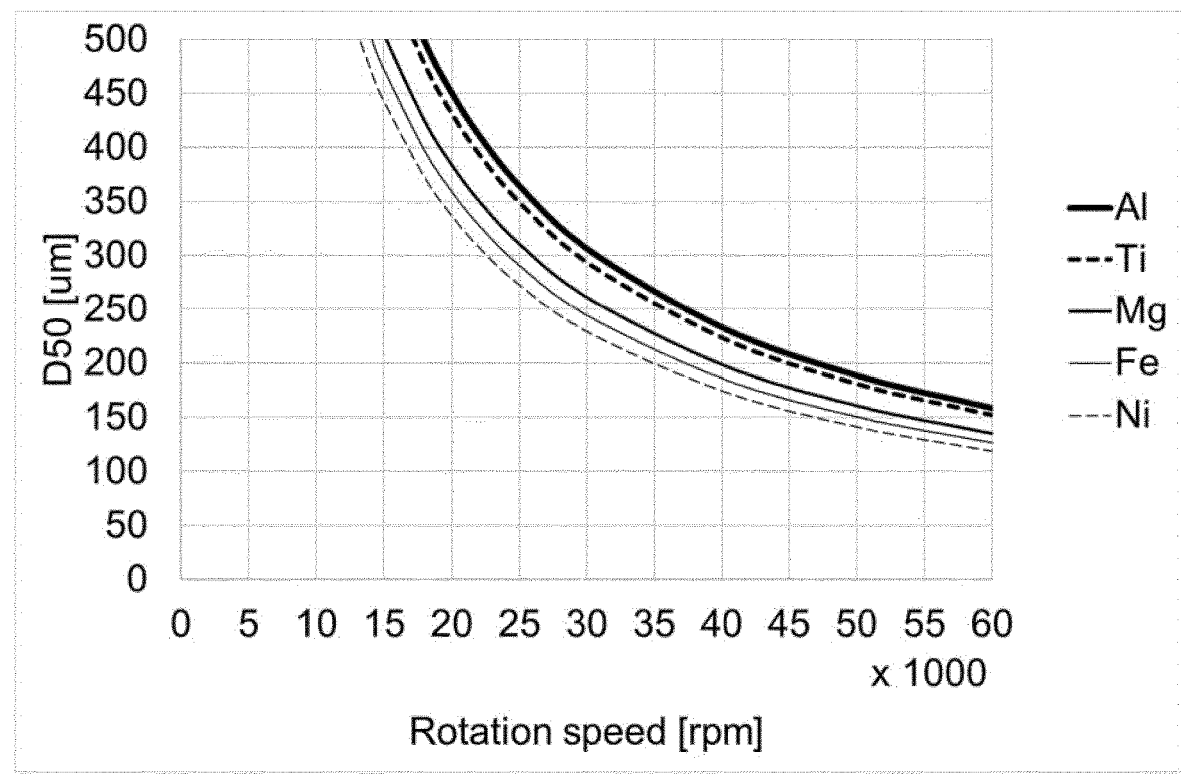
FIG. 1: Effect of angular rotation speed on particle size for the centrifugal atomization of different pure metals. Example of the influence of physical properties (surface tension, density, etc.) of molten metal on the particle size for identical processing conditions.

In an embodiment, the inventor has found that very fine spherical powders or particulate materials of metal-based alloys can be obtained using centrifugal atomization in an atomization chamber comprising an atomizing rotating element (also referred in some embodiments as spinning, spinning disk, spinning disk atomizer, atomizing disk, rotating element, rotating disk or disk).

In one aspect, the method for producing metal-based alloy powders or particulate material by means of centrifugal atomization in a closed chamber comprises the steps of:
a) providing a composition comprising at least one metal,
b) melting the composition, and
c) atomizing the molten composition by means of centrifugal atomization or rotating atomization.

In some embodiments, the atmosphere in the closed atomization chamber is pressurized and/or cooled.

The inventor has found that to obtain very fine spherical powders through centrifugal atomization with an extremely low fraction of non-spherical powder, or even absence of it, and with also a very small fraction or even absence of spherical powder particles containing voids and/or hollow spheres, the right combination of processing parameters has to be employed, at very surprising values. The inventor has also surprisingly found that an atomization chamber with pressurized gas above atmospheric pressure can be employed to obtain highly spherical, non-deformed particles provided some considerations are made regarding metal flow into the disk, metal over-heating (superheating) temperature, disk nature, disk geometry, material being atomized, chamber atmosphere and disk speed (not all of them have to be taken at the same time, it suffices for some applications when only a few of the aforementioned are taken into account).

For some applications, it is sufficient to have the proper combination of rotating speed of the disk, effective diameter of the disk and pressure of the atmosphere in the atomization chamber. In an embodiment, the inventor has found that taking into account parameter PA1:

$$PA1 = \rho * N^2 * d^2 \text{ where:}$$

$\rho$—is the density of the atomized liquid at the melting point under 1 bar absolute pressure measured in kilograms per cubic meter [kg/m$^3$]; N—is the rotating speed of the disk in radians per second [rad/s]; and d—is the diameter of the disk in meters [m]. The units of parameter PA1 are kilograms per meter and second square [kg/(m·s$^2$)] which is equivalent to Pascal [Pa]. In an embodiment, the atomized liquid refers to the molten composition to be atomized in step c). Now taking constants K1 and K2 which depend on the material being processed and the nature of the atmosphere in the chamber, and being P—the absolute pressure in the atomization chamber in Pascal [Pa], the inventor has defined two critical parameters, namely PA2 and PA3 defined as:

$$PA2 = K1 * PA1 + K2 * P;$$

$$PA3 = PA1/P$$

For some applications, generalized values (the same for all types of alloys atomized) can be taken. In an embodiment, for aluminum-based alloys K1=0.01 and K2=20. In an embodiment, for magnesium-based alloys K1=0.015 and K2=22. In an embodiment, for iron-based alloys K1=0.0033 and K2=20. In an embodiment, for nickel, copper or cobalt-based alloys K1=0.0033 and K2=21. In an embodiment, for any kind of alloy K1=0.0033 and K2=22. In an embodiment, for titanium-based alloys K1=0.006 and K2=20. K1 and K2 have the appropriate units for PA2 to be dimensionless (1/Pa). For PA2 it has been found that the right value is required while for PA3 it suffices that the value is small enough. In an embodiment, PA2 is bigger than 4500000. In another embodiment, PA2 is bigger than 5000000. In another embodiment, PA2 is bigger than 6000000. In another embodiment, PA2 is bigger than 7000000. In an embodiment, PA2 is smaller than 70000000. In another embodiment, PA2 is smaller than 40000000. In another embodiment, PA2 is smaller than 30000000. In another embodiment, PA2 is smaller than 20000000. In an embodiment, PA3 is smaller than 10000. In another embodiment, PA3 is smaller than 7000. In another embodiment, PA3 is smaller than 6000. In another embodiment, PA3 is smaller than 5000. In another embodiment, PA3 is smaller than 1000. All the embodiments disclosed above may be combined in any combination provided they are not mutually exclusive, for example: PA2 bigger than 4500000 and smaller than 70000000 or PA2 bigger than 4500000 and smaller than 40000000 or PA2 bigger than 4500000 and smaller than 30000000 among other embodiment combinations. The inventor has found that in some applications, when the right combination of processing parameters is employed, surprisingly narrow particle size distributions of fine and spherical powders with exceptional morphological qualities can be obtained. Furthermore, the produced powders have a higher metallic tone, which is preferred by the end users in some applications. The powder can also be produced with practically total absence of particles containing a thick oxide crust and with exceptional low or nule internal voids. The inventor has also found that the right combination of processing parameters allows the production of fine powder at surprisingly lower cost than observed in the methods disclosed in the state of the art. In some applications, the right combination of processing parameters also allows for obtaining particle size distributions of fine and spherical powders with exceptional flowability properties. In some applications, when the right combination of processing parameters is employed the levels of micro-segregation of the atomized powders are surprisingly lower than expected. In addition to the right values of PA2 and PA3 the inventor has found that in some embodiments, a pressurized chamber is preferred. In some applications, pressures above the atmospheric are particularly interesting to contribute to the desired morphology. The inventor has found that in some embodiments, undercooling must be avoided to preserve the morphological quality of the powder or particulate material produced and therefore special measures have to be taken to make sure that pressurization of the chamber does not lead to undercooling, by for example choosing the preferred values of PA2 and PA3. In an embodiment, an overpressure of at least 0.12 bar over the atmospheric pressure is preferred. In an embodiment, the absolute pressure in the atomization chamber is above 1.2 bar. In another embodiment, the absolute pressure in the atomization chamber is above 1.6 bar. In another embodiment, the absolute pressure in the atomization chamber is above 2.4 bar. In another embodiment, the absolute pressure in the atomization chamber is above 2.6 bar. In another embodiment, the absolute pressure in the atomization chamber is above 2.8 bar. In another embodiment, the absolute pressure in the atomization chamber is above 3.1 bar. In another embodiment, the absolute pressure in the atomization chamber is above 4.3 bar. In another embodiment, the absolute pressure in the atomization chamber is above 5.7 bar. In some applications, even higher levels of absolute pressure in the atomization chamber are preferred. In an embodiment, the absolute pressure in the atomization chamber is above 6.1 bar. In another embodiment, the absolute pressure in the atomization chamber is above 7.3 bar. In another embodiment, the absolute pressure in the atomization chamber is above 8.2 bar. In another embodiment, the absolute pressure in the atomization chamber is above 9.1 bar. In another embodiment, the absolute pressure in the atomization chamber is above 9.8 bar. In some particular applications, depending on the alloy to be atomized and the morphology of the powder or particulate material, atomization might be performed at atmospheric pressure or even below atmospheric pressure. In an embodiment, the absolute pressure in the atomization chamber is above 0.001 bar. In another embodiment, the absolute pressure in the atomization chamber is above 0.1 bar. In another embodiment, the absolute pressure in the atomization chamber is above 0.26 bar. In another embodiment, the absolute pressure in the atomization chamber is above 0.52 bar. In another embodiment, the absolute pressure in the atomization chamber is above 0.92 bar. Instead in other applications, the inventor has found that the above disclosed values of PA2 and PA3 can be reached when the pressure in the atomization chamber is maintained bellow certain values. In an embodiment, the absolute pressure in the atomization chamber is below 999.4 bar. In another embodiment, the absolute pressure in the atomization chamber is below 99.2 bar. In another embodiment, the absolute pressure in the atomization chamber is below 29.6 bar. In another embodiment, the absolute pressure in the atomization chamber is below 19.2 bar. In another embodiment, the absolute pressure in the atomization chamber is below 14.3 bar. In another embodiment, the absolute pressure in the atomization chamber is below 9.4 bar. In some applications, even lower levels of absolute pressure in the atomization chamber are preferred. In an embodiment, the absolute pressure in the atomization chamber is below 6.1 bar. In another embodiment, the absolute pressure in the atomization chamber is below 4.2 bar. In another embodiment, the absolute pressure in the atomization chamber is below 2.9 bar. In another embodiment, the absolute pressure in the atomization chamber is below 1.4 bar. In another embodiment, the absolute pressure in the atomization chamber is below 1.2 bar. All the embodiments disclosed above may be combined in any combination provided they are not mutually exclusive, for example: an absolute pressure in the atomization chamber above 1.2 bar and below 999.4 bar or an absolute pressure in the atomization chamber above 2.6 bar and below 29.6 bar or an absolute pressure in the atomization chamber above 2.8 bar and below 19.2 bar among other embodiment combinations. For some particular applications, the inventor has found that in some embodiments, the composition to be atomized (the composition provided in step a) is preferably melted and over-heated. In an embodiment, the composition to be atomized is over-heated at a temperature at least 10° C. above the melting temperature of such composition. In another embodiment, the composition to be atomized is over-heated at a temperature at least 52° C. above the melting temperature of such composition. In another embodiment, the composition to be atomized is over-heated at a temperature at least 106° C. above the melting temperature of such composition. In another embodiment, the composition to be atomized is over-heated at a temperature at least 159° C. above the melting temperature of such composition. In another embodiment, the composition to be atomized is over-heated at a temperature at least 212° C. above the melting temperature of such composition. In another embodiment, the composition to be atomized is over-heated at a temperature at least 256° C. above the melting temperature of such composition. In another embodiment, the composition to be atomized is over-heated at a temperature at least 306° C. above the melting temperature of such composition. For other applications, a low over-heating of the composition to be atomized is preferred. In an embodiment, the over-heating is below 396° C.+Tm, wherein Tm is the melting temperature of the composition to be atomized in degree Celsius (° C.). In another embodiment, the over-heating is below 294° C.+Tm, wherein Tm is the melting temperature of the composition to be atomized in degree Celsius (° C.). In another embodiment, the over-heating is below 144° C.+Tm, wherein Tm is the melting temperature of the composition to be atomized in degree Celsius (° C.). In another embodiment, the over-heating is below 96° C.+Tm, wherein Tm is the melting temperature of the composition to be atomized in degree Celsius (° C.). In another embodiment, the over-heating is below 47° C.+Tm, wherein Tm is the melting temperature of the composition to be atomized in degree Celsius (° C.). The melting temperature, refers to the absolute temperature where the first liquid is formed under equilibrium conditions. In an embodiment, the composition to be atomized is the composition provided in step a).

The surface tension is an intrinsic property, and thus can only be measured incorrectly to deliver different results upon different measures. The technology employed to measure an intrinsic property does not really matter as long as the measurement is done in a correct way. In the case of wetting angle and surface tension, in an embodiment, for convenience reasons both are measured in the same setup by means of the sessile drop method. In an embodiment, the contact angle to determine wettability is measured according to ISIJ Int., 55(2015), starting page: 1642 (by C. J. Xuan, H. Shibata, Z. Zhao, P. G. Jönsson and K. Nakajima). In another alternative embodiment, surface tension can be calculated using the profile fitting method as described in: Surface Tension, Part II: The measurement of Surface Tension; in Surface and Colloid Science, vol 1, edited by E. Matijevic, Clarkson College of Technology, NY, (1969) starting page 108 (by J. F. Paddy). In another alternative embodiment, the Bashforth and Adams equation can be used. The type of alloy and the type of substrate during the measurement have to match those being used in the application, the substrate should match the disk material and the molten metal, the alloy which is going to be atomized. In an embodiment, the roughness of the substrate (Ra) for the measurement matches the mean roughness of the surface of the disk that is in contact with the molten metal when the disk is new. In an embodiment, the roughness of the substrate is controlled to Ra=5 microns. In an embodiment, the temperature is chosen to be 20 K above the liquidus temperature. In an alternative embodiment, the temperature of the test is chosen to be the liquidus temperature. The liquidus temperature is the absolute temperature above which a material is completely liquid. In an embodiment, the cooling rate after the maintenance period is chosen to be 20 K/min. In an embodiment, the oxygen partial pressure in the inlet is chosen to be $10^{-20}$ atmospheres. In an embodiment, the mean oxygen partial pressure in the measuring chamber during the measurement is $10^{-21}$ atmospheres. In an embodiment, the measurements are made under 99.999 Ar atmosphere. In an embodiment, the measurements are made under a $10^{-8}$ bar vacuum. In an embodiment, the measurements are made in an atmosphere with 99.99 Hz. In most embodiments, the value that should be employed is the stabilized value. In an embodiment, the stabilized value (it applies to both contact angle and surface tension) is the value after 500 seconds counting from the instant of full melting. For some embodiments, the stabilized values is the first measurement obtained which suffers a variation smaller than the threshold (in the case of contact angle, the threshold is 1 degree, and in the case of surface tension, the threshold is 50 mN/m) within the following 100 seconds after its recording. For some embodiments, the value that should be used is the initial value within 2 seconds upon full melting.

For some applications generalized rules (in the sense that they are applicable to all alloys that can be atomized) for the contact angle and surface tension can be employed. Other applications require a particularized rule for every base of the alloy being atomized. Additionally, quite often (but with a few applications as an exception), the surface tension and contact angle rules do not work as standalone and have to be used together with other rules of this document for the problem to be solved. In a few embodiments, the surface tension and contact angle rules have to be employed together with the parameters taking into account chamber pressure and rotating speed of the disk. In an embodiment, the surface tension and contact angle rules have to be employed together with the chemical composition restrictions for the alloy being melt.

In an embodiment, the inventor has found that the methods disclosed in this document are particularly suitable to produce aluminum-based alloys in powder or particulate form. In an embodiment, the composition comprising at least one metal provided in step a) refers to a composition comprising an aluminum-based alloy. In the case of aluminum and aluminum-based alloys it has been found, that many physical and mechanical properties seem to be determinant at the possibility of a certain material to be a good disk material candidate, like thermal expansion coefficient, thermal conductivity, fracture toughness, density, mechanical strength to mention just a few. Some of the nominal properties tend to deteriorate, and often very strongly in the presence of the molten alloy processed, which is of outmost importance due to the required durability on the disk for the process to be economically viable. It should also not be forgotten that the mechanical loading on the disk is very exceptional and not comparable to any other piece in the existing melting processes. Surprisingly, it has been found, that looking at some rules applying to properties, that are prone to change in the presence of the molten metal, seem to work under certain processing conditions. For some applications, it has been found that it suffices to assure that the contact angle is within certain values defined by a maximum value and a minimum value. In an embodiment, the maximum value for the contact angle should be 168°. In another embodiment, the maximum value for the contact angle should be 158°. In another embodiment, the maximum value for the contact angle should be 148°. In another embodiment, the maximum value for the contact angle should be 138°. In an embodiment, the minimum value for the contact angle should be 76°. In another embodiment, the minimum value for the contact angle should be 96°. In another embodiment, the minimum value for the contact angle should be 106°. In another embodiment, the minimum value for the contact angle should be 126°. In another embodiment, the minimum value for the contact angle should be 136°. All the embodiments disclosed above may be combined in any combination provided they are not mutually exclusive, for example: a contact angle which is 76° or more and 168° or less. The contact angle (also known as Young angle) is an intrinsic characteristic of a solid-liquid-vapour system. Its value quantifies the aptitude of a non-reactive liquid to spread on a flat, undeformable, perfectly smooth and chemically homogeneous solid surface. Contact angle is one of the most common parameters to measure the wettability of a surface. Regularly, the wettability is referred as the degree of how a liquid deposited on a solid substrate spreads out or the ability of liquids to form boundary surfaces with solid states. A completely wettable substrate has a zero contact angle. And therefore, non-wetting liquids creates a contact angle between 90 and 180° with the solid surface. For some applications, it has been found that the contact angle should not only be within certain values at least at melting temperature, but it should have a particular behaviour with the increase of temperature above the melting temperature, and thus the disk material and its preparation should be selected accordingly. If Tm is the melting temperature, at a given temperature (T) above the melting temperature (and with a maximum of 500° C. overheating above the melting temperature). In an embodiment, the contact angle, measured in degrees, should be between Cs and Ci, wherein $Cs=185°-0.2*(T-Tm)$ and $Ci=120°-0.2*(T-Tm)$ being T and Tm in degree Celsius (° C.). In an embodiment, the contact angle should decrease a 2.5% or more for every 100° C. temperature increase over the melting temperature with a maximum over-heat of 500° C. In another embodiment, the contact angle should decrease a 7.5% or more for every 200° C. temperature increase over the melting temperature with a maximum over-heat of 500° C. For some applications, it has been found that the material of the disk should be chosen in accordance to the material being atomized taking into account a very particular desirable behaviour of the surface tension between the two materials. For some applications, it has been found that it suffices to assure that the surface tension value between the molten material and the disk material is within certain values defined by a maximum value and a minimum value. In an embodiment, the maximum value for the surface tension should be 1750 mN/m. In another embodiment, the maximum value for the surface tension should be 1550 mN/m. In another embodiment, the maximum value for the surface tension should be 1450 mN/m. In another embodiment, the maximum value for the surface tension should be 1250 mN/m. In an embodiment, the minimum value for the surface tension should be 680 mN/m. In another embodiment, the minimum value for the surface tension should be 780 mN/m In another embodiment, the minimum value for the surface tension should be 820 mN/m. In another embodiment, the minimum value for the surface tension should be 960 mN/m. In another embodiment, the minimum value for the surface tension should be 1080 mN/m. All the embodiments disclosed above may be combined in any combination provided they are not mutually exclusive, for example: a surface tension which is 680 mN/m or more and 1750 mN/m or less. For some applications, it has been found that the disk material should be chosen to assure a decrease of the surface tension between the material being atomized and the working surface of the disk which decreases in a particular way with increasing temperature. If Tm is the melting temperature, at a given temperature (T) above the melting temperature (and with a maximum of 500° C. over-heating above the melting temperature). In an embodiment, the surface tension should be between STs and STi, wherein $STs=1450-0.8*(T-Tm)$ and $STi=820-0.7*(T-Tm)$ in both cases the surface tension is measured in mN/m and T and Tm are in degree Celsius (° C.). In an embodiment, the surface tension should decrease a 1.3% or more for every 100° C. temperature increase over the melting temperature with a maximum over-heat of 500° C. In an embodiment, the surface tension should decrease a 6.1% or more for every 200° C. temperature increase over the melting temperature with a maximum over-heat of 500° C. The inventor has found that the morphological quality can be affected by the composition of the alloy being melt. In this respect, some elements have a similar effect to each other in some applications and configurations of this method and have been separated in group I and group II. In an embodiment, a group I element has to be present with a 0.3% by weight or more. In another embodiment, a group I element has to be present with a 2.2% by weight or more. In another embodiment, a group I element has to be present with a 3.1% by weight or more. In another embodiment, a group I element has to be present with a 4.2% by weight or more. In another embodiment, a group I element has to be present with a 4.6% by weight or more. In another embodiment, a group I element has to be present with a 5.2% by weight or more. In another embodiment, a group I element has to be present with a 7.3% by weight or more. In an embodiment, a group I element can only be present with a 9.8% by weight or less. In another embodiment, a group I element can only be present with a 6.8% by weight or less. In another embodiment, a group I element can only be present with a 3.8% by weight or less. In another embodiment, a group I element can only be present with a 2.8% by weight or less. In another embodiment, a group I element can only be present with a 1.8% by weight or less. In another embodiment, a group I element can only be present with a 0.9% by weight or less. In an embodiment, a group II element has to be present with a 0.002% by weight or more. In another embodiment, a group H element has to be present with a 0.02% by weight or more. In another embodiment, a group II element has to be present with a 0.2% by weight or more. In another embodiment, a group II element has to be present with a 1.1% by weight or more. In another embodiment, a group II element has to be present with a 1.8% by weight or more. In another embodiment, a group II element has to be present with a 2.2% by weight or more. In an embodiment, a group H element can only be present with a 5.9% by weight or less. In another embodiment, a group II element can only be present with a 3.9% by weight or less. In another embodiment, a group II element can only be present with a 2.4% by weight or less. In another embodiment, a group II element can only be present with a 1.4% by weight or less. In another embodiment, a group II element can only be present with a 0.9% by weight or less. In another embodiment, a group II element can only be present with a 0.09% by weight or less. In an embodiment, at least one element of group I and one element of group II have to be present. In an embodiment, at least one element of group I and two elements of group II have to be present. In an embodiment, at least one element of group I and three elements of group II have to be present. In an embodiment, at least two elements of group I and one element of group II have to be present. In an embodiment, at least two elements of group I and two elements of group II have to be present. In an embodiment, at least two elements of group I and three elements of group II have to be present. In an embodiment, magnesium is an element of group I. In an embodiment, silicon is an element of group I. In an embodiment, zinc is an element of group I. In an embodiment, scandium is an element of group II. In an embodiment, zirconium is an element of group II. In an embodiment, copper is an element of group II. In an embodiment, manganese is an element of group II. In an embodiment, iron is an element of group II. In some applications, some elements have to be kept below a certain level because for some configurations of the present disclosure, they promote the appearance of voids and also non-spherical particles. In an embodiment, type K elements have to be kept below 94 ppm by weight. In another embodiment, type K elements have to be kept below 48 ppm by weight. In another embodiment, type K elements have to be kept below 24 ppm by weight. In another embodiment, type K elements have to be kept below 9 ppm by weight. In another embodiment, type K elements have to be kept below 0.8 ppm by weight. In some embodiments, the absence of elements type K is preferred. In an embodiment, potassium is a type K element. In an embodiment, phosphor is a type K element. In an embodiment, chromium is a type K element. In an embodiment, type S elements have to be kept below 0.8 ppm by weight. In another embodiment, type S elements have to be kept below 0.08 ppm by weight. In another embodiment, type S elements have to be kept below 0.04 ppm by weight. In another embodiment, type S elements have to be kept below 0.008 ppm by weight. In some embodiments, the absence of elements type S is preferred. In an embodiment, antimony is a type S element. In an embodiment, lithium is a type S element. In an embodiment, type N elements have to be kept below 590 ppm by weight. In another embodiment, type N elements have to be kept below 190 ppm by weight. In another embodiment, type N elements have to be kept below 90 ppm by weight. In another embodiment, type N elements have to be kept below 20 ppm by weight. In another embodiment, type N elements have to be kept below 9 ppm by weight. In some embodiments, the absence of elements type N is preferred. In an embodiment, sodium is a type N element. In an embodiment, gallium is a type N element. In an embodiment, calcium is a type N element. In an embodiment, % Sr can be present in the aluminum-based alloy, it such cases has to be keep below 1.9% by weight. As will be seen in this document, in some other realizations of the present disclosure, some of these elements can be managed even when in very large presence to obtain very challenging powders or particulate material, like is the case of gallium and lithium. Given the low coefficient of thermal expansion and subsequent thermal shock resistance, some titanates came as good potential candidates for disk material on a first ceramic material screening. Unfortunately, thermal shock resistance is not sufficient in the present disclosure due to the very high mechanical loading, that renders insignificant the evaluation of a material as a good alloy casting material for the present disclosure. Mechanical strength solicitation cannot be evaluated through the short term mechanical properties, since these tend to deteriorate quite fast in presence of the molten alloy atomized. As an example, titanates were rapidly disregarded as a disk material in view of "Effect of grain boundary cracks on the corrosion behaviour of aluminum titanate ceramics in a molten aluminum alloy—by Makoto Tanaka, Kazumi Kashiwagi, Naoki Kawashima, Satoshi Kitaoka, Osamu Sakurada and Yutaka Ohya—in Corrosion Science volume 54_January 2012, pages 90-96.". In fact, many ceramics that are often used as casting ceramics with good mechanical properties, unfortunately suffer from liquid-metal embrittlement in molten aluminum. Surprisingly, the inventor has found that when making first try-outs with powder ceramic, under the particular conditions of the present disclosure, barium titanate presents a much higher durability than expected and can effectively be used as a disk material. Later investigations, showed that barium can also be at least partially replaced by strontium with the same effect. In an embodiment, the disk materials discussed in this paragraph are applied as a thick coating on an otherwise metallic material. In some embodiments, the atomizing rotating element may be coated or un-coated or even partially coated or multiple-layer coated. For some applications, a coating comprising a multiple-layered structure is preferred. In an embodiment, the coating comprises at least two layers. In another embodiment the coating comprises at least three layers. In some applications, in order to improve wettability the atomizing disk can be suitably coated with a material coat similar to alloy to be atomized or a stable component of it or even a similar material. This is particularly interesting in some applications where a greater wettability is preferred. Regardless of the substrate material the inventor has found that in some applications, the aforementioned coating layers can be applied using different materials and can effectively be used as a coat material. In an embodiment, the atomizing disk is at least partially coated with two or more coating layers of different composition. In some applications, a multiple-layered structure coating comprising a ceramic coating layer and a metallic coating layer is preferred, while in some other applications, a multiple-layered structure coating comprising a metallic coating layer and a ceramic coating layer is preferred. In an embodiment, the first coating layer applied on the atomizing disk is a metallic coating layer. In another embodiment, the first coating layer applied on the atomizing disk is a ceramic coating layer. Several coating techniques can be preferably used, as namely: high velocity oxygen fuel (HVOF), chemical vapor deposition (CVD), physical vapor deposition (PVD), plasma spraying, thermal spraying/projection, cold gas spraying, cladding, fluidized bed, chemical and electrochemical techniques among many other techniques. In an embodiment, the thickness of the coating is 2.1 microns or more. In another embodiment, the thickness of the coating is 8.1 microns or more. In another embodiment, the thickness of the coating is 22.1 microns or more. In another embodiment, the thickness of the coating is 72.1 microns or more. In another embodiment, the thickness of the coating is 103 microns or more. In another embodiment, the thickness of the coating is 160 microns or more. In another embodiment, the thickness of the coating is 280 microns or more. In another embodiment, the thickness of the coating is 370 microns or more. In another embodiment, the thickness of the coating is 560 microns or more. In another embodiment, the thickness of the coating is above 1.06 mm. For some applications, the thickness of the coating is preferred below a certain value. In an embodiment the thickness of the coating is less than 1.9 mm. In another embodiment the thickness of the coating is less than 990 microns. In another embodiment the thickness of the coating is less than 490 microns. In another embodiment the thickness of the coating is less than 390 microns. In another embodiment the thickness of the coating is less than 240 microns. In another embodiment the thickness of the coating is less than 106 microns. In another embodiment the thickness of the coating is less than 84 microns. In another embodiment the thickness of the coating is less than 62 microns. In another embodiment the thickness of the coating is less than 48 microns. All the embodiments disclosed above may be combined in any combination provided they are not mutually exclusive, for example: a coating with a thickness of 2.1 microns or more and 990 microns or less. In an embodiment, when the coating comprises more than one layer, the thickness values disclosed above, refer to the thickness of each coating layer. In an embodiment, the disk material upon which the coating is applied comprises an intermetallic material. In some embodiments, the aforementioned rules for aluminum-based alloys can be extended to magnesium-based alloys. In some embodiments, the aforementioned rules for aluminum-based alloys can be extended to lithium-based alloys. In some embodiments, the aforementioned rules for aluminum-based alloys can be extended to copper-based alloys. In some embodiments, the aforementioned rules for aluminum-based alloys can be extended to germanium-based alloys. In some embodiments, the aforementioned rules for aluminum-based alloys can be extended to silver-based alloys. In some embodiments, the aforementioned rules for aluminum-based alloys can be extended to gold-based alloys. Another surprise was with another ceramic disregarded right away in view of "Mechanical Properties of Densely Sintered High-Purity Titanium Diborides in Molten Aluminum Environments" by H. R. Baumgartner; July 1984 which teaches away from the usage of $TiB_2$ (titanium diboride) since it overrides any short term identified advantages since it relates to shortened durability due to crack embrittlement and thus poor durability in a highly mechanically loaded system as the ones in this document. Very surprisingly in some of the implementations of the present invention it has worked very well with very long durability. In an embodiment, the material of the disk comprises a boride. In an embodiment, the material of the disk comprises titanium diboride. In an embodiment, the material of the disk comprises titanium diboride with some deviations from stoichiometry. In an embodiment, the material of the disk comprises titanium diboride as a coating.

In an embodiment, the inventor has found that the methods disclosed in this document are particularly suitable to produce iron and iron-based alloys in powder or particulate form. In an embodiment, the composition comprising at least one metal provided in step a) refers to a composition comprising an iron-based alloy. In the case of iron and iron-based alloys it has been found, that many physical and mechanical properties seem to be determinant at the possibility of a certain material to be a good disk material candidate, like thermal expansion coefficient, thermal conductivity, fracture toughness, density, mechanical strength to mention just a few. Some of the nominal properties tend to deteriorate, and often very strongly in the presence of the molten alloy processed, which is of outmost importance due to the required durability on the disk for the process to be economically viable. It should also not be forgotten that the mechanical loading on the disk is very exceptional and not comparable to any other piece in the existing melting processes. Surprisingly, it has been found, that looking at some rules applying to properties, that are prone to change in the presence of the molten metal, seem to work under certain processing conditions. For some applications, it has been found that it suffices to assure that the contact angle is within certain values defined by a maximum value and a minimum value. In an embodiment, the maximum value for the contact angle should be 172°. In another embodiment, the maximum value for the contact angle should be 156°. In another embodiment, the maximum value for the contact angle should be 148°. In another embodiment, the maximum value for the contact angle should be 139°. In an embodiment, the minimum value for the contact angle should be 76°. In another embodiment, the minimum value for the contact angle should be 98°. In another embodiment, the minimum value for the contact angle should be 104°. In another embodiment, the minimum value for the contact angle should be 116°. In another embodiment, the minimum value for the contact angle should be 132°. All the embodiments disclosed above may be combined in any combination provided they are not mutually exclusive, for example: a contact angle which is 76° or more and 172° or less. For some applications, it has been found that the contact angle should not only be within certain values at least at melting temperature, but it should have a particular behaviour with the increase of temperature above the melting temperature, and thus the disk material and its preparation should be selected accordingly. If Tm is the melting temperature, at a given temperature (T) above the melting temperature (and with a maximum of 500° C. over-heating above the melting temperature). In an embodiment, the contact angle, measured in degrees, should be between Cs and Ci, wherein Cs=185°−0.2*(T−Tm) and Ci=120−0.2*(T−Tm) being T and Tm in degree Celsius (° C.). In an embodiment, the contact angle should decrease a 1.5% or more for every 100° C. temperature increase over the melting temperature with a maximum over-heat of 500° C. In an embodiment, the contact angle should decrease a 5.5% or more for every 200° C. temperature increase over the melting temperature with a maximum over-heat of 500° C. For some applications, it has been found that the material of the disk should be chosen in accordance to the material being atomized taking into account a very particular desirable behaviour of the surface tension between the two materials. For some applications, it has been found that it suffices to assure that the surface tension value between the molten material and the disk material is within certain values defined by a maximum value and a minimum value. In an embodiment, the maximum value for the surface tension should be 2190 mN/m. In another embodiment, the maximum value for the surface tension should be 1990 mN/m. In another embodiment, the maximum value for the surface tension should be 1690 mN/m. In another embodiment, the maximum value for the surface tension should be 1590 mN/m. In an embodiment, the minimum value for the surface tension should be 810 mN/m. In another embodiment, the minimum value for the surface tension should be 910 mN/m. In another embodiment, the minimum value for the surface tension should be 1010 mN/m. In another embodiment, the minimum value for the surface tension should be 1110 mN/m. In another embodiment, the minimum value for the surface tension should be 1510 mN/m. All the embodiments disclosed above may be combined in any combination provided they are not mutually exclusive, for example: a surface tension which is 810 mN/m or more and 2190 mN/m or less. For some applications, it has been found that the disk material should be chosen to assure a decrease of the surface tension between the material being atomized and the working surface of the disk which decreases in a particular way with increasing temperature. If Tm is the melting temperature, at a given temperature (T) above the melting temperature (and with a maximum of 500° C. over-heating above the melting temperature). In an embodiment, the surface tension should be between STs and STi, wherein STs=1700−0.8*(T−Tm) and STi=1100−0.9*(T−Tm) in both cases the surface tension is measured in mN/m and T and Tm are in degree Celsius (° C.). In an embodiment, the surface tension should decrease a 1.1% or more for every 100° C. temperature increase over the melting temperature with a maximum over-heat of 500° C. In an embodiment, the surface tension should decrease a 5.1% or more for every 200° C. temperature increase over the melting temperature with a maximum over-heat of 500° C. The inventor has found that some alloying elements in the liquid have an incidence on the surface tension and the contact angle, also some have an incidence in the fragmentation of the liquid in the atomization process and thus the tendency to form finer or coarser powder. One such element is sulphur (S), it has been found that it can be used in some embodiments to promote the formation of very fine powder. In an embodiment, the % S should be above 25 ppm by weight. In another embodiment, the % S should be above 55 ppm by weight. In another embodiment, the % S should be above 115 ppm by weight. In another embodiment, the % S should be above 550 ppm by weight. In another embodiment, the % S should be above 750 ppm by weight. In another embodiment, the % S should be above 0.12% by weight. In some embodiments, it has been found that % S messes everything up, giving powders with internal voids in such cases special care has to be taken to assure low enough levels of % S. In an embodiment, the % S should be below 400 ppm by weight. In another embodiment, the % S should be below 90 ppm by weight. In another embodiment, the % S should be below 39 ppm by weight. In another embodiment, the % S should be below 19 ppm by weight. In another embodiment, the % S should be below 9 ppm by weight. In another embodiment, the % S should be below 4 ppm by weight. In some embodiments, the absence of % S is preferred. In some embodiments, the same effect of % S could be observed in % P but with somewhat less intensity. In an embodiment, the % P should be above 55 ppm by weight. In another embodiment, the % P should be above 115 ppm by weight. In another embodiment, the % P should be above 550 ppm by weight. In another embodiment, the % P should be above 750 ppm by weight. In another embodiment, the % P should be above 0.12% by weight. In some embodiments, it has been found that % P messes everything up, giving powders with internal voids in such cases special care has to be taken to assure low enough levels of % P. In an embodiment, the % P should be below 400 ppm by weight. In another embodiment, the % P should be below 90 ppm by weight. In another embodiment, the % P should be below 39 ppm by weight. In another embodiment, the % P should be below 29 ppm by weight. In another embodiment, the % P should be below 19 ppm by weight. In another embodiment, the % P should be below 9 ppm by weight. In some embodiments, the absence of % P is preferred. The inventor has found that also % B (boron) can have such effect in some cases. In an embodiment, the % B should be above 6 ppm by weight. In another embodiment, the % B should be above 11 ppm by weight. In another embodiment, the % B should be above 25 ppm by weight. In another embodiment, the % B should be above 45 ppm by weight. In another embodiment, the % B should be above 0.12% by weight. In some embodiments, it has been found that % B messes everything up, giving powders with internal voids in such cases special care has to be taken to assure low enough levels of % B. In an embodiment, the % B should be below 400 ppm by weight. In another embodiment, the % B should be below 90 ppm by weight. In another embodiment, the % B should be below 39 ppm by weight. In another embodiment, the % B should be below 29 ppm by weight. In another embodiment, the % B should be below 19 ppm by weight. In another embodiment, the % B should be below 9 ppm by weight. In some embodiments, the absence of % B is preferred. In some applications, % C has to be kept in a moderate amount because it can for some compositions promote the formation of internal voids in the powder. In an embodiment, the % C has to be kept below 4.9% by weight. In another embodiment, the % C has to be kept below 3.4% by weight. In another embodiment, the % C has to be kept below 1.9% by weight. In another embodiment, the % C has to be kept below 0.9% by weight. In an embodiment, the % C has to be kept below 1.9% by weight when the sum of % Mo+% Cr+% W+% V+% Si+% Mn is larger than 10.5% by weight. In an embodiment, the % C has to be kept below 1.9% by weight when the sum of % Cr+% Ta+% Hf is larger than 10% by weight. The inventor has found that the oxygen content of the molten metal liquid to be atomized is very often a critical variable to control and thus special care has to be placed at the way desoxidation is performed. In the case of steels, even more so in the case of tool steels and also for some embodiments, in the case of stainless steels, even more so the ones that are susceptible of being used as tool steels, it is critical that the levels of % Si, % Ti and/or % Al be tightly controlled. In some embodiments, it has been found that % Si should not be employed as deoxidizing element, as is often the case, in fact the residual levels of % Si should be tightly controlled since it has proven to have a great influence in the usability of the powder due to the special way oxidation takes place with this element. In an embodiment, the % Si should be below 0.29% by weight. In another embodiment, the % Si should be below 0.19% by weight. In another embodiment, the % Si should be below 0.09% by weight. In another embodiment, the % Si should be below 0.04% by weight. In another embodiment, the % Si should be below 0.009% by weight. In some embodiments, the absence of % Si is preferred. In some embodiments, % Si is a critical alloying element and thus the final application determines the amount to be added. In some embodiments, it has been found that % Al should not be employed as deoxidizing element, as is often the case right after % Si, in fact the residual levels of % Al should be tightly controlled since it has proven to have a great influence in the usability of the powder due to the special way oxidation takes place with this element. In an embodiment, the % Al should be below 0.09% by weight. In another embodiment, the % Al should be below 0.04% by weight. In another embodiment, the % Al should be below 0.009% by weight. In another embodiment, the % Al should be below 0.004% by weight. In another embodiment, the % Al should be below 0.0009% by weight. In some embodiments, the absence of % Al is preferred. In some embodiments, % Al is a critical alloying element and thus the final application determines the amount to be added. In some embodiments, it has been found that Ti is the preferred element for desoxidation, in fact for some embodiments, it has been found that even a slight alloying with % Ti above the trace levels remaining from desoxidation is desirable. This is especially the case for materials with rather low % C contents, although moderate % C and even high % C steels can also benefit from % Ti desoxidation, but in some cases care should be taken to make sure the remaining % Ti content is not excessive. In an embodiment, the % Ti should be above 0.0012% by weight. In another embodiment, the % Ti should be above 0.0012% by weight. In another embodiment, the % Ti should be above 0.012% by weight. In another embodiment, the % Ti should be above 0.052% by weight. In another embodiment, the % Ti should be above 0.12% by weight. In another embodiment, the % Ti should be above 0.32% by weight. In some embodiments, it has been found that % Ti should not be employed as deoxidizing element, in fact the residual levels of % Ti should be tightly controlled since it has proven to have a great influence in the usability of the powder due to the special way it reacts with % C to form fragile, large irregular primary carbides. In an embodiment, the % Ti should be below 0.09% by weight. In another embodiment, the % Ti should be below 0.04% by weight. In another embodiment, the % Ti should be below 0.009% by weight. In another embodiment, the % Ti should be below 0.004% by weight. In another embodiment, the % Ti should be below 0.0009% by weight. In some embodiments, the absence of % Ti is preferred. In some embodiments, % Ti is a critical alloying element and thus the final application determines the amount to be added. In some embodiments, what has been said about steels regarding % Si, % Al and % Ti can be extended to any iron-based alloys. In some embodiments, what has been said about steels regarding % Si, % Al and % Ti can be extended to any nickel-based alloys. In some embodiments, when it is not desirable to deoxidize with either % Si, % Al and % Ti, and yet oxygen levels in the molten liquid to be atomized have to be tightly controlled, more expensive deoxidizing elements can be used, like for example % Sc, % Zr, etc. Given the thermal shock resistance, the inventor has found that alumina ($Al_2O_3$) can be a good disk material for certain embodiments. For applications with a high over-heating of the melting liquid poured on a rather colder disk, it is also interesting to use aluminum nitride (AlN). In some embodiments, it is interesting that the disk comprises a very stable oxide like magnesium oxide (MgO). In some embodiments, the disk should comprise an oxide where the metal part acts with an oxidation number of III or more. In some embodiments, the disk should have as majority an oxide where the metal part acts with an oxidation number of III or more. In some embodiments, the disk should comprise an oxide where the metal part acts with an oxidation number of IV or more. In some embodiments, the disk should have as majority an oxide where the metal part acts with an oxidation number of IV or more. The most surprising observation has been made with titanium oxide, that reacts with most alloys in the present aspect of the disclosure making a very poor candidate as disk material, but with great surprise it has been found that this behaviour can be mitigated by controlling the amount of oxygen both in the disk material and the alloy to be optimized. In an embodiment, the oxygen content of the predominant phases identified as titanium oxide (with % Ti above 50% by weight) should be above 26% by weight. In another embodiment, the oxygen content of the predominant phases identified as titanium oxide (with % Ti above 50% by weight) should be above 31% by weight. In an embodiment, the oxygen content of the predominant phases identified as titanium oxide (with % Ti above 50% by weight) should be below 39% by weight. In another embodiment, the oxygen content of the predominant phases identified as titanium oxide (with % Ti above 50% by weight) should be below 36% by weight. In another embodiment, the oxygen content of the predominant phases identified as titanium oxide (with % Ti above 50% by weight) should be below 34% by weight. In an embodiment, the content of oxygen in the liquid to be atomized should be 790 ppm by weight or less. In another embodiment, the content of oxygen in the liquid to be atomized should be 180 ppm by weight or less. In another embodiment, the content of oxygen in the liquid to be atomized should be 40 ppm by weight or less. In another embodiment, the content of oxygen in the liquid to be atomized should be 14 ppm by weight or less. In some embodiments, the absence of oxygen is preferred. In an embodiment, TiN should be used as a disk material when the nitrogen content of the liquid material to be atomized is less than 1500 ppm by weight. In another embodiment, TiN should be used as a disk material when the nitrogen content of the liquid material to be atomized is less than 190 ppm by weight. In another embodiment, TiN should be used as a disk material when the nitrogen content of the liquid material to be atomized is less than 49 ppm by weight. In an embodiment, the disk materials discussed in this paragraph are applied as a thick coating on an otherwise metallic material. In some embodiments, the atomizing rotating element may be coated or uncoated or even partially coated or multiple-layer coated. For some applications, a coating comprising a multiple-layered structure is preferred. In an embodiment, the coating comprises at least two layers. In another embodiment the coating comprises at least three layers. In some applications, in order to improve wettability the atomizing disk can be suitably coated with a material coat similar to alloy to be atomized or a stable component of it or even a similar material. This is particularly interesting in some applications where a greater wettability is preferred. Regardless of the substrate material the inventor has observed that in some applications, the aforementioned coating layers can be applied using different materials and can effectively be used as a coat material. In an embodiment, the atomizing disk is at least partially coated with two or more coating layers of different composition. In some applications, a multiple-layered structure coating comprising a ceramic coating layer and a metallic coating layer is preferred, while in some other applications, a multiple-layered structure coating comprising a metallic coating layer and a ceramic coating layer is preferred. In an embodiment, the first coating layer applied on the atomizing disk is a metallic coating layer. In another embodiment, the first coating layer applied on the atomizing disk is a ceramic coating layer. Several coating techniques can be preferably used, as namely: high velocity oxygen fuel (HVOF), chemical vapor deposition (CVD), physical vapor deposition (PVD), plasma spraying, thermal spraying/projection, cold gas spraying, cladding, fluidized bed, chemical and electrochemical techniques among many other techniques. In an embodiment, the thickness of the coating is 2.1 microns or more. In another embodiment, the thickness of the coating is 8.1 microns or more. In another embodiment, the thickness of the coating is 22.1 microns or more. In another embodiment, the thickness of the coating is 72.1 microns or more. In another embodiment, the thickness of the coating is 103 microns or more. In another embodiment, the thickness of the coating is 160 microns or more. In another embodiment, the thickness of the coating is 280 microns or more. In another embodiment, the thickness of the coating is 370 microns or more. In another embodiment, the thickness of the coating is 560 microns or more. In another embodiment, the thickness of the coating is above 1.06 mm. For some applications, the thickness of the coating is preferred below a certain value. In an embodiment the thickness of the coating is less than 1.9 mm. In another embodiment the thickness of the coating is less than 990 microns. In another embodiment the thickness of the coating is less than 490 microns. In another embodiment the thickness of the coating is less than 390 microns. In another embodiment the thickness of the coating is less than 240 microns. In another embodiment the thickness of the coating is less than 106 microns. In another embodiment, the thickness of the coating is less than 84 microns. In another embodiment, the thickness of the coating is less than 62 microns. In another embodiment, the thickness of the coating is less than 48 microns. In an embodiment, the disk material upon which the coating is applied comprises an intermetallic material. All the embodiments disclosed above may be combined in any combination provided they are not mutually exclusive, for example: a coating with a thickness of 2.1 microns or more and 990 microns or less. In an embodiment, when the coating comprises more than one layer, the thickness values disclosed above, refer to the thickness of each coating layer. In some embodiments, the aforementioned rules for iron-based alloys can be extended to magnesium-based alloys. In some embodiments, the aforementioned rules for iron-based alloys can be extended to lithium-based alloys. In some embodiments, the aforementioned rules for iron-based alloys can be extended to copper-based alloys. In some embodiments, the aforementioned rules for iron-based alloys can be extended to nickel-based alloys. In some embodiments, the aforementioned rules for iron-based alloys can be extended to cobalt-based alloys. In some embodiments, the aforementioned rules for iron-based alloys can be extended to titanium-based alloys. In some embodiments, the aforementioned rules for iron-based alloys can be extended to tin-based alloys. In some embodiments, the aforementioned rules for iron-based alloys can be extended to bronze alloys. In some embodiments, the aforementioned rules for iron-based alloys can be extended to any metal-based alloy. In some embodiments, the aforementioned rules for iron-based alloys can be extended to any non-magnetic metal-based alloy. In some embodiments, the method is also suitable for processing master alloys. The inventor has found that when processing such master alloys exceptionally low levels of micro-segregation and exceptionally low level of gas contents (such as oxygen and nitrogen) at exceptionally lower costs can be produced.

For several embodiments, it has been found that it is very detrimental to have direct contact with a liquid of the produced powder, the liquid to be atomized, and even more so all the stages in between that the material being atomized undergoes, since it promotes the formation of voids, undesirable surface modifications and in some embodiments undesirable microstructures. In an embodiment, any kind of direct contact of the material being atomized (during any stage of the atomization process—which obviously include the liquid before atomization and the powder already atomized-) with water or a water-based fluid is avoided. In an embodiment, any kind of direct contact of the material being atomized (during any stage of the atomization process) with any liquid is avoided. In an embodiment, any kind of direct contact of the material being atomized (during any stage of the atomization process) with any liquid containing substance (like mists, fogs, etc.) is avoided. For some embodiments, even the contact of a cooling liquid, mist or any other liquid containing substance with the rotating elements has to be avoided if it could come in contact with any of the material being atomized. In some embodiments, even the contact with cooling gases for the material being atomized have to be avoided when they imply large quantities of cooling gas, since it is not only very environmental prejudicial, but it also can affect negatively, at least for some applications, the morphological and/or the microstructural qualities. In some embodiments, a circulating gas is introduced in the atomization chamber. In an embodiment, any kind of introduced circulating gas with a flow of 990 $m^3$/min or more is avoided (an introduced circulating gas is a gas that is injected into the atomization chamber during the atomization process, even if it is in a closed circuit with for example a refrigeration and/or compression stage outside the chamber, the movement of the gas contained in the chamber even when done in a smart way to have it lower its temperature within the chamber with some kind of heat exchange system is not considered a circulating gas in this aspect of the disclosure). In an embodiment, any kind of introduced circulating gas with a flow of 98 $m^3$/min or more is avoided. In another embodiment, any kind of introduced circulating gas with a flow of 48 $m^3$/min or more is avoided. In another embodiment, any kind of introduced circulating gas with a flow of 9 $m^3$/min or more is avoided. In another embodiment, any kind of introduced circulating gas with a flow of 4 $m^3$/min or more is avoided. In another embodiment, any kind of introduced circulating gas with a flow of 0.9 $m^3$/min or more is avoided. In some embodiments, the circulating gas introduced in the atomization chamber is a cooling gas. For some applications, the preferred cooling gas is an inert gas. In some embodiments, particular constructions within the present disclosure allow the usage of cooling gas curtains, but for environmental reasons the smart circulation of the protective atmosphere gas within the chamber, making it cool through the contact with a cold wall and/or heat exchanger, is preferred. In an embodiment, some of the gas within the chamber is forced (the rotating element itself acting as impeller, or the convection generated by local heating or cooling of the gas, might be enough) to contact a cold element (wall, any kind of heat exchange system, . . . ) causing this portion of the gas within the chamber to drop its temperature at least 2° C. In an embodiment, some of the gas within the chamber is to contact a cold element causing this part of the gas to drop its temperature at least 6° C. In another embodiment, some of the gas within the chamber is to contact a cold element causing this part of the gas to drop its temperature at least 12° C. In another embodiment, some of the gas within the chamber is to contact a cold element causing this part of the gas to drop its temperature at least 22° C. In another embodiment, some of the gas within the chamber is to contact a cold element causing this part of the gas to drop its temperature at least 52° C. In another embodiment, some of the gas within the chamber is to contact a cold element causing this part of the gas to drop its temperature at least 122° C. In an embodiment, the gas getting in contact with the cold element and thus dropping its temperature is at least 1.2 $m^3$/min. In another embodiment, the gas getting in contact with the cold element and thus dropping its temperature is at least 12 m³/min. In another embodiment, the gas getting in contact with the cold element and thus dropping its temperature is at least 120 m³/min. In another embodiment, the gas getting in contact with the cold element and thus dropping its temperature is at least 1200 m³/min. In another embodiment, the gas getting in contact with the cold element and thus dropping its temperature is at least 12000 m³/min. In some embodiments, the gas forced to contact a cold element is an inert gas. In a set of embodiments, it is interesting to enter a small quantity of gas in the chamber to cool certain elements. In an set of embodiments, it is even interesting that this gas comprises a mist with a liquid. In a set of embodiments, when the element being addressed with the mist is a bearing or any other element benefiting from lubrification, it is interesting that the particulates in the mist comprise a lubrifiying fluid and/or particles (for example, an oil, graphite micro-flakes, grease, etc.). In an embodiment, the lubrifiying fluid is an oil. In an embodiment, the elements being cooled comprise the bearings of the rotating element causing the atomizing of the material being atomized. In an embodiment, the elements being cooled comprise the bearing closest to the atomizing disk of the rotating element causing the atomizing of the material being atomized. In an embodiment, the elements being cooled comprise the shaft of the main rotating element causing the atomizing of the material being atomized. In an embodiment, the elements being cooled comprise the disk of the rotating element causing the atomizing of the material being atomized. For some particular applications, the atomizing rotating element may be externally cooled. In an embodiment, the quantity of gas being introduced for local refrigeration of the atomizing system is 0.012 m³/min or more. In another embodiment, the quantity of gas being introduced for local refrigeration of the atomizing system is 0.12 m³/min or more. In another embodiment, the quantity of gas being introduced for local refrigeration of the atomizing system is 0.52 m³/min or more. In another embodiment, the quantity of gas being introduced for local refrigeration of the atomizing system is 1.2 m³/min or more. In another embodiment, the quantity of gas being introduced for local refrigeration of the atomizing system is 2.6 m³/min or more. In another embodiment, the quantity of gas being introduced for local refrigeration of the atomizing system is 6.6 m³/min or more. In another embodiment, the quantity of gas being introduced for local refrigeration of the atomizing system is 12 m³/min or more. In an embodiment, the quantity of gas being introduced for local refrigeration of the atomizing system is 98 m³/min or less. In another embodiment, the quantity of gas being introduced for local refrigeration of the atomizing system is 48 m³/min or less. In another embodiment, the quantity of gas being introduced for local refrigeration of the atomizing system is 28 m³/min or less. In another embodiment, the quantity of gas being introduced for local refrigeration of the atomizing system is 9 m³/min or less. In another embodiment, the quantity of gas being introduced for local refrigeration of the atomizing system is 4 m³/min or less. In another embodiment, the quantity of gas being introduced for local refrigeration of the atomizing system is 1.9 m³/min or less. In another embodiment, the quantity of gas being introduced for local refrigeration of the atomizing system is 0.9 m³/min or less. In some embodiments, the inventor has found that in order to obtain very fine spherical powders or particulate materials, in some applications, centrifugal atomization is preferred in an atomization chamber comprising an atomizing rotating element, wherein the atmosphere in the atomization chamber is cooled.

Figure 2:
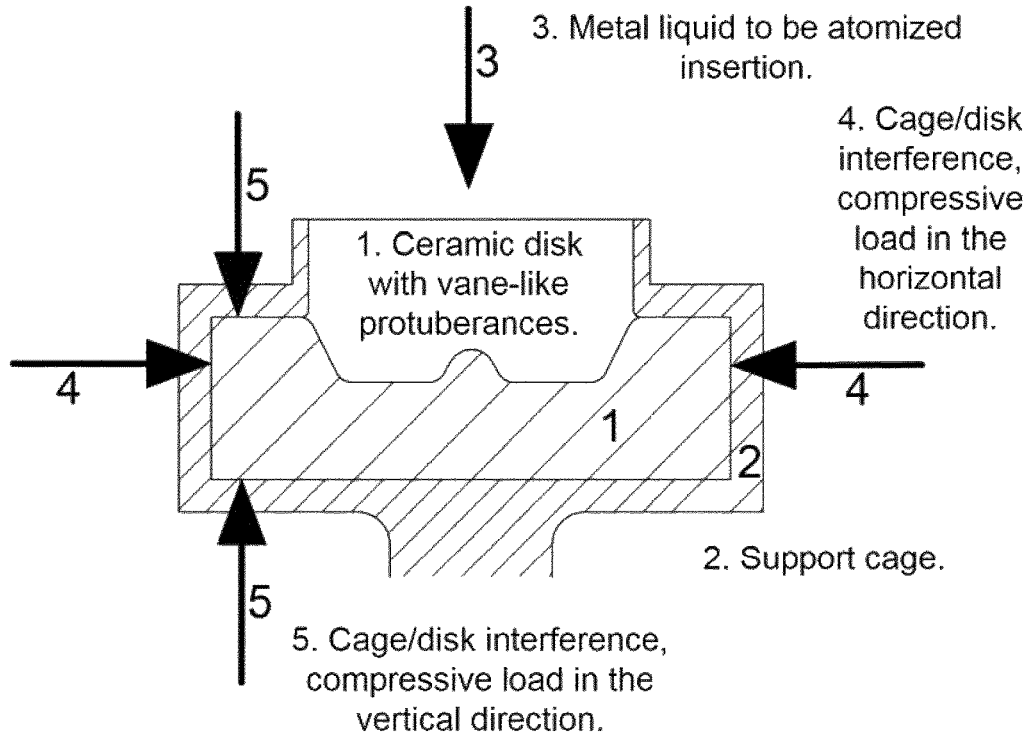
FIG. 2. 1. Ceramic disk with vane-like protuberances. 2. Support cage. 3. Direction and point of metal liquid to be atomized insertion. 4. A cage/disk interference, providing compressive load on the disk in the horizontal direction. 5. cage/disk interference providing compressive load on the disk in the vertical direction.

The inventor has found that in some embodiments of the present disclosure, it is important to follow a rather unconventional rule while designing the atomizing rotating element (here called disk). For those embodiments, only the centrifugal force is taken into account when doing the Finite Element Simulation (FES) an all other acting forces on the disk are neglected, then the acting stresses on all points of the disk are calculated using polar coordinates and only the radial component is taken into account and within the radial component only tensile (and not compression) stresses are taken into account. In an embodiment, the design is modified to have all radial tensile stresses on the disk due to solely the centrifugal forces below 290 MPa. In another embodiment, the design is modified to have all radial tensile stresses on the disk due to solely the centrifugal forces below 190 MPa. In another embodiment, the design is modified to have all radial tensile stresses on the disk due to solely the centrifugal forces below 140 MPa. In another embodiment, the design is modified to have all radial tensile stresses on the disk due to solely the centrifugal forces below 90 MPa. In another embodiment, the design is modified to have all radial tensile stresses on the disk due to solely the centrifugal forces below 49 MPa. Interestingly enough for several embodiments, the maximum FES resulting tensile stress in the radial direction should not be too low if pore free particles with a narrow size distribution are to be obtained. In an embodiment, the design is modified to have a maximum value of the radial tensile stresses on the disk due to solely the centrifugal forces above 14 MPa. In another embodiment, the design is modified to have a maximum value of the radial tensile stresses on the disk due to solely the centrifugal forces above 24 MPa. In another embodiment, the design is modified to have a maximum value of the radial tensile stresses on the disk due to solely the centrifugal forces above 44 MPa. In another embodiment, the design is modified to have a maximum value of the radial tensile stresses on the disk due to solely the centrifugal forces above 84 MPa. For some applications, the inventor has found that a special configuration should be used. In this configuration a metallic structure is used around the ceramic disk (the disk is also referred in some embodiments as spinning, spinning disk, spinning disk atomizer, rotating element, rotating disk, atomizing disk or atomizing rotating element). The peculiarity being that the metallic structure exerts a compression load on the ceramic disk at working conditions. In an embodiment, the compression load is achieved by choosing a metallic material for the structure which has a lower thermal expansion coefficient than the material of the disk having at least part of the compression load arise due to the thermal expansion coefficient mismatch when the temperature rises to the stationary state. In FIG. 2 an example is provided of a possible configuration of disk and metallic structure which exercises a compressive load when the working conditions are achieved. In point 1, and example of a ceramic disk with vane-like protuberances is depicted. In point 2, a support cage is depicted. In point 3, the direction and point of metal liquid to be atomized insertion is depicted. In point 4, an example of cage/disk interference is provided providing compressive load on the disk in the horizontal direction. In point 5, an example of cage/disk interference is provided providing compressive load on the disk in the vertical direction. In an embodiment, the cage is made with a material with high elongation at breakage. In an embodiment, the cage is made with a material with 0.8% or more elongation at breakage at the working temperature. In an embodiment, the cage is made with a material with 6% or more elongation at breakage at the working temperature. In an embodiment, elongation at breakage is measured at the working temperature according to ASTM E21-17: Standard Test Methods for Elevated Temperature Tension Tests of Metallic Materials. In an embodiment, the cage is made with a metal. In an embodiment, the cage is a metal structure. In an embodiment, there is interference providing compressive load to the disk at the working temperature at least in the horizontal direction. In an embodiment, there is interference providing compressive load to the disk at the working temperature at least in the vertical direction. In an embodiment, there is interference providing compressive load to the disk at the working temperature at least in the horizontal and vertical direction. In an embodiment, both the ceramic material and the material of the metallic structure have similar thermal expansion coefficients and the compressive load is achieved by a mechanical interference when assembling the disk in the metallic structure. The disk can be forced into the structure when the mechanical interference exists, but more often the assembling is performed with a difference in temperatures between disk and metallic structure, being the metallic structure warmer, and thus achieving the desired room temperature (in this document room temperature refers to 23±2° C.) mechanical interference, when both materials reach the room temperature. In an embodiment, the stress on the ceramic disk at the ceramic disk-metallic structure interface, is kept below $LFC*\sigma_{creep}$ and above $LSC*\sigma_{creep}$. In an embodiment, LFC is taken to be 1. In another embodiment, LFC is taken to be 0.8. In another embodiment, LFC is taken to be 0.6. In another embodiment, LFC is taken to be 1.2. In another embodiment, LFC is taken to be 0.4. In an embodiment, LSC is taken to be 0.7. In another embodiment, LSC is taken to be 0.5. In another embodiment, LSC is taken to be 0.3. In another embodiment, LSC is taken to be 0.1. In another embodiment, LSC is taken to be 0.01. In an embodiment, $\sigma_{creep}$ is taken to be the creep resistance of the metallic material for 10 h at the stationary working temperature. In another embodiment, $\sigma_{creep}$ is taken to be the creep resistance of the metallic material for 1000 h at the stationary working temperature. In another embodiment, $\sigma_{creep}$ is taken to be the creep resistance of the metallic material for 10000 h at the stationary working temperature. In another embodiment, $\sigma_{creep}$ is taken to be the creep resistance of the metallic material for 10 h at 800° C. In another embodiment, $\sigma_{creep}$ is taken to be the creep resistance of the metallic material for 1000 h at 800° C. In another embodiment, $\sigma_{creep}$ is taken to be the creep resistance of the metallic material for 10 h at 1000° C. In another embodiment, $\sigma_{creep}$ is taken to be the creep resistance of the metallic material for 1000 h at 1000° C. In another embodiment, $\sigma_{creep}$ is taken to be the creep resistance of the metallic material for 10 h at 1200° C. In another embodiment, $\sigma_{creep}$ is taken to be the creep resistance of the metallic material for 1000 h at 1200° C. In another embodiment, $\sigma_{creep}$ is taken to be the creep resistance of the metallic material for 10 h at 1400° C. In another embodiment, $\sigma_{creep}$ is taken to be the creep resistance of the metallic material for 1000 h at 1400° C. In another embodiment, $\sigma_{creep}$ is taken to be the creep resistance of the metallic material for 10 h at 1600° C. In another embodiment, $\sigma_{creep}$ is taken to be the creep resistance of the metallic material for 1000 h at 1600° C. In an embodiment, the creep resistance ($\sigma_{creep}$) of the metallic material is measured according to ASTM E139-11 (2018). In an alternative embodiment, the creep resistance ($\sigma_{creep}$) of the metallic material is measured according to ISO 204:2018(en). In an embodiment, a material is chosen with $\sigma_{creep}$ of 12 MPa or more at the working temperature. In another embodiment, a material is chosen with $\sigma_{creep}$ of 26 MPa or more at the working temperature. In another embodiment, a material is chosen with $\sigma_{creep}$ of 52 MPa or more at the working temperature. In another embodiment, a material is chosen with $\sigma_{creep}$ of 72 MPa or more at the working temperature. In another embodiment, a material is chosen with $\sigma_{creep}$ of 110 MPa or more at the working temperature. In another embodiment, a material is chosen with $\sigma_{creep}$ of 280 MPa or more at the working temperature. In another embodiment, a material is chosen with $\sigma_{creep}$ of 620 MPa or more at the working temperature. In some embodiments, the stress on the ceramic disk at the ceramic disk-metallic structure interface is determined through FEM simulation. In some embodiments, the stationary working temperature at the ceramic disk-metallic structure interface is determined through FEM simulation. In some embodiments, the stress on the ceramic disk at the ceramic disk-metallic structure interface is determined as:

$$[\varepsilon_0 + (\alpha_{ceramic} - \alpha_{metal})*(T_{work} - 295)*(E_{ceramic} + E_{metal})/2]$$ where:

$\varepsilon_0$—Initial interference due to tolerances in/1.

$\alpha_{ceramic}$—Mean thermal expansion coefficient of the ceramic from room temperature to $T_{work}$.

$\alpha_{metal}$—Mean thermal expansion coefficient of the metal from room temperature to $T_{work}$.

$T_{work}$—Stationary regime working temperature in Kelvin.

$E_{ceramic}$—Mean Elastic Modulus of the ceramic from room temperature to $T_{work}$.

$E_{metal}$—Mean Elastic Modulus of the metal from room temperature to $T_{work}$.

In an embodiment, elastic modulus of the metal is measured at room temperature according to ASTM E8/E8M-16a: Standard Test Methods for Tension Testing of Metallic Materials and at elevated temperatures ($T_{work}$) is measured according to ASTM E21-17.

In an embodiment, elastic modulus of the ceramic is measured at room temperature according to ASTM C1161-18: Standard Test Method for Flexural Strength of Advanced Ceramics at Ambient Temperature and at elevated temperatures ($T_{work}$) is measured according to ASTM C1211-18: Standard Test Method for Flexural Strength of Advanced Ceramics at Elevated Temperatures.

In an embodiment, thermal expansion coefficient is measured according to ASTM E831-14: Standard Test Method for Linear Thermal Expansion of Solid Materials by Thermomechanical Analysis.

In an embodiment, the working temperature is the temperature of the molten composition. In an embodiment, the working temperature is the temperature of the molten composition in contact with the atomizing rotating element. In an embodiment, the working temperature is the temperature of the atomizing rotating element. In an embodiment, the temperature of the atomizing rotating element is measured directly. In an alternative embodiment, the temperature of the atomizing rotating element is calculated using FEM. In another alternative embodiment, the temperature of the atomizing rotating element is calculated by measuring the temperature over several points on the surface of the rotating element in contact with the molten composition and taking the mean, the arithmetic mean or the average value. In another alternative embodiment, the temperature of the atomizing rotating element is calculated by measuring the temperature over several points on the surface of the rotating element in contact with the molten composition and taking the maximum value. In another alternative embodiments, the working temperature refers to Tm, Tm−25, Tm−60, Tm−100, Tm−160, Tm−200, Tm−270, Tm−350 or even Tm−470, wherein Tm is the melting temperature of the composition to be atomized in degrees Celsius. In another alternative embodiments, the working temperature refers to Tm+40, Tm+120, Tm+160, Tm+220 or even to Tm+300, wherein Tm is the melting temperature of the composition to be atomized in degrees Celsius (° C.). In an embodiment, the stationary working temperature is the temperature of the atomizing rotating element in the stationary operating mode. In an embodiment, the stationary working temperature is the temperature of the molten composition. In an embodiment, the stationary working temperature is the temperature of the molten composition in contact with the atomizing rotating element. In an embodiment, the stationary working temperature of the atomizing rotating element is measured directly. In an alternative embodiment, the stationary working temperature of the atomizing rotating element is calculated using FEM. In another alternative embodiment, the temperature of the atomizing rotating element is calculated by measuring the temperature over several points on the surface of the rotating element in contact with the molten composition and taking the mean, the arithmetic mean or the average value. In another alternative embodiment, the temperature of the atomizing rotating element is calculated by measuring the temperature over several points on the surface of the rotating element in contact with the molten composition and taking the maximum value. In another alternative embodiments, the stationary working temperature refers to Tm, Tm−25, Tm−60, Tm−100, Tm−160, Tm−200, Tm−270, Tm−350 or even Tm−470, wherein Tm is the melting temperature of the composition to be atomized in degrees Celsius (° C.). In another alternative embodiments, the stationary working temperature refers to Tm+40, Tm+120, Tm+160, Tm+220 or even to Tm+300, wherein Tm is the melting temperature of the composition to be atomized in degrees Celsius (° C.).

Figure 4:
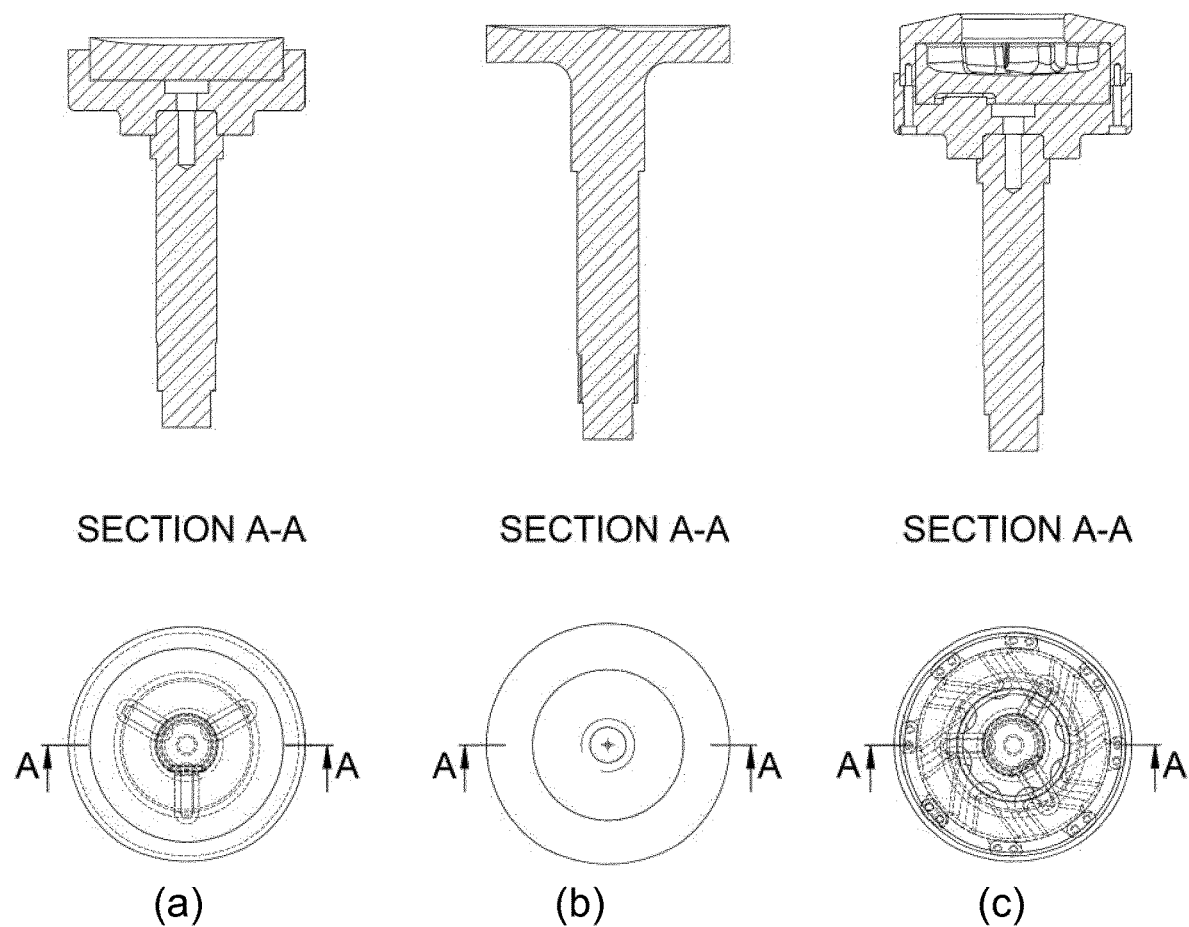
FIG. 4. Cross-section areas of several atomizing rotating elements: (a) a concave disk containing different parts made of different materials, (b) one-piece disk and shaft having a coating and (c) a ceramic atomizing element containing vanes and with different parts made of different materials (support cage, disk, shaft).

The atomizing rotating element is the element responsible for carrying out the atomization of the molten composition (also referred as molten material). In an embodiment, the molten composition refers to a molten material a molten alloy or a molten metal. The inventor has found that in some embodiments, the molten composition can comprise a solid fraction. In an embodiment, the inventor has found that a molten composition comprising less than 79% by weight of solid fraction is preferred. In some applications, lower levels of the solid fraction in the molten composition are preferred. In an embodiment, the solid fraction in the molten composition is below 39% by weight. In another embodiment, the solid fraction in the molten composition is below 19% by weight. In another embodiment, the solid fraction in the molten composition is below 9% by weight. In another embodiment, the solid fraction in the molten composition is below 4% by weight. In another embodiment, the solid fraction in the molten composition is below 0.4% by weight. In contrast, in some applications, a minimum quantity of solid fraction in the molten composition is preferred. In an embodiment, the solid fraction in the molten composition is above 0.01% by weight. In another embodiment, the solid fraction in the molten composition is above 0.1% by weight. In another embodiment, the solid fraction in the molten composition is above 1.2% by weight. In another embodiment, the solid fraction in the molten composition is above 6% by weight. In another embodiment, the solid fraction in the molten composition is above 10.6% by weight. Although in several occasions reference is made to the atomizing rotating element as rotating disk, atomizing disk, spinning, spinning disk, spinning disk atomizer, disk or rotating element the use of any other atomizing rotating element geometry is also included; for example a flat disk, a cup, a cone, an inverted cone or any other suitable geometry. The inventor has found that for some applications, an atomizing rotating element being a bulk disk, made of one piece is preferred, instead in other applications, the atomizing rotating element can contain different parts of elements which even can be made of different materials. For some applications, the inventor has found that a particular configuration should be used. Under these configurations, and for some applications, a metallic atomizing disk and a main shaft manufactured as a one piece (monolithic metallic atomizing disk and main shaft) is preferred (an example is shown in FIG. 4(b)). When it comes to the assembly of the atomizing rotating element, the inventor has found that in some embodiments using the monolithic atomizing disk set-up brings with it a number of additional advantages to the metallic powder manufacturing. For some applications, mounting the atomizing element in the one-piece configuration results in a lighter atomization element. Moreover, for some applications, it has been found that the dynamic balancing process of the atomizing atomizing element is simpler and less costly. The inventor has also found that under this configuration, in some cases the production of metallic powder can be exerted effectively and the powder obtained presents lower particle size and improved morphology values in terms of sphericity. Furthermore, and for some applications, the inventor also highlights the lower economic cost and the greater feasibility of such configurations. Related to the material, in different embodiments, the atomizing rotating element is preferred ceramic or metallic among other materials. As previously disclosed, the atomizing rotating element may be coated or un-coated or even partially coated. In different embodiments, the coating is preferred metallic or ceramic among other materials. For some applications, it is advantageous the presence of protuberances in the atomizing rotating element such as vanes, protrusions, or prominences on the surface of the atomizing rotating element with a certain cross-sectional area and a given extrusion path which may form channels or guides through which flows the liquid metal. When it comes to the distribution of the protuberances on the surface of the atomizing rotating element, for some applications, the inventor has found that at least part of the protuberances are preferred axi-asymmetrical. In other embodiment, axi-asymmetrical protuberances are preferred. In some embodiments, the protuberances are vanes. Distribution of the vanes in the atomizing rotating element may have effect in the atomizing rotating element performance; the inventor has found that in some applications vanes radially distributed are preferred, while in other applications, vanes not radially distributed are preferred. In some applications, a minimum diameter of the atomizing rotating element (atomizing disk) is preferred. In an embodiment, the diameter of the atomizing disk is 36 mm or more. In another embodiment, the diameter of the atomizing disk is 46 mm or more. In another embodiment, the diameter of the atomizing disk is 56 mm or more. In another embodiment, the diameter of the atomizing disk is 76 mm or more. In another embodiment, the diameter of the atomizing disk is 86 mm or more. In another embodiment, the diameter of the atomizing disk is 106 mm or more. In another embodiment, the diameter of the atomizing disk is 202 mm or more. In another embodiment, the diameter of the atomizing disk is 216 mm or more. In another embodiment, the diameter of the atomizing disk is 306 mm or more. The inventor has found that in many applications, an excessively large atomizing disk leads to surprisingly undesirable results in terms of powder morphological quality especially when inspecting the inside of the powder. In an embodiment, the diameter of the disk should be less than 690 mm. In another embodiment, the diameter of the atomizing disk should be less than 490 mm. In another embodiment, the diameter of the atomizing disk should be less than 290 mm. In another embodiment, the diameter of the atomizing disk should be less than 190 mm. In another embodiment, the diameter of the atomizing disk should be less than 90 mm.

Regardless the geometry, in some applications, liquid metal distribution is promoted by the action of a certain number of vanes of involute or evolvent variable geometry, and even for some applications with changes in their thickness profile. The vanes can present single or double curvature and its geometrical layout can be any suitable to the purpose of atomization. The inventor has found that in some applications, straight protuberances or vanes are preferred. In an embodiment, the vanes are straight radial vanes. In other applications, curved vanes are preferred. In different embodiments, the vanes are preferably backward-curved, more preferably radially curved, and even forward-curved. In addition it has been found that for some applications, the better atomizing results are achieved when the cross section of the vanes has no straight edges or segments, this is particularly interesting in some applications, when the number of vanes is preferably more than 6, and the vanes are straight radial vanes. In other embodiments vanes with a variable geometry and even with a variable cross sectional shape are preferred. For other applications, the cross section of the vanes is preferred with straight edges or segments, such as triangle, square, or trapeze shapes among others. In addition, for some applications, a serrated edge on the perimeter of the atomizing rotating element is desired in order to encourage a more uniform droplet size distribution and to increase the quality of the atomization process. It has to be clearly differentiated from some completely different existing methods with blades, cutters, windows or other kind of protuberances to implement a comminuting effect to triturate the material. In an embodiment, the main effect of the protuberances is the impelling of speed on the metal liquid and not a comminuting effect.

With the deep literature review performed by the inventor, it became clear that the centrifugal atomizing with an atomizing disk of high melting temperature metals seems to be quite incompatible with the production of large batches, probably due to the expected decay in the morphological quality of the powder. That seems to be aggravated when having axial-asymmetrical vanes on the atomizing disk. The inventor was surprised to observe that the production of large batches of sound morphological quality in high melting point metals and alloys is possible. More surprising even was to found that it is even possible with a large atomizing disk incorporating axial-asymmetrical protuberances and even vanes. In an embodiment, a large production batch is 6 kg or more. In another embodiment, a large production batch is 12 kg or more. In another embodiment, a large production batch is 60 kg or more. In another embodiment, a large production batch is 120 kg or more. In another embodiment, a large production batch is 600 kg or more. In another embodiment, a large production batch is 1200 kg or more. In fact, and very surprisingly when working under the optimized conditions described within this document, very large batches can be attained while maintaining the sound morphological quality of the atomized powder. In an embodiment, a very large production batch is 2100 kg or more. In another embodiment, a very large production batch is 6000 kg or more. In another embodiment, a very large production batch is 16000 kg or more. In another embodiment, a very large production batch is 21000 kg or more. In another embodiment, a very large production batch is 80000 kg or more. In an embodiment, a high melting temperature metal and/or alloy is a metal and/or alloy which presents a melting temperature of 660° C. or more. In another embodiment, a high melting temperature metal and/or alloy is a metal and/or alloy which presents a melting temperature of 1020° C. or more. In another embodiment, a high melting temperature metal and/or alloy is a metal and/or alloy which presents a melting temperature of 1210° C. or more. In another embodiment, a high melting temperature metal and/or alloy is a metal and/or alloy which presents a melting temperature of 1450° C. or more. In an embodiment, a large atomizing disk is an atomizing disk with a diameter of 36 mm or more. In another embodiment, a large atomizing disk is an atomizing disk with a diameter of 46 mm or more. In another embodiment, a large atomizing disk is an atomizing disk with a diameter of 56 mm or more. In another embodiment, a large atomizing disk is an atomizing disk with a diameter of 76 mm or more. In another embodiment, a large disk is an atomizing disk with a diameter of 86 mm or more. In another embodiment, a large atomizing disk is an atomizing disk with a diameter of 106 mm or more. In another embodiment, a large atomizing disk is an atomizing disk with a diameter of 202 mm or more. In another embodiment, a large atomizing disk is an atomizing disk with a diameter of 216 mm or more. In another embodiment, a large atomizing disk is an atomizing disk with a diameter of 306 mm or more. The inventor has found that in many applications, an excessively large disk leads to surprisingly undesirable results in terms of powder morphological quality especially when inspecting the inside of the powder. In an embodiment, the diameter of the atomizing disk should be less than 990 mm. In another embodiment, the diameter of the atomizing disk should be less than 690 mm. In another embodiment, the diameter of the atomizing disk should be less than 490 mm. In another embodiment, the diameter of the atomizing disk should be less than 290 mm. In another embodiment, the diameter of the atomizing disk should be less than 190 mm. In another embodiment, the diameter of the atomizing disk should be less than 90 mm. Often, productivity is more relevant under an economic perspective than the size of the production batch, but according to literature this is at least as difficult to achieve for high melting point alloys. This document describes the separate actions that have to be taken whose combination is often different for different alloys to achieve unexpected large batch productivity. In an embodiment, a large batch productivity is 32 kg/h or more. In another embodiment, a large batch productivity is 89 kg/h or more. In another embodiment, a large batch productivity is 102 kg/h or more. In another embodiment, a large batch productivity is 322 kg/h or more. In another embodiment, a large batch productivity is 512 kg/h or more. In another embodiment, a large batch productivity is 1020 kg/h or more. In another embodiment, a large batch productivity is 2680 kg/h or more. In another embodiment, a large batch productivity is 3200 kg/h or more. In some applications, a large batch productivity is limited to a maximum value. In an embodiment, a large batch productivity is 19400 kg/h or less. In another embodiment, a large batch productivity is 6940 kg/h or less. In another embodiment, a large batch productivity is 4490 kg/h or less. In another embodiment, a large batch productivity is 2440 kg/h or less. In another embodiment, a large batch productivity is 1440 kg/h or less.

One of the most curious and unexpected observations made by the inventor, has been the effect of wettability by the atomized liquid of the atomizing disk surface. In this respect the inventor made several observations through the choosing of different disk materials, different coatings and different ways of texturing the working surface of the atomizing disk, or at least parts of it. In an embodiment, at least parts of the surface of the disk are provided a texture with the purpose of altering the wetting behaviour of the atomized liquid on the atomizing disk. In an embodiment, the surface modification increases wettability. In an embodiment, the surface modification leads to super-hydrophilicity. In an embodiment, the surface modification leads to super-wetting. In an embodiment, the surface modification leads to a contact angle between the molten metal and the modified surface which is smaller than 89°. In another embodiment, the surface modification leads to a contact angle between the molten metal and the modified surface which is smaller than 64°. In another embodiment, the surface modification leads to a contact angle between the molten metal and the modified surface which is smaller than 38°. In another embodiment, the surface modification leads to a contact angle between the molten metal and the modified surface which is smaller than 22°. In another embodiment, the surface modification leads to a contact angle between the molten metal and the modified surface which is smaller than 9°. In another embodiment, the surface modification leads to a contact angle between the molten metal and the modified surface which is smaller than 4°. In an embodiment, the surface modification leads to hydrophobicity. In an embodiment, the surface modification leads to super-hydrophobicity. In an embodiment, the surface modification leads to a contact angle between the molten metal and the modified surface which is greater than 95°. In another embodiment, the surface modification leads to a contact angle between the molten metal and the modified surface which is greater than 105°. In another embodiment, the surface modification leads to a contact angle between the molten metal and the modified surface which is greater than 145°. In another embodiment, the surface modification leads to a contact angle between the molten metal and the modified surface which is greater than 155°. In another embodiment, the surface modification leads to a contact angle between the molten metal and the modified surface which is greater than 165°. In another embodiment, the surface modification leads to a contact angle between the molten metal and the modified surface which is greater than 175°. In an embodiment, the surface modification leads to a contact angle hysteresis between the molten metal and the modified surface which is smaller than 25°. In another embodiment, the surface modification leads to a contact angle hysteresis between the molten metal and the modified surface which is smaller than 15°. In another embodiment, the surface modification leads to a contact angle hysteresis between the molten metal and the modified surface which is smaller than 9°. In another embodiment, the surface modification leads to a contact angle hysteresis between the molten metal and the modified surface which is smaller than 4°. In another embodiment, the surface modification leads to a contact angle hysteresis between the molten metal and the modified surface which is smaller than 0.9°. In this paragraph, and in the rest of the document unless otherwise indicated, the values of wettability are quantified by the contact internal angle between the liquid and the solid surface. In an embodiment, the texturing consists in engraving with a pattern. In an embodiment, the texturing consists in engraving with a repetitive pattern. In an embodiment, the texturing consists in engraving with a random pattern. In an embodiment, the texturizing is produced through etching. In an embodiment, the texturizing is produced through the application of a coating. In an embodiment, the texturizing is produced with a laser source. In an embodiment, the texturizing is produced through an electron beam source. In an embodiment, the texturizing is produced through laser engraving.

When it comes to the number of vanes or other protuberances, the inventor has found that it is advantageous to have a number of vanes greater than 2, more preferably greater than 3, even more preferably greater than 5 and even more, located in a radial geometrical layout or in any other appropriate layout to the purpose of atomization. For other applications, the inventor has found that in some embodiments, the number of vanes in the atomizing rotating element should be at least 5, preferably at least 7, or even at least 15. In some applications with straight and radial vanes, the inventor has found that the better results are obtained when the number of vanes is more than 6, preferably more than 9, more preferably more than 11, or even more than 15. In some embodiments, which has been disclosed for the vanes in preceding paragraphs can be applied to any other protuberance.

The inventor has found that it is also possible to produce metal powder by the pouring of liquid metal onto a super-hydrophobic surface to atomize. Adjusting the texture and nature of the material where the liquid stream is broken, the pressure, the liquid super-heating and the atmosphere of the surroundings a control can be effectively exerted on the particle size of the powder obtained and its morphology in terms of sphericity. Other process variables also have an effect, but the ones mentioned often suffice for a particular morphology and size distribution. The values provided in the last paragraphs regarding contact angle and contact angle hysteresis, can be employed in this case also. In this case it has been found that the pitch of the texture pattern is important, since in many cases it determines the mean particle size attained in the atomizing process. In this case the pitch is the critical distance of the pattern. In an embodiment, the critical distance of the pattern in the minimum distance between two adjacent topological relative extremes of the same sign (two maximums or two minimums). In an embodiment, the critical distance of the pattern in the minimum distance between two adjacent topological relative extremes of opposite sign (a maximum—hill—and a minimum—valley). In an embodiment, the critical distance of a regular pattern in the minimum distance between two identical points in the pattern. In an embodiment, the pitch should be 9 mm or less. In another embodiment, the pitch should be 0.9 mm or less. In another embodiment, the pitch should be 740 microns or less. In another embodiment, the pitch should be 450 microns or less. For the manufacturing of very fine powder and provided care has taken of all other relevant properties, especially those affecting surface tension, very small pitch values have proven to be very effective. In an embodiment, the pitch should be 190 microns or less. In another embodiment, the pitch should be 90 microns or less. In another embodiment, the pitch should be 40 microns or less. In another embodiment, the pitch should be 19 microns or less. In another embodiment, the pitch should be 9 microns or less. In another embodiment, the pitch should be 4 microns or less and even submicrometric pitches can be interesting. In an embodiment, the pitch should be 900 nanometers or less. In another embodiment, the pitch should be 690 nanometers or less. In another embodiment, the pitch should be 390 nanometers or less. In another embodiment, the pitch should be 90 nanometers or less.

The inventor has found, that surprisingly enough the nature of the elements configuring the bearings allowing the rotation of the disk with respect of the structure supporting it in the desired location, have quite a noticeable influence on the quality of the produced powder especially in terms of morphology and very noticeable for large batches. The inventor has found that in some applications the powder production cost can be reduced when using the restrictions commented in this paragraph due to the increase in service life of the atomizing system. While the nominal characteristics in terms of rotating speed and load can be attained with very many configurations surprisingly only a selected few enable the production of consistently stable morphological quality in large batches. In some instances, it is the design configuration that is most determinant. In an embodiment, the restrictions commented in this paragraph apply to all the bearings on the main shaft (being the main shaft the one with the disk on one end and responsible to make the disk rotate while keeping it on the desired location). In an embodiment, the restrictions commented in this paragraph apply to the two bearings on the main shaft closest to the disk. In an embodiment, the restrictions commented in this paragraph apply to the bearing on the main shaft closest to the disk. In an embodiment, the restrictions commented in this paragraph apply to all the bearings on the main shaft with a minimum distance to the atomizing disk of 990 mm or less. In another embodiment, the restrictions commented in this paragraph apply to all the bearings on the main shaft with a minimum distance to the atomizing disk of 490 mm or less. In another embodiment, the restrictions commented in this paragraph apply to all the bearings on the main shaft with a minimum distance to the atomizing disk of 290 mm or less. In another embodiment, the restrictions commented in this paragraph apply to all the bearings on the main shaft with a minimum distance to the atomizing disk of 190 mm or less. In another embodiment, the restrictions commented in this paragraph apply to all the bearings on the main shaft with a minimum distance to the atomizing disk of 90 mm or less. In another embodiment, the restrictions commented in this paragraph apply to all the bearings on the main shaft with a minimum distance to the atomizing disk of 38 mm or less.

In an embodiment, the bearing where the restriction applies is a bearing with angular contact. In an embodiment, the bearing where the restriction applies is a bearing with angular contact with an angle of contact of 12° or higher. In another embodiment, the bearing where the restriction applies is a bearing with angular contact with an angle of contact of 15.5° or higher. In another embodiment, the bearing where the restriction applies is a bearing with angular contact with an angle of contact of 16.5° or higher. In another embodiment, the bearing where the restriction applies is a bearing with angular contact with an angle of contact of 18° or higher. In another embodiment, the bearing where the restriction applies is a bearing with angular contact with an angle of contact of 21° or higher. In an embodiment, the bearing where the restriction applies is a bearing with angular contact with an angle of contact of 34° or lower. In another embodiment, the bearing where the restriction applies is a bearing with angular contact with an angle of contact of 29° or lower. In another embodiment, the bearing where the restriction applies is a bearing with angular contact with an angle of contact of 25.5° or lower. In another embodiment, the bearing where the restriction applies is a bearing with angular contact with an angle of contact of 19° or lower. In an embodiment, the bearing where the restriction applies is a bearing with a progressive angular contact allowing a reduction of the space available between the outer diameter of the outer track (in this document also called ring) and the inner track (for example through the expansion of the shaft) the allowance of the reduction of the space takes place through a relative radial displacement between the inner track and the outer track that does still permit the working of the bearing. In an embodiment, a reduction of the space available between the outer diameter of the outer track and the inner track of 0.06 mm or more is possible. In another embodiment, a reduction of the space available between the outer diameter of the outer track and the inner track of 0.12 mm or more is possible. In another embodiment, a reduction of the space available between the outer diameter of the outer track and the inner track of 0.26 mm or more is possible. In another embodiment, a reduction of the space available between the outer diameter of the outer track and the inner track of 0.6 mm or more is possible. In another embodiment, a reduction of the space available between the outer diameter of the outer track and the inner track of 1.2 mm or more is possible. In an embodiment, a relative radial displacement between the inner track and the outer track of 0.3 mm or more is possible. In another embodiment, a relative radial displacement between the inner track and the outer track of 1.2 mm or more is possible. In another embodiment, a relative radial displacement between the inner track and the outer track of 2.1 mm or more is possible. In another embodiment, a relative radial displacement between the inner track and the outer track of 5.2 mm or more is possible. In an embodiment, the bearing where the restriction applies is a bearing with cylinders as rotating elements. In an embodiment, the bearing where the restriction applies is a bearing with balls as rotating elements. In an embodiment, the bearing where the restriction applies is a bearing with ceramic rotating elements. In an embodiment, the bearing where the restriction applies is a bearing with high temperature performance metallic rings (both inner and outer rings in contact with the bearing rotating elements). In an embodiment, the bearing where the restriction applies is a bearing with high temperature performance metallic outer ring. In an embodiment, a high temperature performance metallic material is a metallic material or alloy with a high room temperature hardness even after having been exposed for a long time to a high temperature. In an embodiment, a high temperature performance metallic material is a metallic material or alloy with a high temperature hardness even after having been exposed for a long time to this high temperature. In an embodiment, a high hardness is a hardness of 54 HRc or more. In another embodiment, a high hardness is a hardness of 58 HRc or more. In another em-bodiment, a high hardness is a hardness of 62 HRc or more. In another embodiment, a high hardness is a hardness of 64 HRc or more. In another embodiment, a high hardness is a hardness of 67 HRc or more. In an embodiment, hardness at room temperature is measured according to ASTM E18-18a: Standard Test Methods for Rockwell Hardness of Metallic Materials. Hardness at high temperature is measured according to ASTM E18-18a: Standard Test Methods for Rockwell Hardness of Metallic Materials. In an embodiment, a long exposure time is 35 minutes or more. In another embodiment, a long exposure time is 1.2 hours or more. In another embodiment, a long exposure time is 5.2 hours or more. In an embodiment, a long exposure time is 12 hours or more. In another embodiment, a long exposure time is 22 hours or more. In another embodiment, a long exposure time is 110 hours or more. In some applications, the long exposure time should be limited below a certain value. In an embodiment, a long exposure time is 220 hours or less. In another embodiment, a long exposure time is 90 hours or less. In another embodiment, a long exposure time is 28 hours or less. In an embodiment, a high exposure temperature is 85° C. or more. In another embodiment, a high exposure temperature is 105° C. or more. In another embodiment, a high exposure temperature is 155° C. or more. In another embodiment, a high exposure temperature is 255° C. or more. In another embodiment, a high exposure temperature is 375° C. or more. In another embodiment, a high exposure temperature is 485° C. or more. In some applications, the high exposure temperature should be limited below a certain value. In an embodiment, a high exposure temperature is 840° C. or less. In another embodiment, a high exposure temperature is 585° C. or less. In another embodiment, a high exposure temperature is 245° C. or less. In some applications, it has been found that it is convenient to have a high exposure temperature resistant lubricant in the bearings where the restriction applies. In an embodiment, the bearings where the restriction applies comprises a lubricant with a high maximum working temperature. In an embodiment, the lubricant is continuously applied to the bearing. In an embodiment, the continuity in the application of the lubricant comprises pulses of application and time elapses without application of new lubricant. In an embodiment, the maximum working temperature of the lubricant is 86° C. or more. In another embodiment, the maximum working temperature of the lubricant is 112° C. or more. In another embodiment, the maximum working temperature of the lubricant is 186° C. or more. In another embodiment, the maximum working temperature of the lubricant is 256° C. or more. In another embodiment, the maximum working temperature of the lubricant is 306° C. or more. In an embodiment, the outer ring of the bearing where the restriction applies, is flexible. In an embodiment, the inner ring of the bearings where the restriction applies, is out of working tolerance at room temperature but within working tolerance at the working temperature. In an embodiment, the shaft connecting at least some of the bearings where the restriction applies and the disk comprise a low thermal conductivity material. In an embodiment, the low thermal conductivity material comprises a metal or metallic alloy. In an embodiment, a low thermal conductivity is 90 W/mK or less. In another embodiment, a low thermal conductivity is 34 W/mK or less. In another embodiment, a low thermal conductivity is 24 W/mK or less. In another embodiment, a low thermal conductivity is 19 W/mK or less. In another embodiment, a low thermal conductivity is 9 W/mK or less. In an embodiment, the thermal conductivity refers to the thermal conductivity measured at room temperature (as is always the case in this document unless otherwise indicated). In an embodiment thermal conductivity is measured according to ASTM E1461-13: Standard Test Method for Thermal Diffusivity by the Flash Method, this method can be used to measure the thermal conductivity at room temperature and also at nominal working temperature. In an alternative embodiment, the thermal conductivity refers to the thermal conductivity measured at nominal working temperature. In an embodiment, some cooling is applied around at least one of the bearings where restrictions apply. In an embodiment, the cooling is applied directly to the shaft where the bearing is mounted. In an embodiment, the cooling is applied directly to a constituent of the bearing. In an embodiment, the cooling media comprises a phase which changes upon con-tact with the hot surface to be cooled. In an embodiment, the change of the phase com-prises evaporation. In an embodiment, the change of the phase comprises sublimation.

In an embodiment, the nominal working temperature is the theoretical temperature of the atomizing rotating element. In an alternative embodiment, the nominal working temperature is the temperature of the molten composition. In another alternative embodiment, the nominal working temperature is the temperature of the molten composition in contact with the atomizing rotating element. In another alternative embodiment, the nominal working temperature is the temperature of the atomizing rotating element. In an embodiment, the nominal working temperature of the atomizing rotating element is calculated using FEM. In another alternative embodiment, the nominal working temperature of the atomizing rotating element is calculated as the mean, arithmetic mean or average value of the temperature over several points on the surface of the rotating element in contact with the molten composition. In another alternative embodiment, the nominal working temperature of the atomizing rotating element is calculated as the maximum value of the temperature over several points on the surface of the rotating element in contact with the molten composition. In an alternative embodiment, the nominal working temperature refers to the melting temperature of the composition to be atomized. In another alternative embodiments, the nominal working temperature refers to Tm, Tm−25, Tm−60, Tm−100, Tm−160, Tm−200, Tm−270, Tm−350 or even Tm−470, wherein Tm is the melting temperature of the composition to be atomized in degrees Celsius. In another alternative embodiments, the nominal working temperature refers to Tm+40, Tm+120, Tm+160, Tm+220 or even to Tm+300, wherein Tm is the melting temperature of the composition to be atomized in degrees Celsius (° C.).

The inventor has found that for some applications, it is possible with the technology described in this document to have surprisingly low levels of certain elements that are normally in a gas form at normal conditions (in this document normal conditions refer to 20° C. and 1 atm). Also, surprisingly these low levels lead to unexpected behaviour of the powder in terms of mechanical properties, especially those related to ductility. In an embodiment, the oxygen content of the powder is 490 ppm by weight or less. In another embodiment, the oxygen content of the powder is 290 ppm by weight or less. In another embodiment, the oxygen content of the powder is 190 ppm by weight or less. In another embodiment, the oxygen content of the powder is 90 ppm by weight or less. In another embodiment, the oxygen content of the powder is 44 ppm by weight or less. In alternative embodiments, the above disclosed contents are by volume. Taking special actions the levels of oxygen can be surprisingly brought to exceptionally low levels. In an embodiment, the oxygen content of the powder is 24 ppm by weight or less. In another embodiment, the oxygen content of the powder is 19 ppm by weight or less. In another embodiment, the oxygen content of the powder is 14 ppm by weight or less. In another embodiment, the oxygen content of the powder is 9 ppm by weight or less. In another embodiment, the oxygen content of the powder is 4 ppm by weight or less. In another embodiment, the oxygen content of the powder is 0.09 ppm by weight or less. In alternative embodiments, the above disclosed contents are by volume. In contrast, in some applications, low levels of oxygen are preferred. In an embodiment, the oxygen content is above 3 ppm by weight. In another embodiment, the oxygen content of the powder is above 64 ppm by weight. In another embodiment, the oxygen content of the powder is above 108 ppm by weight. In alternative embodiments, the above disclosed contents are by volume. In an embodiment, the nitrogen content of the powder or particulate material is 490 ppm by weight or less. In another embodiment, the nitrogen content of the powder or particulate material is 190 ppm by weight or less. In another embodiment, the nitrogen content of the powder or particulate material is 90 ppm by weight or less. In another embodiment, the nitrogen content of the powder or particulate material is 40 ppm by weight or less. In another embodiment, the nitrogen content of the powder or particulate material is 18 ppm by weight or less. In another embodiment, the nitrogen content of the powder or particulate material is 4 ppm by weight or less. In some applications, low levels of nitrogen are preferred. In an embodiment, the nitrogen content is above 2 ppm by weight. In another embodiment, the nitrogen content is above 48 ppm by weight. In another embodiment, the nitrogen content is above 103 ppm by weight. In alternative embodiments, the above disclosed contents are by volume. In an embodiment, the hydrogen content of the powder is 1.8 ppm by weight or less. In another embodiment, the hydrogen content of the powder is 0.9 ppm by weight or less. In another embodiment, the hydrogen content of the powder is 0.4 ppm by weight or less. In another embodiment, the hydrogen content of the powder is 0.09 ppm by weight or less. In another embodiment, the hydrogen content of the powder is 0.009 ppm by weight or less. In alternative embodiments, the above disclosed contents are by volume. In an embodiment, what has been mentioned in this paragraph applies to iron. In an embodiment, what has been mentioned in this paragraph applies to an alloy comprising iron. In an embodiment, what has been mentioned in this paragraph applies to an alloy where iron is the majority constituent. In an embodiment, what has been mentioned in this paragraph applies to a steel. In an embodiment, what has been mentioned in this paragraph applies to a tool steel. In an embodiment, what has been mentioned in this paragraph applies to a hot work tool steel. In an embodiment, what has been mentioned in this paragraph applies to titanium. In an embodiment, what has been mentioned in this paragraph applies to an alloy comprising titanium. In an embodiment, what has been mentioned in this paragraph applies to an alloy where titanium is the majority constituent. In an embodiment, what has been mentioned in this paragraph applies to nickel. In an embodiment, what has been mentioned in this paragraph applies to an alloy comprising nickel. In an embodiment, what has been mentioned in this paragraph applies to an alloy where nickel is the majority constituent. In an embodiment, what has been mentioned in this paragraph applies to aluminum. In an embodiment, what has been mentioned in this paragraph applies to an alloy comprising aluminum. In an embodiment, what has been mentioned in this paragraph applies to an alloy where aluminum is the majority constituent. In an embodiment, what has been mentioned in this paragraph applies to magnesium. In an embodiment, what has been mentioned in this paragraph applies to an alloy comprising magnesium. In an embodiment, what has been mentioned in this paragraph applies to an alloy where magnesium is the majority constituent. In an embodiment, what has been mentioned in this paragraph applies to lithium. In an embodiment, what has been mentioned in this paragraph applies to an alloy comprising lithium. In an embodiment, what has been mentioned in this paragraph applies to an alloy where lithium is the majority constituent. In an embodiment, what has been mentioned in this paragraph applies to copper. In an embodiment, what has been mentioned in this paragraph applies to an alloy comprising copper. In an embodiment, what has been mentioned in this paragraph applies to an alloy where copper is the majority constituent. In an embodiment, what has been mentioned in this paragraph applies to cobalt. In an embodiment, what has been mentioned in this paragraph applies to an alloy comprising cobalt. In an embodiment, what has been mentioned in this paragraph applies to an alloy where cobalt is the majority constituent. In an embodiment, vacuum of 9 millibar or even higher vacuum is applied once the metal has been molten and previous to atomization. In another embodiment vacuum of 0.9 millibar or even higher vacuum is applied once the metal has been molten and previous to atomization. In another embodiment, vacuum of 0.09 millibar or even higher vacuum is applied once the metal has been molten and previous to atomization. In another embodiment, vacuum of 0.009 millibar or even higher vacuum is applied once the metal has been molten and previous to atomization. In another embodiment, vacuum of 0.00009 millibar or even higher vacuum is applied once the metal has been molten and previous to atomization. In an embodiment, after the vacuum application, the chamber is refilled with an inert atmosphere prior to the start of the atomization. In an embodiment, the inert atmosphere comprises an inert gas. In some applications, an atmosphere with a controlled oxygen content is preferred. In an embodiment, the gas used in the refilling of the chamber after applying the vacuum has a content of 98 ppm by volume of oxygen or less. In another embodiment, the gas used in the re-filling of the chamber after applying the vacuum has a content of 9 ppm by volume of oxygen or less. In another embodiment, the gas used in the re-filling of the chamber after applying the vacuum has a content of 2 ppm by volume of oxygen or less. In another embodiment, the gas used in the re-filling of the chamber after applying the vacuum has a content of 0.09 ppm by volume of oxygen or less. In another embodiment, the gas used in the re-filling of the chamber after applying the vacuum has a content of 0.009 ppm by volume of oxygen or less. In an embodiment, the refill gas has 98 ppm by volume of nitrogen or less. In another embodiment, the refill gas has 8 ppm by volume of nitrogen or less. In another embodiment, the refill gas has 0.8 ppm by volume of nitrogen or less. In an embodiment, the refill gas has 4 ppm by volume of hydrogen or less. In another embodiment, the refill gas has 0.8 ppm by volume of hydrogen or less. In another embodiment, the refill gas has 0.08 ppm by volume of hydrogen or less. In another embodiment, the refill gas has 0.0008 ppm by volume of hydrogen or less. In alternative embodiments, the above disclosed contents are by weight. In an embodiment, the inventor has found that the protective gas used to refill the chamber is preferred not to be helium. In an embodiment, at least 2 rinse cycles are made achieving the indicated vacuum level in each and then refilling with the protective atmosphere. In another embodiment, at least 4 rinse cycles are made achieving the indicated vacuum level in each and then refilling with the protective atmosphere. In another embodiment, at least 8 rinse cycles are made achieving the indicated vacuum level in each and then refilling with the protective atmosphere. In an embodiment, only in the last refill the protective atmosphere gas with extra low level of oxygen is used and a less expensive gas is used for the intermediate rinsings. For some applications the atmosphere in the atomization chamber is preferred with a reduced oxygen content. In an embodiment, the oxygen content is below 16% by volume. In another embodiment, the oxygen content is below 5.8% by volume. In another embodiment, the oxygen content is below 3.9% by volume. In another embodiment, the oxygen content is below 0.9% by volume. In another embodiment, the oxygen content is below 0.2% by volume. In alternative embodiments, the oxygen contents disclosed above are by weight. In an embodiment, oxygen traps are used which purposefully react with the oxygen within the atomization chamber and/or melt chamber to further reduce the oxygen content. In an embodiment, the oxygen trap comprises a titanium alloy. In an embodiment, the oxygen trap comprises a magnesium alloy. In an embodiment, the oxygen trap comprises an aluminum alloy. In an embodiment, the oxygen trap comprises a silicon alloy. In an embodiment, the oxygen trap comprises a scandium alloy. In an embodiment, the oxygen trap comprises a zirconium alloy. In an embodiment, the oxygen trap comprises a hafnium alloy. In an embodiment, the oxygen trap comprises an alloy with a higher reactivity to oxygen than silicon according to the Ellinham diagram for the working conditions. In an embodiment, the oxygen trap comprises an alloy with a higher reactivity to oxygen than iron according to the Ellinham diagram for the working conditions. In an embodiment, the oxygen trap is heated above 120° C. In another embodiment, the oxygen trap is heated above 320° C. In another embodiment, the oxygen trap is heated above 420° C. In another embodiment, the oxygen trap is heated above 520° C. In another embodiment, the oxygen trap is heated above 720° C. In an embodiment, the oxygen trap is heated above the sublimation temperature of the oxide of the alloy of the trap with the lowest oxide sublimation temperature. The inventor has found that for some applications, the oxygen content in the chamber has an unexpected influence on the powder geometry and deviation from sphericity. In an embodiment, the oxygen content in the atomization chamber is held below 280 ppm by volume before the atomization starts. In another embodiment, the oxygen content in the atomization chamber is held below 280 ppm by volume before the atomization starts. In another embodiment, the oxygen content in the atomization chamber is held below 90 ppm by volume before the atomization starts. In another embodiment, the oxygen content in the atomization chamber is held below 38 ppm by volume before the atomization starts. In another embodiment, the oxygen content in the atomization chamber is held below 18 ppm by volume before the atomization starts. In another embodiment, the oxygen content in the atomization chamber is held below 8 ppm by volume before the atomization starts. In another embodiment, the oxygen content in the atomization chamber is held below 0.8 ppm by volume before the atomization starts. In another embodiment, the oxygen content in the atomization chamber is held below 0.008 ppm by volume before the atomization starts. In alternative embodiments, the oxygen contents disclosed above are by weight (for example: the oxygen content in the atomization chamber is held below 280 ppm by weight before the atomization starts). In a set of embodiments, it has been found that the oxygen content, measured in ppm by volume, in the atomization chamber should be held between A1s*PA2 and A1i*PA2, where the parameter PA2 has been defined earlier. In an embodiment, A1s is $4.4 \cdot 10^{-5}$. In another embodiment, A1s is $1.9 \cdot 10^{-5}$. In another embodiment, A1s is $1.1 \cdot 10^{-5}$. In another embodiment, A1s is $0.4 \cdot 10^5$. In another embodiment, A1s is $4.4 \cdot 10^{-6}$. In another embodiment, A1s is $1.4 \cdot 10^{-6}$. In an embodiment, A1i is $9.2 \cdot 10^{-7}$. In another embodiment, A1i is $4.2 \cdot 10^{-7}$. In another embodiment, A1i is $1.2 \cdot 10^{-7}$. In another embodiment, A1i is $0.2 \cdot 10^{-7}$. In another embodiment, A1i is $1.2 \cdot 10^{-8}$. In an embodiment, the nitrogen content in the atomization chamber is held below 280 ppm by volume before the atomization starts. In another embodiment, the nitrogen content in the atomization chamber is held below 90 ppm by volume before the atomization starts. In another embodiment, the nitrogen content in the atomization chamber is held below 38 ppm by volume before the atomization starts. In another embodiment, the nitrogen content in the atomization chamber is held below 18 ppm by volume before the atomization starts, In another embodiment, the nitrogen content in the atomization chamber is held below 8 ppm by volume before the atomization starts. In another embodiment, the nitrogen content in the atomization chamber is held below 0.8 ppm by volume before the atomization starts. In another embodiment, the nitrogen content in the atomization chamber is held below 0.008 ppm by volume before the atomization starts. In alternative embodiments, the nitrogen contents disclosed above are by weight (for example: the nitrogen content in the atomization chamber is held below 280 ppm by weight before the atomization starts). In an embodiment, the hydrogen content in the atomization chamber is held below 0.8 ppm by volume before the atomization starts. In another embodiment, the hydrogen content in the atomization chamber is held below 0.008 ppm by volume before the atomization starts. In alternative embodiments, the hydrogen contents disclosed above are by weight (for example: the hydrogen content in the atomization chamber is held below 0.8 ppm by weight before the atomization starts). Also, the inventor has found that some elements that tend to oxidize can have an influence on the morphology of the powder, as can also some elements like S and P described above. In an embodiment, the content of % Cr should be kept below 2.9% by weight in some molybdenum alloyed steels. In another embodiment, the content of % Cr should be kept below 1.9% by weight in some molybdenum alloyed steels. In another embodiment, the content of % Cr should be kept below 0.9% by weight in some molybdenum alloyed steels. In another embodiment, the content of % Cr should be kept below 0.09% by weight in some molybdenum alloyed steels. In an embodiment, the atmosphere in the chamber is purposefully modified to increase the surface tension between the liquid metal and the material of the disk in at least 55 mN/m with respect to the surface tension in air. In another embodiment, the atmosphere in the chamber is purposefully modified to increase the surface tension between the liquid metal and the material of the disk in at least 110 mN/m with respect to the surface tension in air. In another embodiment, the atmosphere in the chamber is purposefully modified to increase the surface tension between the liquid metal and the material of the disk in at least 210 mN/m with respect to the surface tension in air. In an embodiment, the atmosphere in the chamber is purposefully modified to increase the surface tension between the liquid metal and the material of the disk in at least 410 mN/m with respect to the surface tension in air.

As already mentioned, centrifugal atomization with rotating disk of high melting point alloys has not been pursued for production rates and production batches beyond lab batches for experimental purposes due to the expected decay in the morphological quality of the powder. Eventually, some systems may choose to employ the severely degraded morphological quality of the powder. There are some systems employing a fluid to directly cool the rotating disk or the powder shortly after the leaving of the disk that can provide some improvement to this problem. The refrigerating fluid often comprising water or another liquid and in some instances a gas is injected with a high flow in the chamber to refrigerate the powder as it is being produced. For some particular applications, the inventor has found that in some embodiments, cooling gas jets, fluid or cooling curtains can be used. Examples of inert gases which can be used in different applications are nitrogen, helium, argon, neon, xenon, krypton or any other gas which does not react with the molten composition. In some particular applications, the use of any cooling fluid except helium is preferred.

In some other particular applications, the cooling fluid used can be any inert gas except argon. In some other particular applications, the cooling fluid used can be any inert gas except nitrogen. For some applications, the inventor has found that an intensive cooling must be avoided. In an embodiment, the inventor has found that a cooling rate of the powder below $7.1*10^{2\circ}$ C./s is preferred, particularly for average particle sizes below 72 microns. In some embodiments, the inventor has found that for some applications, it is very interesting to have cooling rates of $10^{4\circ}$ C./s or lower, particularly for particles under 47 microns. In some applications, cooling rates below $9.6\cdot10^{4\circ}$ C./s, or below $9.4\cdot10^{3\circ}$ C./s are preferred, even in some applications, lower cooling rates are preferred. In some embodiments, the cooling rate is below 980° C./s, below 710° C./s, below 93° C./s or even below 46° C./s. Instead, in some particular applications, the inventor has found that it is beneficial for the production of the powder not to use gas jets or cooling curtains to cool the powder. For many powders of interest in the present disclosure, direct contact with water or water vapour, resulting from the interaction within water and the hot rotating element, is very detrimental for the morphological quality of the produced powder and often also render powders with excessive oxygen content on the surface. Other liquids tend to have a similar effect on the morphology. Grat gas flows also tend to cause internal voids on some powders and the gas acting as a source of oxygen, even when very pure gas is employed, due to the high quantities required, often acts also as a source of surface oxidation. In an embodiment, less than 0.9 l/s of liquid are allowed to come in contact with the atomizing disk during the atomization process. In another embodiment, less than 0.9 l/min of liquid are allowed to come in contact with the atomizing disk during the atomization process. In another embodiment, less than 0.9 l/h of liquid are allowed to come in contact with the atomizing disk during the atomization process. In another embodiment, less than 0.09 l/h of liquid are allowed to come in contact with the atomizing disk during the atomization process. In an embodiment, no liquid is allowed to come in contact with the atomizing disk during the atomization process. In an embodiment, the quantity of liquid coming in contact with the atomizing disk refers to the mean quantity throughout the whole atomization batch. In an embodiment, what has been said for a liquid coming in contact with the atomizing disk applies to free (as opposed to a liquid circulating in a closed circuit) liquid within the atomization chamber. In an embodiment, the liquid comprises water. In an embodiment, less than 9 m$^3$/s of a gas injected into the atomization chamber are allowed to come in contact with the atomized powder after leaving the disk during the atomization process. In another embodiment, less than 0.9 m$^3$/s of a gas injected into the atomization chamber are allowed to come in contact with the atomized powder after leaving the disk during the atomization process. In another embodiment, less than 0.9 m$^3$/min of a gas injected into the atomization chamber are allowed to come in contact with the atomized powder after leaving the disk during the atomization process. In another embodiment, less than 0.9 m$^3$/h of a gas injected into the atomization chamber are allowed to come in contact with the atomized powder after leaving the disk during the atomization process. In another embodiment, less than 0.09 m$^3$/h of a gas injected into the atomization chamber are allowed to come in contact with the atomized powder after leaving the disk during the atomization process. The inventor has found that surprisingly with the present disclosure it becomes possible to atomize fine powder with a high morphological quality of highly reactive, very light and/or low melting temperature alloys believed impossible to atomize. It is even more surprising, that it can be achieved in centrifugal atomization with a rotating element. In an embodiment, a high morphological quality means a sphericity of 55% or more. In another embodiment, a high morphological quality means a sphericity of 78% or more. In another embodiment, a high morphological quality means a sphericity of 86% or more. In another embodiment, a high morphological quality means a sphericity of 97% or more. In another embodiment, a high morphological quality means a sphericity of 98.2% or more. In another embodiment, a high morphological quality means a sphericity of 99.1% or more. Sphericity of the powder refers to a dimensionless parameter defined as the ratio between the surface area of a sphere having the same volume as the particle and the surface area of the particle. The sphericity of the particles is determined by dynamic image analysis. In an embodiment, a high morphological quality means a porosity level of 38% by volume or less. In another embodiment, a high morphological quality means a porosity level of 18% by volume or less. In another embodiment, a high morphological quality means a porosity level of 8% by volume or less. In another embodiment, a high morphological quality means a porosity level of 0.8% by volume or less. In an embodiment, the term powder refers to a particulate material having a diameter of 1000 microns or less. In an embodiment, fine means with a $D_{50}$ of 780 microns or less. In another embodiment, fine means with a $D_{50}$ of 380 microns or less. In another embodiment, fine means with a $D_{50}$ of 180 microns or less. In another embodiment, fine means with a $D_{50}$ of 80 microns or less. In another embodiment, fine means with a $D_{50}$ of 48 microns or less. In another embodiment, fine means with a $D_{50}$ of 38 microns or less. In another embodiment, fine means with a $D_{50}$ of 28 microns or less. In another embodiment, fine means with a $D_{50}$ of 8 microns or less. In an embodiment, highly reactive means with an affinity for oxygen higher than aluminum at room temperature in air according to the Ellinham diagram. In an embodiment, highly reactive means cutting the Y-axis of the Ellinham diagram at −210 Kcal or less. In another embodiment, highly reactive means cutting the Y-axis of the Ellinham diagram at −230 Kcal or less. In another embodiment, highly reactive means cutting the Y-axis of the Ellinham diagram at −260 Kcal or less. In an embodiment, very light means with a density at normal conditions of 3.4 g/cm$^3$ or less. In another embodiment, very light means with a density at normal conditions of 2.6 g/cm$^3$ or less. In another embodiment, very light means with a density at normal conditions of 1.8 g/cm$^3$ or less. In another embodiment, very light means with a density at normal conditions of 1.6 g/cm$^3$ or less. In another embodiment, very light means with a density at normal conditions of 0.98 g/cm$^3$ or less. In another embodiment, very light means with a density at normal conditions of 0.68 g/cm$^3$ or less. In an embodiment, a low melting point alloy means an alloy with a melting point of 590° C. or less. In another embodiment, a low melting point alloy means an alloy with a melting point of 490° C. or less. In another embodiment, a low melting point alloy means an alloy with a melting point of 290° C. or less. In another embodiment, a low melting point alloy means an alloy with a melting point of 190° C. or less. In another embodiment, a low melting point alloy means an alloy with a melting point of 140° C. or less. In another embodiment, a low melting point alloy means an alloy with a melting point of 90° C. or less. In an embodiment, the atomization is centrifugal atomization. In an embodiment, the atomization is centrifugal atomization with a rotating disk. In the view of the inventor, it represents a standalone invention a fine atomized powder of a lithium alloy comprising magnesium with a high morphological quality. In an embodiment the powder obtained is a lithium-based alloy comprising magnesium. In an embodiment, the % Mg is 3.2% by weight or more. In another embodiment, the % Mg is 6.2% by weight or more. In another embodiment, the % Mg is 12% by weight or more. In another embodiment, the % Mg is 22% by weight or more. In another embodiment, the % Mg is 36% by weight or more. In the view of the inventor it represents a standalone invention a fine atomized powder of a magnesium alloy comprising lithium with a high morphological quality. In an embodiment the powder obtained is a magnesium-based alloy comprising lithium. In an embodiment, the % Li is 3.2% by weight or more. In another embodiment, the % Li is 6.2% by weight or more. In another embodiment, the % Li is 12% by weight or more. In another embodiment, the % Li is 22% by weight or more. In another embodiment, the % Li is 36% by weight or more. In the view of the inventor, it represents a standalone invention a fine atomized powder of a lithium alloy comprising aluminum with a high morphological quality. In an embodiment the powder obtained is a lithium-based alloy comprising aluminium. In an embodiment, the % Al is 3.2% by weight or more. In another embodiment, the % Al is 6.2% by weight or more. In another embodiment, the % Al is 12% by weight or more. In another embodiment, the % Al is 22% by weight or more. In another embodiment, the % Al is 36% by weight or more. In the view of the inventor, it represents a standalone invention a fine atomized powder of an aluminum alloy comprising lithium with a high morphological quality. In an embodiment the powder obtained is a aluminium-based alloy comprising lithium. In an embodiment, the % Li is 3.2% by weight or more. In another embodiment, the % Li is 6.2% by weight or more. In another embodiment, the % Li is 12% by weight or more. In another embodiment, the % Li is 22% by weight or more. In another embodiment, the % Li is 36% by weight or more. In the view of the inventor, it represents a standalone invention a fine atomized powder of a gallium alloy comprising a mating metal (MM) with a high morphological quality. In an embodiment the powder obtained is a gallium-based alloy comprising a mating metal (MM). In an embodiment, the % MM is 3.2% by weight or more. In another embodiment, the % MM is 6.2% by weight or more. In another embodiment, the % MM is 12% by weight or more. In another embodiment, the % MM is 22% by weight or more. In another embodiment, the % MM is 36% by weight or more. In an embodiment, the mating metal (MM) is Aluminum. In an embodiment, the mating metal (MM) is titanium. In an embodiment, the mating metal (MM) is iron. In an embodiment, the mating metal (MM) is nickel. In an embodiment, the mating metal (MM) is cobalt. In the view of the inventor, it represents a standalone invention a fine atomized powder of an aluminum alloy comprising gallium with a high morphological quality. In an embodiment the powder obtained is a aluminium-based alloy comprising gallium. In an embodiment, the % Ga is 3.2% by weight or more. In another embodiment, the % Ga is 6.2% by weight or more. In another embodiment, the % Ga is 12% by weight or more. In another embodiment, the % Ga is 22% by weight or more. In another embodiment, the % Ga is 36% by weight or more. In the view of the inventor, it represents a standalone invention a fine atomized powder of a titanium alloy comprising gallium with a high morphological quality. In an embodiment the powder obtained is a titanium-based alloy comprising gallium. In an embodiment, the % Ga is 3.2% by weight or more. In another embodiment, the % Ga is 6.2% by weight or more. In another embodiment, the % Ga is 12% by weight or more. In another embodiment, the % Ga is 22% by weight or more. In another embodiment, the % Ga is 36% by weight or more. In the view of the inventor it represents a standalone invention a fine atomized powder of an iron alloy comprising gallium with a high morphological quality. In an embodiment the powder obtained is an iron-based alloy comprising gallium. In an embodiment, the % Ga is 3.2% by weight or more. In another embodiment, the % Ga is 6.2% by weight or more. In another embodiment, the % Ga is 12% by weight or more. In another embodiment, the % Ga is 22% by weight or more. In another embodiment, the % Ga is 36% by weight or more. In the view of the inventor, it represents a standalone invention a fine atomized powder of a nickel alloy comprising gallium with a high morphological quality. In an embodiment the powder obtained is a nickel-based alloy comprising gallium. In an embodiment, the % Ga is 3.2% by weight or more. In another embodiment, the % Ga is 6.2% by weight or more. In another embodiment, the % Ga is 12% by weight or more. In another embodiment, the % Ga is 22% by weight or more. In another embodiment, the % Ga is 36% by weight or more. In the view of the inventor, it represents a standalone invention a fine atomized powder of a cobalt alloy comprising gallium with a high morphological quality. In an embodiment the powder obtained is a cobalt-based alloy comprising gallium. In an embodiment, the % Ga is 3.2% by weight or more. In another embodiment, the % Ga is 6.2% by weight or more. In another embodiment, the % Ga is 12% by weight or more. In another embodiment, the % Ga is 22% by weight or more. In another embodiment, the % Ga is 36% by weight or more. In this paragraph, for an alloy to be of a certain metal, the so-sayed metal has to be the majority component. In an embodiment, the majority component is the component with the higher weight percentage.

In this document $D_{50}$, refers to a particle size at which 50% of the sample's volume is comprised of smaller particles in the cumulative distribution of particle size. Particle size is measured by laser diffraction according to ISO 13320-2009.

In an alternative embodiment, the disclosed values of $D_{50}$ can be substituted by $D_{50}m$, which refers to a particle size at which 50% of the sample's mass is comprised of smaller particles in the cumulative distribution of particle size. Particle size is measured by laser diffraction according to ISO 13320-2009.

Any embodiment disclosed in this document can be combined with any other embodiment in any combination provided they are not mutually exclusive. Some embodiment combinations are as follows: [1]A method for producing metal-based alloy powders or particulate material by means of centrifugal atomization in a closed chamber comprising the steps of: a) providing a composition comprising at least one metal, b) melting the composition, and c) atomizing the molten composition by means of centrifugal atomization or rotating atomization. [2]A method for producing metal-based alloy powders by means of centrifugal atomization in a closed chamber comprising the steps of: a) providing a composition comprising at least one metal, b) melting the composition, and c) atomizing the molten composition by means of centrifugal atomization. [3] The method according to any of [1] to [2], wherein the atmosphere in the closed atomization chamber is pressurized. [4] The method according to any of [1] to [2], wherein the atmosphere in the closed atomization chamber is cooled. [5] The method according to any of [1] to [2], wherein the atmosphere in the closed atomization chamber is pressurized and/or cooled. [6] The method according to any of [1] to [5], wherein the atomization chamber comprises an atomizing disk. [7] The method according to any of [1] to [6], wherein the atomization is carried out using an atomizing disk. [8] The method according to any of [1] to [7], wherein PA2 is above 4500000. [9] The method according to any of [1] to [7], wherein PA2 is above 5000000. [10] The method according to any of [1] to [7], wherein PA2 is above 6000000. [11] The method according to any of [1] to [7], wherein PA2 is above 7000000. [12] The method according to any of [1] to [10], wherein PA2 is below 70000000. [13] The method according to any of [1] to [10], wherein PA2 is below 40000000. [14] The method according to any of [1] to [10], wherein PA2 is below 30000000. [15] The method according to any of [1] to [10], wherein PA2 is below 20000000. [16] The method according to any of [8] to [15], wherein PA2=K1*PA1+K2*P, being P the absolute pressure in the atomization chamber in Pa, and PA1=$\rho$*N$^2$*d$^2$, wherein $\rho$ the density of the composition to be atomized at their melting point under 1 bar absolute pressure measured in kg/m$^3$, N is the rotating speed of the atomizing disk in rad/s and d is the diameter of the atomizing disk in m. [17] The method according to any of [8] to [16], wherein K1=0.0033 in 1/Pa and K2=22 in 1/Pa. [18] The method according to any of [8] to [16], wherein the atomized composition is an aluminum-based alloy, being K1=0.01 in 1/Pa and K2=20 in 1/Pa. [19] The method according to any of [8] to [16], wherein when the composition to be atomized is a magnesium-based alloy, then K1=0.015 in 1/Pa and K2=22 in 1/Pa. [20] The method according to any of [8] to [16], wherein when the composition to be atomized is an iron-based alloy, then K1=0.0033 in 1/Pa and K2=20 in 1/Pa. [21] The method according to any of [8] to [16], wherein when the composition to be atomized is a nickel-based alloy, then K1=0.0033 in 1/Pa and K2=21 in 1/Pa. [22] The method according to any of [8] to [16], wherein when the composition to be atomized is a cobalt-based alloy, then K1=0.0033 in 1/Pa and K2=21 in 1/Pa. [23] The method according to any of [8] to [16], wherein when the composition to be atomized is a copper-based alloy, then K1=0.0033 in 1/Pa and K2=21 in 1/Pa. [24] The method according to any of [1] to [23], wherein the absolute pressure in the atomization chamber is above 1.2 bar. [25] The method according to any of [1] to [23], wherein the absolute pressure in the atomization chamber is above 2.6 bar. [26] The method according to any of [1] to [23], wherein the absolute pressure in the atomization chamber is above 2.8 bar. [27] The method according to any of [1] to [27], wherein the absolute pressure in the atomization chamber is below 999.4 bar. [28] The method according to any of [1] to [27], wherein the absolute pressure in the atomization chamber is below 99.2 bar. [29] The method according to any of [1] to [27], wherein the absolute pressure in the atomization chamber is below 29.6 bar. [30] The method according to any of [1] to [27], wherein the absolute pressure in the atomization chamber is below 19.2 bar. [31] The method according to any of [1] to [30], wherein PA3 is less than 10000, being PA3=PA1/P, wherein PA1=$\rho$*N$^2$*d$^2$ wherein $\rho$ is the density of the composition to be atomized at the melting point under 1 bar absolute pressure measured in kg/m$^3$, N is the rotating speed of the atomizing disk in rad/s, d is the diameter of the atomizing disk in m and P is the pressure in the atomization chamber in Pa. [32] The method according to any of [1] to [31], wherein PA3 is less than 7000, being PA3=PA1/P, wherein PA1=$\rho$*N$^2$*d$^2$ wherein $\rho$ is the density of the composition to be atomized at the melting point under 1 bar absolute pressure measured in kg/m$^3$, N is the rotating speed of the atomizing disk in rad/s, d is the diameter of the atomizing disk in m and P is the pressure in the atomization chamber in Pa. [33] The method according to any of [1] to [31], wherein PA3 is less than 6000, being PA3=PA1/P, wherein PA1=$\rho$*N$^2$*d$^2$ wherein $\rho$ is the density of the composition to be atomized at the melting point under 1 bar absolute pressure measured in kg/m$^3$, N is the rotating speed of the atomizing disk in rad/s, d is the diameter of the atomizing disk in m and P is the pressure in the atomization chamber in Pa. [34] The method according to any of [1] to [33], wherein the composition to be atomized is over-heated at a temperature above their melting temperature. [35] The method according to any of [1] to [33], wherein the composition to be atomized is over-heated at a temperature at least 52° C. above their melting temperature (Tm). [36] The method according to any of [1] to [33], wherein the composition to be atomized is over-heated at a temperature at least 106° C. above their melting temperature (Tm). [37] The method according to any of [1] to [36], wherein the composition to be atomized is over-heated at a temperature which is below 396° C.+Tm, being Tm the melting temperature of the composition to be atomized in degree Celsius (° C.). [38] The method according to any of [1] to [36], wherein the composition to be atomized is over-heated at a temperature which is below 294° C.+Tm, being Tm the melting temperature of the composition to be atomized in degree Celsius (° C.). [39] The method according to any of [1] to [38], wherein the contact angle between the molten composition and the atomizing disk is above 76°. [40] The method according to any of [1] to [38], wherein the contact angle between the molten composition and the atomizing disk is above 96°. [41] The method according to any of [1] to [38], wherein the contact angle between the molten composition and the atomizing disk is above 106°. [42] The method according to any of [1] to [41], wherein the contact angle between the molten composition and the atomizing disk is smaller than 168°. [43] The method according to any of [1] to [41], wherein the contact angle between the molten composition and the atomizing disk is smaller than 158°. [44] The method according to any of [1] to [38], wherein the contact angle between the molten composition and the atomizing disk is between Cs and Ci, being Cs=185°−0.2*(T−Tm) and Ci=120°−0.2*(T−Tm), wherein T is the temperature of the molten composition to be atomized in degree Celsius (° C.) and Tm is the melting temperature of the composition to be atomized in degree Celsius (° C.). [45] The method according to any of [39] to [44], wherein the contact angle is measured according to the sessile drop method. [46] The method according to any of [1] to [45], wherein the surface tension between the molten composition and the surface of the atomizing disk is above 680 mN/m. [47] The method according to any of [1] to [45], wherein the surface tension between the molten composition and the surface of the atomizing disk is above 780 mN/m. [48] The method according to any of [1] to [47], wherein the surface tension between the molten composition and the surface of the atomizing disk is below 1750 mN/m. [49] The method according to any of [1] to [47], wherein the surface tension between the molten composition and the surface of the atomizing disk is below 1550 mN/m. [50] The method according to any of [1] to [45], wherein the surface tension between the molten composition and the surface of the atomizing disk, measured in mN/m, is between STs and STi, being STs=1450−0.8*(T−Tm) and STi=820−0.7*(T−Tm), wherein T is the temperature of the molten composition to be atomized in degree Celsius (° C.) and Tm is the melting temperature of the composition to be atomized in degree Celsius (° C.). [51] The method according to any of [46] to [50], wherein the surface tension is measured according to the sessile drop method. [52] The method according to any of [1] to [51], wherein the atomizing disk is made of a material comprising a ceramic. [53] The method according to any of [1] to [51], wherein the atomizing disk is ceramic. [54] The method according to any of [1] to [51], wherein the atomizing disk is made of a material comprising a titanate. [55] The method according to any of [1] to [51], wherein the atomizing disk is made of a material comprising a barium titanate. [56] The method according to any of [1] to [51], wherein the atomizing disk is made of a material comprising a barium titanate wherein barium is at least partially replaced by strontium. [57] The method according to any of [1] to [52], wherein the atomizing disk is made of a material comprising a metal. [58] The method according to any of [1] to [51], wherein the atomizing disk is metallic. [59] The method according to any of [1] to [52], wherein the atomizing disk is made of a material comprising an intermetallic. [60] The method according to any of [1] to [59], wherein the atomizing chamber comprises an atomizing disk and a shaft which are made in one piece. [61] The method according to any of [1] to [60], wherein the atomizing disk is at least partially coated. [62] The method according to any of [1] to [60], wherein the atomizing disk is coated. [63] The method according to any of [61] to [62], wherein the coating comprises a titanate. [64] The method according to any of [60] to [61], wherein the coating comprises barium titanate. [65] The method according to any of [61] to [62], wherein the coating comprises barium titanate wherein barium is at least partially replaced by strontium. [66] The method according to any of [61] to [65], wherein the thickness of the coating is 2.1 microns or more. [67] The method according to any of [61] to [65], wherein the thickness of the coating is 72.1 microns or more. [68] The method according to any of [61] to [67], wherein the thickness of the coating is less than 490 microns. [69] The method according to any of [61] to [67], wherein the thickness of the coating is less than 160 microns. [70] The method according to any of [61] to [69], wherein the coating comprises at least two layers. [71] The method according to [70], wherein the layers have different composition. [72] The method according to any of [70] to [71], wherein the first coating layer applied on the atomizing disk is a metallic coating layer. [73] The method according to any of [70] to [71], wherein the first coating layer applied on the atomizing disk is a ceramic coating layer. [74] The method according to any of [70] to [71], wherein the thickness of each coating layer is according to any of [68] to [69]. [75] The method according to any of [61] to [74], wherein the coating is applied by plasma spraying. [76] The method according to any of [6] to [75], wherein the atomizing disk is supported through a cage structure. [77] The method according to any of [1] to [76], wherein the composition comprising at least one metal provided in step a) is a composition comprising a metal-based alloy. [78] The method according to any of [1] to [76], wherein the composition comprising at least one metal provided in step a) is a composition comprising comprises an aluminium-based alloy. [79] The method according to any of [1] to [76], wherein the composition comprising at least one metal provided in step a) is a composition comprising an aluminium-based alloy. [80] The method according to any of [1] to [76], wherein the composition comprising at least one metal provided in step a) is a composition comprising a magnesium-based alloy. [81] The method according to any of [1] to [76], wherein the composition comprising at least one metal provided in step a) is a composition comprising a magnesium-based alloy. [82] The method according to any of [1] to [76], wherein the composition comprising at least one metal provided in step a) is a composition comprising a lithium-based alloy. [83] The method according to any of [1] to [76], wherein the composition comprising at least one metal provided in step a) is a composition comprising is a lithium-based alloy. [84] The method according to any of [1] to [76], wherein the composition comprising at least one metal provided in step a) is a composition comprising a copper-based alloy. [85] The method according to any of [1] to [76], wherein the composition comprising at least one metal provided in step a) is a composition comprising a copper-based alloy. [86] The method according to any of [1] to [76], wherein the composition comprising at least one metal provided in step a) is a composition comprising a germanium-based alloy. [87] The method according to any of [1] to [76], wherein the composition comprising at least one metal provided in step a) is a composition comprising a germanium-based alloy. [88] The method according to any of [1] to [76], wherein the composition comprising at least one metal provided in step a) is a composition comprising a silver-based alloy. [89] The method according to any of [1] to [76], wherein the composition comprising at least one metal provided in step a) is a composition comprising a silver-based alloy. [90] The method according to any of [1] to [76], wherein the composition comprising at least one metal provided in step a) is a composition comprising a gold-based alloy. [91] The method according to any of [1] to [76], wherein the composition comprising at least one metal provided in step a) is a composition comprising a gold-based alloy. [92] The method according to any of [77] to [91], wherein the alloy comprises at least one element selected form: % Mg, % Si and % Zn with a content between 0.3% by weight or more and 9.8% by weight or less. [93] The method according to any of [77] to [91], wherein the alloy comprises at least two elements selected form: % Mg, % Si and % Zn with a content between 0.3% by weight or more and 9.8% by weight or less. [94] The method according to any of [77] to [93], wherein the alloy comprises at least one element selected form: % Sc, % Zr, % Cu, % Mn and % Fe with a content between 0.002% by weight or more and 5.9% by weight or less. [95] The method according to any of any of [77] to [93], wherein the alloy comprises at least two elements selected form: % Sc, % Zr, % Cu, % Mn and % Fe with a content between 0.002% by weight or more and 5.9% by weight or less. [96] The method according to any of [77] to [93], wherein the alloy comprises at least three elements selected form: % Sc, % Zr, % Cu, % Mn and % Fe with a content between 0.002% by weight or more and 5.9% by weight or less. [97] The method according to any of [77] to [96], wherein the alloy comprises less than 94 ppm by weight of % K, % P and/or % Cr. [98] The method according to any of [77] to [97], wherein the alloy comprises less than 0.8 ppm by weight of % Sb and/or % Li. [99] The method according to any of [77] to [98], wherein the alloy comprises less than 590 ppm by weight of Na, Ga and/or Ca. [100] The method according to any of [77] to [99], wherein the alloy comprises less than 1.9% by weight of % Sr. [101] The method according to any of [1] to [38], wherein the contact angle between the molten composition and the atomizing disk is above 76°. [102] The method according to any of [1] to [38], wherein the contact angle between the molten composition and the atomizing disk is above 98°. [103] The method according to any of [1] to [38], wherein the contact angle between the molten composition and the atomizing disk is above 106°. [104] The method according to any of [1]

to [38] and [101] to [103], wherein the contact angle between the molten composition and the atomizing disk is smaller than 172°. [105] The method according to any of [1] to [38] and [101] to [103], wherein the contact angle between the molten composition and the atomizing disk is smaller than 156°. [106] The method according to any of [1] to [38] and [101] to [103], wherein the contact angle between the molten composition and the atomizing disk is between Cs and Ci, being Cs=185°−0.2*(T−Tm) and Ci=120−0.2*(T−Tm), wherein T is the temperature of the molten composition to be atomized in degree Celsius (° C.) and Tm is the melting temperature of the composition to be atomized in degree Celsius (° C.). [107] The method according to any of [101] to [106], wherein the contact angle is measured according to the sessile drop method. [108] The method according to any of [1] to [38] and [101] to [107], wherein the surface tension between the molten composition and the surface of the atomizing disk is above 810 mN/m. [109] The method according to any of [1] to [38] and [101] to [107], wherein the surface tension between the molten composition and the surface of the atomizing disk is above 910 mN/m. [110] The method according to any of [1] to [38] and [101] to [109], wherein the surface tension between the molten composition and the surface of the atomizing disk is below 2190 mN/m. [111] The method according to any of [1] to [38] and [101] to [109], wherein the surface tension between the molten composition and the surface of the atomizing disk is below 1990 mN/m. [112] The method according to any of [1] to [38] and [101] to [107], wherein the surface tension between the molten composition and the surface of the atomizing disk, measured in mN/m, is between STs and STi, being STs=1700−0.8*(T−Tm) and STi=1100−0.9*(T−Tm), wherein T is the temperature of the molten composition to be atomized in degree Celsius (° C.) and Tm is the melting temperature of the composition to be atomized in degree Celsius (° C.). [113] The method according to any of [108] to [112], wherein the surface tension is measured according to the sessile drop method. [114] The method according to any of [1] to [38] and [101] to [113], wherein the atomizing disk is made of a material comprising alumina ($Al_2O_3$). [115] The method according to any of [1] to [38] and [101] to [113], wherein the atomizing disk is made of alumina ($Al_2O_3$). [116] The method according to any of [1] to [38] and [101] to [113], wherein the atomizing disk is made of a material comprising aluminum nitride (AlN). [117] The method according to any of [1] to [38] and [101] to [113], wherein the atomizing disk is made of aluminum nitride (AlN). [118] The method according to any of [1] to [38] and [101] to [113], wherein the atomizing disk is made of a material comprising a stable oxide. [119] The method according to any of [1] to [38] and [101] to [113], wherein the atomizing disk is made of a material comprising a magnesium oxide (MgO). [120] The method according to any of [1] to [38] and [101] to [113], wherein the atomizing disk is made of a material comprising an oxide where the metal part acts with an oxidation number of III or more. [121] The method according to any of [1] to [38] and [101] to [113], wherein the atomizing disk is made of a material comprising as majority an oxide where the metal part acts with an oxidation number of III or more. [122] The method according to any of [1] to [38] and [101] to [113], wherein the atomizing disk is made of a material comprising an oxide where the metal part acts with an oxidation number of IV or more. [123] The method according to any of [1] to [38] and [101] to [113], wherein the atomizing disk is made of a material comprising as majority an oxide where the metal part acts with an oxidation number of IV or more. [124] The method according to any of [1] to [38] and [101] to [113], wherein the atomizing disk is made of a material comprising titanium oxide. [125] The method according to any of [1] to [38] and [101] to [113], wherein the atomizing disk is made of titanium oxide. [126] The method according to any of [124] to [125], wherein the oxygen content of the predominant phases identified as titanium oxide, wherein % Ti is above 50% by weight, is above 26% by weight. [127] The method according to any of [124] to [125], wherein the oxygen content of the predominant phases identified as titanium oxide, wherein % Ti is above 50% by weight, is below 39% by weight. [128] The method according to any of [1] to [38] and [101] to [113], wherein the atomizing disk is made of a material comprising TiN and the nitrogen content of the molten composition to be atomized is less than 1500 ppm by weight. [129] The method according to any of [1] to [38] and [101] to [113], wherein the atomizing disk is TiN and the nitrogen content of the molten composition to be atomized is less than 1500 ppm by weight. [130] The method according to any of [1] to [38] and [101] to [113], wherein the atomizing disk is made of a material comprising a metal. [131] The method according to any of [1] to [38] and [101] to [113], wherein the atomizing disk is metallic. [132] The method according to any of [1] to [38] and [101] to [113], wherein the atomizing disk is made of a material comprising an intermetallic. [133] The method according to any of any of [1] to [38] and [101] to [132], wherein the atomizing chamber comprises an atomizing disk and a shaft which are made in one piece. [134] The method according to any of [1] to [38] and [101] to [133], wherein the atomizing disk is at least partially coated. [135] The method according to any of [1] to [38] and [101] to [133], wherein the atomizing disk is coated. [136] The method according to any of [134] to [135], wherein the coating comprises alumina ($Al_2O_3$). [137] The method according to any of [134] to [135], wherein the coating is made of alumina ($Al_2O_3$). [138] The method according to any of [134] to [135], wherein the coating comprises aluminum nitride (AlN). [139] The method according to any of [134] to [135], wherein the coating is made of aluminum nitride (AlN). [140] The method according to any of [134] to [135], wherein the coating comprises a stable oxide. [141] The method according to any of [134] to [135], wherein the coating comprises a magnesium oxide (MgO). [142] The method according to any of [134] to [135], wherein the coating comprises an oxide where the metal part acts with an oxidation number of III or more. [143] The method according to any of [134] to [135], wherein the coating comprises as majority an oxide where the metal part acts with an oxidation number of III or more. [144] The method according to any of [134] to [135], wherein the coating comprises an oxide where the metal part acts with an oxidation number of IV or more. [145] The method according to any of [134] to [135], wherein the coating comprises as majority an oxide where the metal part acts with an oxidation number of IV or more. [146] The method according to any of [134] to [135], wherein the coating comprises titanium oxide. [147] The method according to any of [134] to [135], wherein the coating is made of a titanium oxide. [148] The method according to any of [146] to [147], wherein the oxygen content of the predominant phases identified as titanium oxide, wherein % Ti is above 50% by weight, is above 26% by weight. [149] The method according to any of [146] to [147], wherein the oxygen content of the predominant phases identified as titanium oxide, wherein % Ti is above 50% by weight, is below 39% by weight. [150] The method according to any of [134] to [135], wherein the coating comprises TiN and the nitrogen content of the molten composition to be atomized is less than 1500 ppm by weight. [151] The method according to any of [134] to [135], wherein the coating is made of TiN and the nitrogen content of the molten composition to be atomized is less than 1500 ppm by weight. [152] The method according to any of [134] to [135], wherein the coating comprises a metal. [153] The method according to any of [134] to [135], wherein the coating is metallic. [154] The method according to any of [134] to [135], wherein the coating comprises an intermetallic. [155] The method according to any of [134] to [154], wherein the thickness of the coating is 2.1 microns or more. [156] The method according to any of [134] to [154], wherein the thickness of the coating is 72.1 microns or more. [157] The method according to any of [134] to [156], wherein the thickness of the coating is less than 490 microns. [158] The method according to any of [134] to [156], wherein the thickness of the coating is less than 160 microns. [159] The method according to any of [134] to [158], wherein the coating comprises at least two layers. [160] The method according to [159], wherein the layers have different composition. [161] The method according to any of [159] to [160], wherein the first coating layer applied on the atomizing disk is a metallic coating layer. [162] The method according to any of [159] to [160], wherein the first coating layer applied on the atomizing disk is a ceramic coating layer. [163] The method according to any of [159] to [162], wherein the thickness of each layer is according to any of [157] to [158]. [164] The method according to any of [134] to [163], wherein the coating is applied by plasma spraying. [165] The method according to any of [101] to [164], wherein the atomizing disk is supported through a cage structure. [166] The method according to any of [1] to [165], wherein the composition comprising at least one metal provided in step a) is a composition comprising a metal-based alloy. [167] The method according to any of [1] to [38] and [101] to [165], wherein the composition comprising at least one metal provided in step a) is a composition comprising an iron-based alloy. [168] The method according to any of [1] to [38] and [101] to [165], wherein the composition comprising at least one metal provided in step a) is an iron-based alloy. [169] The method according to any of [1] to [38] and [101] to [165], wherein the composition comprising at least one metal provided in step a) is a composition comprising a magnesium-based alloy. [170] The method according to any of [1] to [38] and [101] to [165], wherein the composition comprising at least one metal provided in step a) is a magnesium-based alloy. [171] The method according to any of [1] to [38] and [101] to [165], wherein the composition comprising at least one metal provided in step a) is a composition comprising a lithium-based alloy. [172] The method according to any of [1] to [38] and [101] to [165], wherein the composition comprising at least one metal provided in step a) is a lithium-based alloy. [173] The method according to any of [1] to [38] and [101] to [165], wherein the composition comprising at least one metal provided in step a) is a composition comprising a copper-based alloy. [174] The method according to any of [1] to [38] and [101] to [165], wherein the composition comprising at least one metal provided in step a) is a copper-based alloy. [175] The method according to any of [1] to [38] and [101] to [165], wherein the composition comprising at least one metal provided in step a) is a composition comprising a nickel-based alloy. [176] The method according to any of [1] to [38] and [101] to [165], wherein the composition comprising at least one metal provided in step a) is a nickel-based alloy. [177] The method according to any of [1] to [38] and [101] to [165], wherein the composition comprising at least one metal provided in step a) is a composition comprising a cobalt-based alloy. [178] The method according to any of [1] to [38] and [101] to [165], wherein the composition comprising at least one metal provided in step a) is a cobalt-based alloy. [179] The method according to any of [1] to [38] and [101] to [165], wherein the composition comprising at least one metal provided in step a) is a composition comprising a titanium-based alloy. [180] The method according to any of [1] to [38] and [101] to [165], wherein the composition comprising at least one metal provided in step a) is a titanium-based alloy. [181] The method according to any of [101] to [180], wherein the alloy comprises at least 25 ppm by weight of % S. [182] The method according to any of [101] to [181], wherein the alloy comprises less than 400 ppm by weight of % S. [183] The method according to any of [101] to [182], wherein the alloy comprises at least 55 ppm by weight of % P. [184] The method according to any of [101] to [183], wherein the alloy comprises less than 400 ppm by weight of % P. [185] The method according to any of [101] to [184], wherein the alloy comprises at least 6 ppm by weight of % B. [186] The method according to any of [101] to [185], wherein the alloy comprises less than 400 ppm by weight of % B. [187] The method according to any of [101] to [186], wherein the alloy comprises less than 4.9% by weight of % C. [188] The method according to any of [101] to [187], wherein the alloy comprises the sum of % Mo+% Cr+% W+% V+% SI+% Mn above 10.5% by weight. [189] The method according to any of [101] to [188], wherein the alloy comprises the sum of % Cr+% Ta+% Hf above 10% by weight and % C is below 1.9% by weight. [190] The method according to any of [101] to [189], wherein the alloy comprises less than 6.29% by weight of % Si. [191] The method according to any of [101] to [190], wherein the alloy comprises less than 0.09% by weight of % Al. [192] The method according to any of [101] to [191], wherein the alloy comprises less than 0.09% by weight of % Ti. [193] The method according to any of [101] to [192], wherein the alloy comprises at least 0.0012% by weight of % Ti. [194] The method according to any of [1] to [193], wherein the oxygen content in the molten composition to be atomized is 790 ppm by weight or less. [195] The method according to any of [1] to [193], wherein the oxygen content in the molten composition to be atomized is 180 ppm by weight or less. [196] The method according to any of [1] to [195], wherein there is no direct contact of the molten composition with a liquid. [197] The method according to any of [1] to [195], wherein there is no direct contact of the molten composition with any liquid containing substance. [198] The method according to any of [1] to [195], wherein there is no direct contact of the molten composition with water. [199] The method according to any of [1] to [195], wherein there is no direct contact of the molten composition with a water-based fluid. [200] The method according to any of [1] to [199], wherein there is no direct contact of the produced powder with a liquid. [201] The method according to any of [1] to [199], wherein there is no direct contact of the produced powder with any liquid containing substance. [202] The method according to any of [1] to [199], wherein there is no direct contact of the produced powder with water. [203] The method according to any of [1] to [199], wherein there is no direct contact of the produced powder with a water-based fluid. [204] The method according to any of [1] to [203], wherein there is no contact of the molten composition with a cooling gas. [205] The method according to any of [1] to [195], wherein the atomizing disk is cooled. [206]

The method according to any of [1] to [195], wherein the atomizing chamber comprises cooling gas curtains. [207] The method according to any of [1] to [195], wherein a circulating gas is introduced in the atomization chamber during the atomization process. [208] The method according to [207], wherein the circulating gas is an inert gas. [209] The method according to any of [207] to [208], wherein the flow rate of the circulating gas is less than 990 m³/min. [210] The method according to any of [207] to [208], wherein the flow rate of the circulating gas is less than 98 m³/min. [211] The method according to any of [207] to [210], wherein the circulating gas is a cooling gas. [212] The method according to any of [207] to [211], wherein the circulating gas is a protective gas. [213] The method according to [212], wherein the protective gas is cooled through the contact with a cold wall. [214] The method according to [212], wherein the protective gas is cooled through the contact with a heat exchanger. [215] The method according to any of [1] to [214], wherein at least part of the gas within the chamber is forced to contact a cold element. [216] The method according to [215], wherein the part of the gas within the chamber which is forced to contact a cold element drops its temperature at least 2° C. [217] The method according to any of [215] to [216], wherein the part of the gas within the chamber which is forced to contact a cold element is at least 1.2 m³/min. [218] The method according to any of [1] to [195], wherein a gas is introduced in the atomization chamber during the atomization process. [219] The method according to [218], wherein the gas is a cooling gas. [220] The method according to any of [204] to [219], wherein the cooling gas is an inert gas. [221] The method according to [220], wherein the inert gas is helium. [222] The method according to [220], wherein the inert gas is argon. [223] The method according to [220], wherein the inert gas is nitrogen. [224] The method according to [220], wherein the inert gas is xenon. [225] The method according to [220], wherein the inert gas is kripton. [226] The method according to [220], wherein the inert gas is a gas which does not react with the molten composition to be atomized. [227] The method according to [220], wherein the inert gas is a mixture of more than one inert gas. [228] The method according to [220], wherein the inert gas is a mixture of at least 2 gases. [229] The method according to any of [1] to [228], wherein a gas is introduced for local cooling of the elements of the atomizing disk. [230] The method according to any of [207] to [229], wherein the gas comprises a mist with a liquid. [231] The method according to [230], wherein the mist comprises a lubrifiying fluid and/or particles. [232] The method according to [231], wherein the lubrifiying fluid is an oil. [233] The method according to any of [207] to [232], wherein the gas cools the bearings of the atomizing disk. [234] The method according to any of [207] to [233], wherein the gas cools the shaft of the atomizing disk. [235] The method according to any of [207] to [234], wherein the gas cools the atomizing disk. [236] The method according to any of [207] to [235], wherein the gas introduced is 0.12 m³/min or more. [237] The method according to any of [207] to [236], wherein the gas introduced is 98 m³/min or less. [238] The method according to any of [1] to [237], wherein the atomizing disk is externally cooled. [239] The method according to any of [1] to [238], wherein the radial stresses on the atomizing disk due to centrifugal forces are below 290 MPa. [240] The method according to any of [1] to [239], wherein the radial stresses on the atomizing disk due to centrifugal forces are above 14 MPa. [241] The method according to any of [76] to [240], wherein the cage comprises a metallic material. [242] The method according to any of [76] to [240], wherein the cage is a metallic structure. [243] The method according to any of [76] to [242], wherein the material of the cage has an elongation at breakage of 0.8% or more at the working temperature. [244] The method according to [243], wherein elongation at breakage is measured at the working temperature according to ASTM E21-17. [245] The method according to any of [241] to [244], wherein the atomizing disk is ceramic. [246] The method according to [245], wherein the stress on the ceramic atomizing disk at the ceramic atomizing disk-metallic structure interface, is kept below LFC*$\sigma_{creep}$ and above LSC*$\sigma_{creep}$ [247] The method according to [246], wherein LFC is 1. [248] The method according to [246], wherein LSC is 0.7. [249] The method according to any of [246] to [248], wherein $\sigma_{creep}$ is the creep resistance of the metallic material for 10 h at the stationary working temperature. [250] The method according to any of [246] to [248], wherein $\sigma_{creep}$ is the creep resistance of the metallic material for 10 h at 800° C. [251] The method according to any of [241] to [250], wherein $\sigma_{creep}$ of the metallic material at the working temperature is 12 MPa or more. [252] The method according to any of [246] to [251], wherein $\sigma_{creep}$ of the metallic material is measured according to ASTM E139-11(2018). [253] The method according to any of [246] to [251], wherein $\sigma_{creep}$ of the metallic material is measured according to ISO 204:2018(en). [254] The method according to any of [246] to [252], wherein the stress on the ceramic atomizing disk at the ceramic atomizing disk-metallic structure interface is determined through finite element simulation (FEM). [255] The method according to any of [246] to [253], wherein the stress on the ceramic atomizing disk at the ceramic atomizing disk-metallic structure interface is determined as: [$\varepsilon_0+(\alpha_{ceramic}-\alpha_{metal})*(T_{work}-295)*(E_{ceramic}+E_{metal})/2$], wherein co is the Initial interference due to tolerances in/1, $\alpha_{ceramic}$ is the mean thermal expansion coefficient of the ceramic from room temperature to $T_{work}$, $\alpha_{metal}$ is the mean thermal expansion coefficient of the metal from room temperature to $T_{work}$, $T_{work}$ is the stationary regime working temperature in Kelvin, $E_{ceramic}$, is mean elastic modulus of the ceramic from room temperature to $T_{work}$ and $E_{metal}$ is the mean elastic modulus of the metal from room temperature to $T_{work}$. [256] The method according to [255], wherein the elastic modulus of the ceramic is measured at room temperature according to ASTM C1161-18: [257] The method according to [255], wherein the elastic modulus of the ceramic is measured at $T_{work}$ according to ASTM C1211-18. [258] The method according to [255], wherein the thermal expansion coefficient is measured according to ASTM E831-14. [259] The method according to any of [244] and [251], wherein the working temperature is the temperature of the molten composition. [260] The method according to any of [244] and [251], wherein the working temperature is the temperature of the atomizing disk. [261] The method according to any of [1] to [260], wherein the temperature of the atomizing disk is the measured temperature. [262] The method according to any of [76] to [260], wherein the temperature of the atomizing disk is calculated using finite element simulation (FEM). [263] The method according to any of [1] to [260], wherein the temperature of the atomizing disk is Tm−25 (° C.), being Tm the melting temperature of the composition to be atomized. [264] The method according to any of [1] to [260], wherein the temperature of the atomizing disk is Tm+40 (° C.), being Tm the melting temperature of the composition to be atomized. [265] The method according to any of [249] to [258], wherein the stationary working temperature ($T_{work}$) is the temperature of the molten composition to be atomized in degrees Celsius (° C.). [266] The method according to any of [249] to [258], wherein stationary working temperature ($T_{work}$) is Tm−25 (° C.), being Tm the melting temperature of the composition to be atomized. [267] The method according to any of [249] to [258], wherein stationary working temperature (T) work, is Tm+40 (° C.), being Tm the melting temperature of the composition to be atomized. [268] The method according to any of [249] to [258], wherein the stationary working temperature is determined through finite element simulation (FEM). [269] The method according to any of [1] to [268], wherein the molten composition to be atomized comprises a solid fraction. [270] The method according to [269], wherein the solid fraction is below 39% by weight. [271] The method according to any of [269] to [270], wherein the solid fraction is above 0.01% by weight. [272] The method according to any of [1] to [271], wherein the atomizing disk is flat. [273] The method according to any of [1] to [271], wherein the atomizing disk is a cup. [274] The method according to any of [1] to [271], wherein the atomizing disk is a cone. [275] The method according to any of [1] to [271], wherein the atomizing disk is a bulk disk made of one piece. [276] The method according to any of [1] to [275], wherein the diameter of the atomizing disk is 36 mm or more. [277] The method according to any of [1] to [275], wherein the diameter of the atomizing disk is 56 mm or more. [278] The method according to any of [1] to [277], wherein the diameter of the atomizing disk is less than 690 mm. [279] The method according to any of [1] to [277], wherein the diameter of the atomizing disk is less than 490 mm. [280] The method according to any of [1] to [279], wherein the atomizing disk comprises protuberances. [281] The method according to any of [1] to [279], wherein at least part of the protuberances are axi-asymmetrical. [282] The method according to any of [1] to [279], wherein the atomizing disk comprises protuberances which are radially distributed. [283] The method according to [282], wherein the protuberances have a single curvature. [284] The method according to [282], wherein the protuberances have a double curvature. [285] The method according to [282], wherein the protuberances are straight radial protuberances. [286] The method according to [282], wherein the protuberances are backward-curved. [287] The method according to [282], wherein the protuberances are radially curved. [288] The method according to [282], wherein the protuberances are forward-curved. [289] The method according to any of [282] to [288], wherein the number of protuberances is greater than 2. [290] The method according to any of [280] to [289], wherein the protuberances are vanes. [291] The method according to any of [1] to [290], wherein the produced batch is a large production batch of 6 kg or more. [292] The method according to any of [1] to [290], wherein the produced batch is a very large production batch of 2100 kg or more. [293] The method according to any of [1] to [292], wherein the batch productivity is a large batch productivity of 32 kg/h or more. [294] The method according to any of [1] to [293], wherein the batch productivity is a large batch productivity of 19400 kg/h or less. [295] The method according to any of [1] to [294], wherein the surface of the atomizing disk is modified to alter the wetting behavior of the molten composition on the atomizing disk. [296] The method according to any of [1] to [295], wherein the surface of the atomizing disk is modified to increase wettability. [297] The method according to any of [1] to [295], wherein the surface of the atomizing disk is modified to a contact angle between the molten composition and the modified surface of the atomizing disk smaller than 89°. [298] The method according to any of [1] to [295], wherein the surface of the atomizing disk is modified to a contact angle between the molten composition and the modified surface of the atomizing disk greater than 95°. [299] The method according to any of [1] to [295], wherein the surface of the atomizing disk is modified to a contact angle hysteresis between the molten composition and the modified surface of the atomizing disk smaller than 25°. [300] The method according to [296], wherein the wettability is quantified by the contact angle between the liquid and the solid surface. [301] The method according to any of [295] to [299], wherein the modification of the surface of the atomizing disk comprises engraving with a pattern. [302] The method according to any of [295] to [299], wherein the modification of the surface of the atomizing disk is made by engraving with a pattern. [303] The method according to any of [295] to [299], wherein the modification of the surface of the atomizing disk comprises engraving with a random pattern. [304] The method according to any of [295] to [299], wherein the modification of the surface of the atomizing disk is made by engraving with a random pattern. [305] The method according to any of [295] to [299], wherein the modification of the surface of the atomizing disk comprises provide a texture to the surface of the atomizing disk. [306] The method according to [305], wherein the texture is provided through etching. [307] The method according to [305], wherein the texture is provided through the application of a coating. [308] The method according to [305], wherein the texture is provided with a laser source. [309] The method according to [305], wherein the texture is provided through an electron beam source. [310] The method according to [305], wherein the texture is provided through laser engraving. [311] The method according to any of [305] to [310], wherein the pitch of the texture pattern is 9 mm or less. [312] The method according to any of [305] to [310], wherein the pitch of the texture pattern is 190 microns or less. [313] The method according to any of [311] to [312], wherein the pitch of the texture pattern is the minimum distance between two adjacent topological relative extremes of the same sign. [314] The method according to [1] to [313], wherein the atomization chamber comprises at least one bearing. [315] The method according to [1] to [313], wherein the atomization chamber comprises bearings. [316] The method according to [1] to [315], wherein the atomization chamber comprises a shaft. [317] The method according to [316], wherein the distance of the bearings to the atomizing disk is 990 mm or less. [318] The method according to any of [315] to [317], wherein the bearings are at least one bearing. [319] The method according to any of [315] to [317], wherein the bearings are all the bearings on the shaft. [320] The method according to any of [315] to [317], wherein the bearings are the two bearings on the shaft closest to the atomizing disk. [321] The method according to any of [315] to [317], wherein the bearings refer to the bearing on the shaft closest to the atomizing disk. [322] The method according to any of [315] to [321], wherein the bearings have an angular contact of 12° or higher. [323] The method according to any of [315] to [321], wherein the bearings have an angular contact of 15.5° or higher. [324] The method according to any of [315] to [323], wherein the bearings have an angular contact of 34° or lower. [325] The method according to any of [315] to [323], wherein the bearings have an angular contact of 29° or lower. [326] The method according to any of [315] to [325], wherein the bearings have a progressive angular contact. [327] The method according to any of [315] to [325], wherein the bearings have a progressive angular contact with a reduction of the space between the outer and the inner diameter of the ring. [328] The method according to any of [315] to [327], wherein the bearings have an space between the outer and inner ring of 0.06 mm or more. [329] The method according to any of [315] to [328], wherein the bearings have a relative radial displacement between the outer and inner ring. [330] The method according to any of [315] to [329], wherein the bearings have a relative radial displacement between the outer and inner ring of 2.1 mm or more. [331] The method according any of [315] to [330], wherein the bearings comprise cylinders as rotating elements. [332] The method according to any of [315] to [331], wherein the bearings comprise balls as rotating elements. [333] The method according to any of [315] to [332], wherein the bearings comprise ceramic rotating elements. [334] The method according to any of [315] to [332], wherein the bearings comprise a high temperature performance metallic ring. [335] The method according to any of [315] to [332], wherein the bearings comprise a high temperature performance metallic outer ring. [336] The method according to any of [315] to [332], wherein a high temperature performance metallic material is a material having a high hardness after a long exposure to a high temperature. [337] The method according to [336], wherein a high hardness is 54 HRc or more. [338] The method according to any of [336] to [337], wherein the hardness is measured at room temperature according to ASTM E18-18a. [339] The method according to any of [336] to [337], wherein the hardness is measured at the working temperature according to ASTM E18-18a. [340] The method according to [339], wherein a long exposure is 35 min or more. [341] The method according to [339], wherein a high temperature is 85° C. or more. [342] The method according to any of [315] to [341], wherein the bearings comprise a high temperature exposure resistant lubricant. [343] The method according to any of [315] to [341], wherein the bearings comprise a lubricant with a high maximum working temperature. [344] The method according to [343], wherein the high maximum working temperature is 86° C. or more. [345] The method according to any of [315] to [344], wherein a lubricant is applied to the bearings. [346] The method according to any of [315] to [344], wherein a lubricant is continuously applied to the bearings. [347] The method according to any of [345] to [346], wherein the application of the lubricant comprises pulses of application and time elapses without application of new lubricant. [348] The method according to any of [315] to [347], wherein the outer ring of the bearings is flexible. [349] The method according to any of [315] to [348], wherein the inner ring of the bearings is out of working tolerance at room temperature but within working tolerance at the working temperature. [350] The method according to any of [315] to [349], wherein the shaft connecting the bearings and the atomizing disk comprise a low thermal conductivity material. [351] The method according to [350], wherein the low thermal conductivity material comprises a metal or a metallic alloy. [352] The method according to [350], wherein low thermal conductivity is 90 W/mK or less. [353] The method according to any of [350] to [352], wherein thermal conductivity is measured at room temperature according to ASTM E1461-13. [354] The method according to any of [350] to [352], wherein thermal conductivity is measured at the nominal working temperature according to ASTM E1461-13. [355] The method according to any of [315] to [354], wherein cooling is applied around the bearings. [356] The method according to any of [315] to [354], wherein cooling is applied directly to the shaft where the bearings are mounted. [357] The method according to any of [315] to [354], wherein cooling is applied directly to a constituent of the bearings. [358] The method according to any of [355] to [357], wherein the cooling media comprises a phase which changes upon contact with the surface to be cooled, wherein such phase change comprises evaporation and/or sublimation. [359] The method according to any of [1] to [358], wherein the oxygen content of the powder obtained is 490 ppm by weight or less. [360] The method according to any of [1] to [359], wherein the nitrogen content of the powder obtained is 490 ppm by weight or less. [361] The method according to any of [1] to [17], wherein the powder produced is an iron powder. [362] The method according to any of [1] to [17], wherein the powder produced is a powder of an alloy comprising iron. [363] The method according to any of [1] to [17], wherein the powder produced is a powder of an alloy wherein the majority component is iron. [364] The method according to any of [1] to [17], wherein the powder produced is an iron-based alloy powder. [365] The method according to any of [1] to [17], wherein the powder produced is a tool steel powder. [366] The method according to any of [1] to [17], wherein the powder produced is a hot work tool steel powder. [367] The method according to any of [1] to [17], wherein the powder produced is a titanium-based alloy powder. [368] The method according to any of [1] to [17], wherein the powder produced is a powder of an alloy comprising titanium. [369] The method according to any of [1] to [17], wherein the powder produced is a powder of an alloy wherein the majority component is titanium. [370] The method according to any of [1] to [17] and [21], wherein the powder produced is a nickel-based alloy powder. [371] The method according to any of [1] to [17] and [21], wherein the powder produced is a powder of an alloy comprising nickel. [372] The method according to any of [1] to [17] and [21], wherein the powder produced is a powder of an alloy wherein the majority component is nickel. [373] The method according to any of [1] to [18], wherein the powder produced is an aluminum-based alloy powder. [374] The method according to any of [1] to [18], wherein the powder produced is a powder of an alloy comprising aluminum. [375] The method constituent according to any of [1] to [18], wherein the powder produced is a powder of an alloy wherein the majority component is aluminum. [376] The method according to any of [1] to [17] and [19], wherein the powder produced is a magnesium-based alloy powder. [377] The method according to any of [1] to [17] and [19], wherein the powder produced is a powder of an alloy comprising magnesium. [378] The method constituent according to any of [1] to [17] and [19], wherein the powder produced is a powder of an alloy wherein the majority component is magnesium. [379] The method according to any of [1] to [17], wherein the powder produced is a lithium-based alloy powder. [380] The method according to any of [1] to [17], wherein the powder produced is a powder of an alloy comprising lithium. [381] The method according to any of [1] to [17], wherein the powder produced is a powder of an alloy wherein the majority component is lithium. [382] The method according to any of [1] to [17] and [23], wherein the powder produced is a copper-based alloy powder. [383] The method according to any of [1] to [17] and [23], wherein the powder produced is a powder of an alloy comprising copper. [384] The method according to any of [1] to [17] and [23], wherein the powder produced is a powder of an alloy wherein the majority component is copper. [385] The method according to any of [1] to [17] and [22], wherein the powder produced is a cobalt-based alloy powder. [386] The method of according to any of [1] to [17] and [22], wherein the powder produced is a powder of an alloy comprising cobalt. [387] The method according to any of [1] to [17] and [22], wherein the powder produced is a powder of an alloy wherein the majority component is cobalt. [388] The method according to any of [1] to [387], wherein vacuum is applied in the chamber once the metal has been molten and previous to atomization. [389] The method according to [388], wherein the vacuum applied is 0.9 millibar or higher. [390] The method according to any of [388] to [389], wherein after vacuum application the chamber is refilled with an inert atmosphere prior to the start of atomization. [391] The method according to [390], wherein the inert atmosphere comprises an inert gas. [392] The method according to any of [388] to [391], wherein at least two rinse cycles are made, achieving the vacuum level in each cycle and then refilling with the inert atmosphere gas. [393] The method according to any of [388] to [392], wherein in the intermediate risings a less expensive gas is used. [394] The method according to any of [388] to [389], wherein after vacuum application the chamber is refilled with a gas prior to the start of atomization. [395] The method according to [394], wherein the gas used in the refilling of the chamber after applying the vacuum has a content of 98 ppm by volume of oxygen or less. [396] The method according to [394], wherein the gas used in the refilling of the chamber after applying the vacuum has a content of 98 ppm by volume of nitrogen or less. [397] The method according to [394], wherein the gas used in the refilling of the chamber after applying the vacuum has a content of 4 ppm by volume of hydrogen or less. [398] The method according to any of [394] to [397], wherein at least two rinse cycles are made, achieving the vacuum level in each cycle and then refilling with the gas. [399] The method according to any of [394] to [398], wherein in the intermediate risings a less expensive gas is used. [400] The method according to any of [1] to [399], wherein the atomizing system used to atomize the composition comprises a melting chamber. [401] The method according to [400], wherein the melting chamber comprises at least one oxygen trap. [402] The method according to any of [1] to [401], wherein the atomization chamber comprises at least one oxygen trap. [403] The method according to any of [401] to [402], wherein the oxygen trap comprises a titanium alloy. [404] The method according to any of [401] to [403], wherein the oxygen trap comprises a magnesium alloy. [405] The method according to any of [401] to [404], wherein the oxygen trap comprises an aluminum alloy. [406] The method according to any of [401] to [405], wherein the oxygen trap comprises a silicon alloy. [407] The method according to any of [401] to [406], wherein the oxygen trap comprises a scandium alloy. [408] The method according to any of [401] to [407], wherein the oxygen trap comprises a zirconium alloy. [409] The method according to any of [401] to [408], wherein the oxygen trap comprises a hafnium alloy. [410] The method according to any of [401] to [409], wherein the oxygen trap comprises an alloy with a higher reactivity to oxygen than silicon according to the Ellihan diagram for the working conditions. [411] The method according to any of [401] to [410], wherein the oxygen trap is heated above 120° C. [412] The method according to any of [401] to [410], wherein the oxygen trap is heated above the sublimation temperature of the oxide of the alloy of the trap with the lowest oxide sublimation temperature. [413] The method according to any of [1] to [412], wherein the oxygen content in the atomization chamber is held below 280 ppm by volume before the atomization starts. [414] The method according to any of [1] to [413], wherein the oxygen content in the atomization chamber is between A1s*PA2 and A1i*PA2 measured in ppm by volume. [415] The method according to [414], wherein A1s is $4.4\ 10^{-5}$. [416] The method according to [414], wherein A1i is $9.2\ 10^{-7}$ [417] The method according to [1] to [413], wherein the oxygen content is held according to any of [414] to [416]. [418] The method according to any of [1] to [417], wherein the atmosphere of the chamber comprises nitrogen. [419] The method according to any of [1] to [418], wherein the nitrogen content in the atomization chamber is below 280 ppm by volume. [420] The method according to any of [1] to [417], wherein the nitrogen content in the atomization chamber is held according to [419] before the atomization starts. [421] The method according to any of [1] to [17], to manufacture a molybdenum alloyed steel powder. [422] The method according to [17] to obtain a molybdenum alloyed steel powder wherein % Cr is kept below 2.9% by weight. [423] The method according to any of [1] to [422], wherein the atmosphere in the chamber is modified to increase the surface tension between the molten composition and the atomizing disk. [424] The method according to [423], wherein the increase in the surface tension is at least 55 mN/m with respect to the surface tension in air. [425] The method according to any of [1] to [424], wherein the atomization chamber comprises a cooling liquid. [426] The method according to [425], wherein less than 0.9 l/s of cooling liquid comes in contact with the atomizing disk during the atomization process. [427] The method according to any of [1] to [425], wherein no cooling liquid comes in contact with the atomizing disk during the atomization process. [428] The method according to any of [1] to [427], wherein a gas is injected in the atomization chamber. [429] The method according to [428], wherein less than 9 m$^3$/s of the gas injected in the atomization chamber comes into contact with the atomized powder after leaving the atomizing disk during the atomization process. [430] The method according to any of [1] to [429], wherein the powder obtained has a sphericity of 78% or more. [431] The method according to any of [1] to [429], wherein the powder obtained has a sphericity of 86% or more. [432] The method according to any of [1] to [429], wherein the powder obtained has a sphericity of 97% or more. [433] The method according to any of [430] to [432], wherein sphericity is measured by light scattering diffraction. [434] The method according to any of [1] to [433], wherein the powder obtained has a porosity level of 38% by volume or less. [435] The method according to any of [1] to [433], wherein the powder obtained has a porosity level of 18% by volume or less. [436] The method according to any of [1] to [435], wherein the powder obtained has a $D_{50}$ of 780 microns or less. [436] The method according to any of [1] to [435], wherein the powder obtained has a $D_{50}$ of 380 microns or less. [438] The method according to any of [436] to [437], wherein $D_{50}$, refers to a particle size at which 50% of the sample's volume is comprised of smaller particles in the cumulative distribution of particle size and is measured by laser diffraction according to ISO 13320-2009. [439] The method according to any of [1] to [435], wherein the composition comprising at least one metal provided in step a) is an alloy with an affinity for oxygen higher than aluminum at room temperature in air according to Ellinham diagram. [440] The method according to any of [1] to [435], wherein the composition comprising at least one metal provided in step a) is an alloy which cuts the Y-axis of the Ellinham diagram at −210 Kcal or less. [441] The method according to any of [1] to [435], wherein the composition comprising at least one metal provided in step a) is an alloy having a density at normal conditions of 3.4 g/cm$^3$ or less. [442] The method according to any of [1] to [435], wherein the composition comprising at least one metal provided in step a) is a low melting point alloy having a melting point of 590° C. or less. [443] A lithium-based alloy powder obtained according to the method of any of [1] to [17]. [444] A lithium-based alloy powder obtained according to the method of any of [1] to [17], comprising 3.2% by weight or more % Mg. [445] A lithium-based alloy powder obtained according to the method of any of [1] to [17], comprising aluminum. [446] A lithium-based alloy powder obtained according to the method of any of [1] to [17], comprising 3.2% by weight or more % Al. [447] A lithium-based alloy powder according to any of [443] to [446], wherein the majority component is lithium. [448] A magnesium-based alloy powder obtained according to the method of any of [1] to [17]. [449] A magnesium-based alloy powder obtained according to the method of any of [1] to [17], comprising 3.2% by weight or more % Li. [450] A magnesium-based alloy powder according to any of [448] to [449], wherein the majority component is magnesium. [451] An aluminum-based alloy powder obtained according to the method of any of [1] to [18]. [452] An aluminum-based alloy powder obtained according to the method of any of [1] to [18], comprising 3.2% by weight or more % Li. [453] A gallium-based alloy powder obtained according to the method of any of [1] to [17]. [454] A gallium-based alloy powder obtained according to the method of any of [1] to [17], comprising 3.2% by weight or more of a mating metal (% MM). [455] A gallium-based alloy according to [454], wherein the MM is aluminium. [456] A gallium-based alloy according to [454], wherein the MM is nickel. [457] A gallium-based alloy according to [454], wherein the MM is titanium. [458] A gallium-based alloy according to [454], wherein the MM is iron. [459] A gallium-based alloy according to [454], wherein the MM is cobalt. [460] A gallium-based alloy powder according to any of [453] to [459], wherein the majority component is Gallium. [461] An aluminum-based alloy powder obtained according to the method of any of [1] to [17], comprising gallium. [462] An aluminum-based alloy powder obtained according to the method of any of [1] to [17], comprising 3.2% by weight or more % Ga. [463] An aluminium-based alloy powder according to any of [461] to [462], wherein the majority component is aluminium. [464] A titanium-based alloy powder obtained according to the method of any of [1] to [17], comprising gallium. [465] A titanium-based alloy powder obtained according to the method of any of [1] to [17], comprising 3.2% by weight or more % Ga. [466] A titanium-based alloy powder according to any of [464] to [465], wherein the majority component is titanium. [467] An iron-based alloy powder obtained according to the method of any of [1] to [17] and [20], comprising gallium. [468] An iron-based alloy powder obtained according to the method of any of [1] to [17] and [20], comprising 3.2% by weight or more % Ga. [469] An iron-based alloy powder according to any of [467] to [468], wherein the majority component is iron. [470] A nickel-based alloy powder obtained according to the method of any of [1] to [17] and [19], comprising gallium. [471] A nickel-based alloy powder obtained according to the method of any of [1] to [17] and [21], comprising 3.2% by weight or more % Ga. [472] A nickel alloy powder according to any of [470] to [471], wherein the majority component is nickel. [473] A cobalt-based alloy powder obtained according to the method of any of [1] to [17] and [22] comprising gallium. [474] A cobalt-based alloy powder obtained according to the method of any of [1] to [17] and [22], comprising 3.2% by weight or more % Ga. [475] A cobalt alloy according to any of [473] to [474], wherein the majority component is cobalt. [476] Use of the method according to the method of any of [1] to [475], to produce a powder. [477] A molybdenum alloyed steel powder obtained according to the method of any of [1] to [17], wherein % Cr is kept below 2.9% by weight. [478] The method according to any of [255], [256], [338], [349], [353] and [439], wherein room temperature is 23±2° C. [479] The method according to any of [1] to [435] and [439] to [478], wherein the powder obtained is a particulate material. [480] The method according to [479], wherein a particulate material is a powder with a diameter of less than 1000 microns. [481] The method according to any of [19] to [23], [34] to [38], [44], [50], [106], [112], [128], [129], [150], [151], [194], [195], [226], [263] to [267] and [269], wherein the composition to be atomized is the composition comprising at least one metal provided in step a). [482] The method according to any of [60], [133], [234], [316], [319], [320], [321], [350] and [356] wherein the shaft is the main shaft. [484] The method according to any of [1] to [483], wherein the atomizing disk is the atomizing rotating element. [485] The method according to any of [369] to [484], wherein the majority component is the component with the higher weight percentage.

Any embodiment disclosed in this document can be combined with any other embodiment in any combination provided they are not mutually exclusive.

EXAMPLES

Example 1

Figure 3:
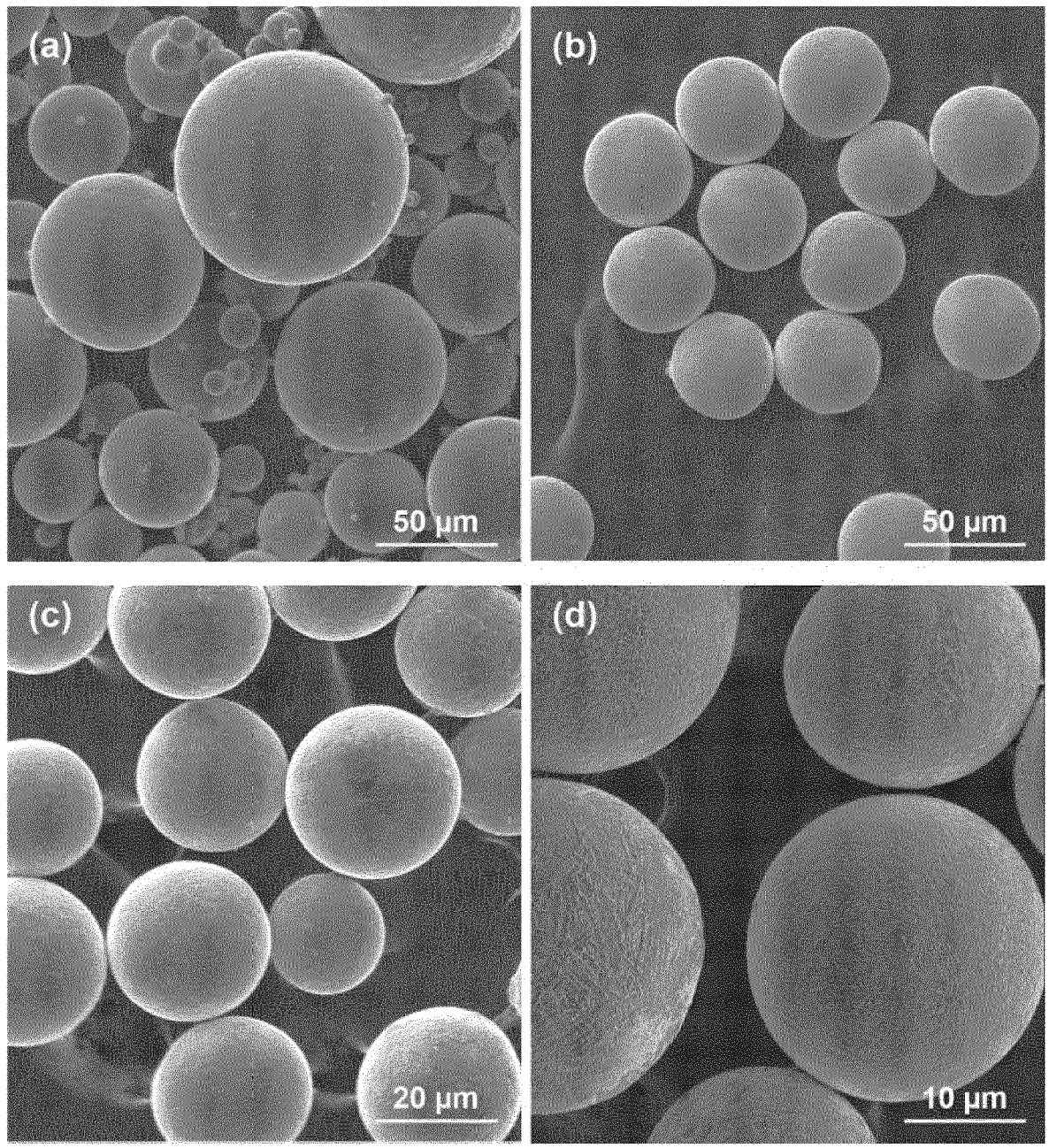
FIG. 3: Scanning electron micrographs (SEM) of several atomized powders obtained under the described atomization method: (a) aluminum-based alloy, (b) tin-based alloy, (c) iron-based alloy and (d) detail of surface aspect (dendritic microstructure) for a tool steel.

A setup like the one depicted in FIG. 2 was manufactured with the metallic structure surrounding the disk (2) made of the molybdenum alloy TZM, the disk (1) made of $Ti_2O_3$ and the shaft made of a nickel alloy (Inconel 718). The disk had a radius of 80 mm. Both the cylindrical part of the disk and the corresponding cylindrical parts of the metallic structure in contact with the disk, were N1 polished prior to assembling. The assembling tolerance was H7 to G8. The mean stationary regime working temperature at the ceramic-metallic structure interface was evaluated to be 1420° C. The setup was used to atomize an iron-based alloy with the following composition (weight %): % Mn=0.92%; % Mo=3.02%; % V=0.46%; % P=0.005%; % S=0.0008%; rest % Fe and trace elements. The atomization was made at 38000 rpm in a 9 bar Ar atmosphere with an oxygen content of 18 ppm by volume. 6400 kg of powder with a $D_{50}$ of 26 microns were obtained in 1 h and 58 minutes. FIG. 3(c) shows a scanning electron micrograph (SEM) of the iron-based alloy powder obtained using the above disclosed atomization parameters.

Example 2

Figure 5:
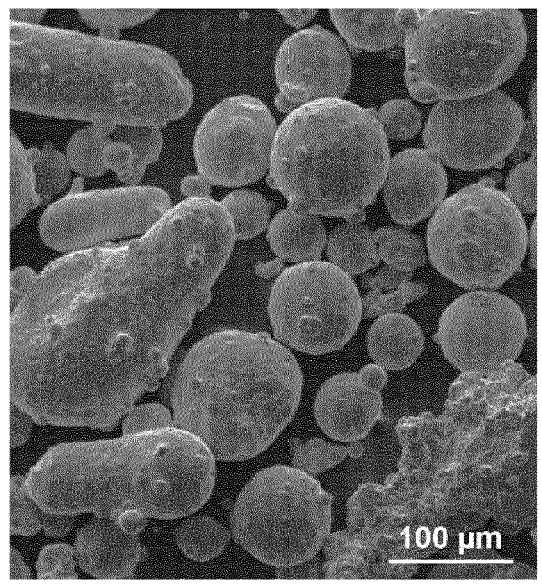
FIG. 5: Scanning electron micrograph (SEM) of iron-based alloy powder atomized according to Example 2. The figure shows the appearance of the atomized particles where great presence of non-spherical-shape particles can be noticed.

For comparative purposes a similar setup like the one described in Example 1 was used to atomize the aforementioned iron-based alloy. However in this case the atomization was made using an 80 mm diameter atomizing disk operating at 18500 rpm in a 1.1 bar Ar atmosphere with PA2 values of $2.9 \cdot 10^6$. The obtained powder had a characteristic size $D_{50}$ of 97 microns. FIG. 5 shows a scanning electron micrograph (SEM) of the iron-based alloy powder obtained using the above disclosed atomization parameters. As can be seen in FIG. 5 the produced powder exhibits great presence of satellites attached to the main particle and collided/crushed particles. The presence of these particles makes the powder difficult to classify and separate.

Example 3

A setup like the one depicted in FIG. 2 was manufactured with the metallic structure surrounding the disk (2) made of the molybdenum alloy TZM, the disk (1) made of alumina and the shaft made of a nickel alloy (Inconel 718). The disk had a radius of 80 mm. Both the cylindrical part of the disk and the corresponding cylindrical parts of the metallic structure in contact with the disk, were N1 polished prior to assembling. The assembling tolerance was H7 to G8. The mean stationary regime working temperature at the ceramic-metallic structure interface was evaluated to be 730° C. The setup was used to atomize a scandium containing aluminum alloy with the following composition (weight %): % Mg=4.6; % Sc=0.78; % Zr=0.4%; % Mn=0.5% by weight; % Si=0.3%; % Fe=0.2%, rest % Al and trace elements. The atomization was made at 28000 rpm in a 6 bar Ar atmosphere with an oxygen content of 0.5 ppm by volume. 2200 kg of powder with a $D_{50}$ of 48 microns were obtained in 1 h and 46 minutes.

Example 4

A setup like the one depicted in FIG. 4(c) was manufactured with the metallic structure surrounding the disk (2) made of the molybdenum alloy TZM, the disk (1) made of $Al_2O_3$ comprising vanes and the shaft made of a Ni-based alloy (Inconel 718). The disk had a radius of 50 mm. Both the cylindrical part of the disk and the corresponding cylindrical parts of the metallic structure in contact with the disk, were N1 polished prior to mounting. The mounting tolerance was H7 to G8. The setup was used to process through atomization an aluminum alloy with the following composition (weight %): % Si=9.4; % Fe=0.3; % Cu=0.03; % Mn=0.3; % Mg=0.3; % Zn=0.06; rest % Al and trace elements. The atomization was carry out at an angular rotational speed of 42000 rpm using a disk with vanes in a nitrogen atmosphere with a oxygen content of less than 3.0 ppm by volume at 1.6 bar. 590 kg/h of powder with a $D_{50}$ of 69 microns was obtained.

Example 5

A magnesium-based alloy was atomized in an using a ceramic disk and metallic shaft as atomizing element like the one depicted in FIG. 4(a). The atomizing system included two bearings with ceramic rotating elements and an angular contact of 25°. A cooling gas was introduced in the atomization chamber during atomization with a flow rate of 0.39 m³/min for cooling the atomizing system. 360 kg/h of powder with a $D_{50}$ of 32 microns was obtained.

Example 6

An aluminum-based alloy was atomized using a monolithic disk and shaft made of a stainless steel (AISI 304) like the one depicted in FIG. 4(b). The disk was coated with a titanate. The aluminium alloy was melted and atomized in a mixed argon and nitrogen atmosphere at an angular rotational speed of 28000 rpm, to obtain a fine powder with a $D_{50}$ of 56 microns. FIG. 3(a) shows a scanning electron micrograph (SEM) of the aluminum-based alloy powder obtained using the above disclosed atomization parameters.

Example 7

A metal-based alloy was atomized in an atomizing system including two bearings with an angular contact of 31°. The hardness of the metallic ring of the bearing was measured after being exposed to 103° C. for 50 min. The measurement was made at 24° C. according to ASTM E18-18a, obtaining a hardness of 56 HRc. 425 kg/h of powder with a $D_{50}$ of 39 microns were obtained.

Example 8

A tool steel employed in high demanding cold work applications was manufactured by means of a metallic disk and shaft made of a Ni-based alloy (Inconel 718). The disk was coated using a multiple-layer coating (2 layers), the first layer consisting of a metal (NiCrAlY) with a thickness of 96 microns and a top ceramic layer (mix of Zr—Y oxides) with a thickness of 385 microns. The coating layers were applied through thermal spraying with a finishing roughness of 5 microns. The pressure in the atomization chamber was 3.8 bar. A fine tool steel powder with a $D_{50}$ of 42 microns was obtained. FIG. 3(d) shows a scanning electron micrograph (SEM) of the tool steel powder obtained using the above disclosed atomization parameters.

Example 9

A CoCrMo superalloy with the following composition (weight %): % Co=62.1; % Cr=28.9; % Mo=6.4; % Si=0.7; % Mn=0.5; % Fe=0.4; and trace elements was atomized using a setup like the one depicted in FIG. 4(c). In this case the metallic structure surrounding the disk (2) was manufactured using a molybdenum-based alloy and the shaft was made of a refractory superalloy. The assembly conditions were similar to those described in Examples 1, 3 and 4. The atomization was carried out using a ceramic disk (TiN) with protuberances in a closed atomization chamber operating at 2.6 bar. The obtained powder had a sphericity value of 98.2%.

Example 10

A tin-based solder alloy was successfully manufactured and processed through a metallic disk with a diameter of 215 mm. The composition to be atomized was over-heated at a temperature of 206° C. above the melting temperature of such composition. The surface tension value between the liquid alloy and the disk was 790 mN/m. The surface tension value between the liquid alloy and the disk was obtained using the sessile drop method, according to method described in the following references ISIJ Int., 55(2015), starting page: 1642 (by C. J. Xuan, H. Shibata, Z. Zhao, P. G. Jönsson and K. Nakajima) and ISIJ Int., 55(2015), starting page: 1882 (by C. J. Xuan, H. Shibata, S. Sukenaga, P. G. Jönsson and K. Nakajima). The stabilized surface tension value obtained was the first measurement where the surface tension suffers a variation smaller than the threshold (50 mN/m) within the following 100 seconds after its recording. Resulting in a characteristic powder size $D_{50}$ of 39 microns. FIG. 3(b) shows a scanning electron micrograph (SEM) of the tin-based solder alloy obtained using the above disclosed atomization parameters.

Example 11

A metallic disk and shaft made of a refractory steel alloy was used to process through atomization a copper-based alloy. The disk was coated with a ceramic in order to protect the disk. The copper-based alloy was over-heated 135° C. above the melting temperature (Tm=994° C.). The atomization was carried out in an atomization chamber equipped with an oxygen trap comprising a titanium alloy, to maintain the oxygen content below 0.7 ppm by volume during atomization. The obtained powder had an sphericity above 92%.

Example 12

The following Table 1 has been checked for the proper contact angle's measurement (contact angle between the molten metal and the disk material above 106° and below 168°) for a given disk material and a given molten material:

TABLE 1

Disk material and molten metal compositions.

| Disk material | Molten metal |
|---|---|
| $Al_2O_3$ | Al-based alloy |
| $Al_2O_3$ | Fe-based alloy |
| TiN | Fe-based alloy |
| $ZrO_2$ | Al-based alloy |
| $ZrO_2$ | Fe-based alloy |
| $Ti_2O_3$ | Fe-based alloy |
| MgO | Fe-based alloy |
| $Y_2O_3$ | Ti-based alloy |
| $Y_2O_3$—MgO—$SiO_2$ | Ti—Al-based alloy |
| TiB | Al-based alloy |
| Cu | Sn—Ag-based alloy |
| Ni | Sn—Cu-based alloy |
| Steel | Sn-based alloy |
| W | Ni-based alloy |
| AlN | Al-based alloy |

The contact angle values between the molten metal and the disk were obtained using the sessile drop method, according to method described in the following references ISIJ Int., 55(2015), starting page: 1642 (by C. J. Xuan, H. Shibata, Z. Zhao, P. G. Jönsson and K. Nakajima) and ISIJ Int., 55(2015), starting page: 1882 (by C. J. Xuan, H. Shibata, S. Sukenaga, P. G. Jönsson and K. Nakajima). The measured contact angle was the stabilized value obtained after 500 seconds counting from the instant of full melting.

Example 13

The following Table 2 has been checked for the surface tension (surface tension between the molten metal and the disk material above 780 mN/m and below 1750 mN/m) for a given disk material and a given molten material:

TABLE 2

Disk material and molten metal compositions.

| Disk material | Molten metal |
|---|---|
| $Al_2O_3$ | Ni-based alloy |
| TiN | Fe-based alloy |
| $ZrO_2$ | Ti-based alloy |
| $Ti_2O_3$ | Fe-based alloy |
| MgO | Al-based alloy |
| $Y_2O_3$ | Ti-based alloy |
| $Y_2O_3$—MgO—$SiO_2$ | Al-based alloy |
| TiB | Al-based alloy |
| Cu | Ag-based alloy |
| Ni | Cu-based alloy |
| Steel | Sn—Ag-based alloy |
| W | Mo-based alloy |
| AlN | Al-based alloy |

The surface tension values between the molten metal and the disk were obtained using the sessile drop method, according to method described in the following references ISIJ Int., 55(2015), starting page: 1642 (by C. J. Xuan, H. Shibata, Z. Zhao, P. G. Jönsson and K. Nakajima) and ISIJ Int., 55(2015), starting page: 1882 (by C. J. Xuan, H. Shibata, S. Sukenaga, P. G. Jönsson and K. Nakajima). The stabilized surface tension value obtained was the first measurement where the surface tension suffers a variation smaller than the threshold (50 mN/m) within the following 100 seconds after its recording.

Example 14

The following compositions disclosed in Table 3 have been checked for the proper atomization of fine ($D_{50}$<75 µm) spherical powder (sphericity above 94%), in an inert atmosphere with an oxygen content between 0.8 ppm and 18 ppm by volume and a parameter PA2 greater than $4.5 \cdot 10^6$ and below $70 \cdot 10^6$ at an absolute pressure in the atomization chamber between 1.2 bar and 29.6 bar.

TABLE 3

| | Compositions (weight %). | | | | | | | | | | | |
|---|---|---|---|---|---|---|---|---|---|---|---|---|
| Alloy | % C | % Si | % Mn | % P | % S | % Fe | % Mo | % W | % Al | % Co | % Nb | % Ti |
| 1 | 0.05 | | | | | 0.1 | | | 5.6 | | | Bal* |
| 2 | 0.06 | | | | | 0.2 | | | 5.9 | | 7.0 | Bal* |
| 3 | 0.09 | 0.03 | 0.4 | 0.01 | 0.01 | 4.9 | 8.6 | 0.1 | 0.01 | 0.2 | 3.2 | 0.3 |
| 4 | 0.05 | 0.4 | | | | 18.6 | 9.2 | 0.8 | 1.7 | | | |
| 5 | 0.003 | 0.8 | 0.4 | 0.01 | 0.003 | Bal* | 7.2 | | 0.03 | | | |
| 6 | 0.07 | 1.9 | 1.1 | 0.01 | 0.003 | Bal* | | | 0.03 | | 0.8 | 0.01 |
| 7 | 1.11 | 1.23 | 0.3 | 0.022 | 0.012 | Bal* | 1.58 | 1.34 | 0.1 | | | |
| 8 | 0.32 | 0.07 | 0.08 | 0.004 | 0.001 | Bal* | 3.23 | 1.8 | 0.007 | 0.007 | 0.005 | 0.001 |
| 9 | 0.01 | 0.07 | 0.02 | 0.005 | 0.0008 | Bal* | 3.71 | | 0.09 | 12.75 | | 1.9 |
| 10 | | | | | | 3.5 | | | 10.5 | | | |
| 11 | 0.015 | 0.7 | 1.40 | 0.02 | | Bal* | 2.59 | | 0.06 | | | |
| 12 | 0.016 | 0.64 | 1.42 | 0.02 | | Bal* | 2.41 | | 0.08 | | | |
| 13 | 0.014 | 0.7 | 1.36 | 0.03 | | Bal* | 2.36 | | 0.06 | | | |
| 14 | 0.015 | 0.62 | 1.41 | 0.02 | | Bal* | 2.41 | | 0.07 | | | |
| 15 | 0.015 | 0.7 | 1.44 | 0.04 | | Bal* | 2.66 | | 0.06 | | | |
| 16** | <0.03 | <1 | 0.6-2.1 | <0.045 | | Bal* | 2-2.5 | | <0.15 | | | |
| 17** | 0.32-0.45 | 0.8-1.20 | 0.2-0.50 | | | Bal* | 1.10-1.75 | | | | | |
| 18 | 0.29 | 0.96 | 0.43 | | | Bal* | 1.62 | | | | | |
| 19 | 0.48 | 1.10 | 0.38 | | | Bal* | 1.18 | | | | | |
| 20 | 0.07 | 1.0 | 1.0 | 0.04 | 0.03 | Bal* | | | | | | |

TABLE 3-continued

| | Compositions (weight %). | | | | | | | | | | | |
|---|---|---|---|---|---|---|---|---|---|---|---|---|
| 21 | 0.07 | 1.1 | 1.06 | 0.04 | 0.02 | Bal* | | | | | | |
| 22 | | | | | | | | | | | | |
| 23** | ≤0.03 | ≤0.1 | ≤0.1 | ≤0.01 | ≤0.01 | Bal* | 4.5-5.2 | | 0.05-0.15 | 8.5-9.5 | 0.6-0.8 | |
| 24 | 0.03 | 0.12 | 0.04 | 0.03 | 0.02 | Bal* | 4.6 | | 0.12 | 8.7 | 0.66 | |
| 25** | | 12.0 | ≤0.35 | | | ≤0.55 | | | Bal* | | ≤0.2 | |
| 26 | | 12.4 | 0.38 | | | 0.42 | | | Bal* | | 0.10 | |
| 27 | | 10.64 | 0.41 | | | 0.36 | | | Bal* | | 0.26 | |
| 28** | | 9.0-11.0 | ≤0.45 | | | ≤0.55 | | | Bal* | | ≤0.15 | |
| 29 | | 7.8 | 0.32 | | | 0.41 | | | Bal* | | 0.12 | |
| 30 | | | | | | | | | | | | |
| 31 | | | | | | | | | | | | |
| 32 | | | | | | | | | | | | |
| 33 | | | | | | | | | | | | |
| 34 | | | | | | | | | | | | |
| 35 | | | | | | | | | | | | |
| 36** | | | | | | | | | | | | |
| 37 | | 0.17 | 0.51 | | | 0.068 | | | Bal* | | 0.006 | |
| 38 | | 0.18 | 0.52 | | | 0.066 | | | Bal* | | 0.006 | |
| 39 | 0.4 | 2.8 | | | | 2.0 | | | | | | |
| 40 | 0.38 | 2.6 | | | | 2.2 | | | | | | |
| 41 | 0.42 | 2.9 | | | | 2.1 | | | | | | |
| 42** | 0.36-0.44 | 2.2-3.0 | | | | 1.9-2.2 | | | | | | |
| 43 | | | | | | | | | | | | |
| 44 | | | | | | | | | | | | |
| 45 | | | | | | | | | | | | |
| 46 | | | | | | | | | | | | |
| 47 | | | | | | | | | | | | |
| 48 | | | | | | 2.6 | | | 10.1 | | | |
| 49 | | | | | | 3.4 | | | 10.7 | | | |
| 50 | | | | | | 2.9 | | | 10.2 | | | |
| 51 | | | | | | 3.8 | | | 10.6 | | | |
| 52 | 0.09 | 0.04 | 0.3 | 0.02 | 0.01 | 4.9 | 8.6 | 0.1 | 0.02 | 0.2 | 3.4 | 0.3 |
| 53** | | 0.10 | 0.20-0.6 | | | 0.15 | | | Bal* | | 0.15 | |
| 54** | | 0.06 | 0.45-0.8 | | | 0.10 | | | Bal* | | 0.06 | |
| 55 | | 12.1 | 0.36 | | | 0.42 | | | Bal* | | 0.10 | |
| 56 | | 10.76 | 0.42 | | | 0.36 | | | Bal* | | 0.26 | |
| 57 | | 7.9 | 0.39 | | | 0.42 | | | Bal* | | 0.12 | |
| 58 | | 7.6 | 0.33 | 92 ppm | | 0.48 | | | Bal* | | 0.14 | |
| 59** | | 12.0 | ≤0.35 | | | ≤1.8 | | | Bal* | | ≤0.2 | |
| 60 | | | | | | | | | | 24.3 | Bal* | |
| 61 | | 0.32 | | | | | 3.4 | | 6.5 | | Bal* | |
| 62 | | | | | | | | | | 24.2 | Bal* | |
| 63 | | 0.30 | | | | | 3.5 | | 6.8 | | Bal* | |
| 64 | | 0.34 | | | | | 3.4 | | 6.4 | | Bal* | |
| 65** | | 0.22-0.3 | | | | | ≤3.2 | | 4.8-6.2 | | Bal* | |
| 66** | | <2.6 | | | | <1.2 | | | | | | |
| 67** | | <1.4 | | | | <0.9 | | | | | | |
| 68 | | 14.2 | 0.34 | | | 0.40 | | | Bal* | | 0.11 | |
| 69 | | 0.05 | | | | 0.09 | | | Bal* | | 0.01 | |
| 30 | | 0.04 | | | | 0.009 | | | Bal* | | 0.02 | |
| 71 | 0.38 | 0.91 | 0.48 | 0.02 | 0.02 | Bal* | 1.29 | | | | | |
| 72 | 1.11 | 1.21 | 0.22 | 0.022 | 0.018 | Bal* | 1.48 | 1.3 | | 0.1 | | |
| 73** | <0.35 | <1.0 | <1.0 | <0.02 | <0.01 | <0.75 | 5.0-7.0 | <0.2 | <0.1 | Bal* | <0.1 | |
| 74 | 0.46 | 0.24 | 0.86 | 0.001 | | 0.61 | 5.84 | 0.12 | 0.03 | Bal* | | |
| 75 | 0.31 | 0.88 | 0.24 | 0.008 | 0.001 | 0.84 | 6.24 | 0.2 | 0.06 | Bal* | 0.03 | |
| 76 | | | | | | | | | 36.0 | | | |
| 77 | | | | | | | | | 14.8 | | | |
| 78** | | | | | | | | | 38.0-46.0 | | | |
| 79 | | | | | | | | | 24.0 | | | |
| 80 | | | | | | | | | 0.05 | 0.15 | | |
| 81 | | 0.33 | | | | | | | | 0.33 | | |
| 82 | | | | | | | | | | | | |
| 83 | | | | | | | | | | | | |
| 84 | | | | | | | | | | | | |
| 85 | | | | | | | | | | | | |
| 86 | | | | | | 3.92 | | | | | 3.3 | |
| 87 | | | | | | | | | 0.008 | | | |

TABLE 3-continued

Compositions (weight %).

| Alloy | % V | % Mg | % Nb + % Ta | % Cr | % Ni | % Cu | % Sn | % O | % N | % Zn | % Others |
|---|---|---|---|---|---|---|---|---|---|---|---|
| 1 | 3.9 | | | | | | | 0.09 | 0.05 | | |
| 2 | | 0.2 | | | | | | 0.01 | 0.05 | | %Ta: 0.2 |
| 3 | | | | 21.5 | Bal* | | | | | | |
| 4 | | | | 21.7 | Bal* | | | 0.02 | | | |
| 5 | | | | 52.1 | 37.2 | | | 0.21 | 0.17 | | |
| 6 | | | | 49.5 | 13.8 | 12.5 | | 0.20 | 0.07 | | |
| 7 | 2.41 | | | 7.57 | 0.17 | 0.11 | | 0.01 | 0.09 | | |
| 8 | 0.006 | | | 0.03 | 0.02 | 0.04 | | | | | |
| 9 | | | | | 17.7 | | | | | | |
| 10 | | | | | | Bal* | 0.3 | | | | |
| 11 | | | | 16.2 | 13.66 | 0.03 | | 0.061 | 0.086 | | |
| 12 | | | | 16.1 | 13.46 | 0.02 | | 0.064 | 0.089 | | |
| 13 | | | | 15.9 | 13.66 | 0.03 | | 0.061 | 0.082 | | |
| 14 | | | | 18.6 | 9.4 | 0.01 | | 0.062 | 0.089 | | |
| 15 | | | | 18.9 | 13.61 | 0.04 | | 0.061 | 0.089 | | |
| 16** | | | | 16.5-18.5 | 10.0-13.0 | <0.5 | | <0.11 | <0.11 | | |
| 17** | 0.8-1.20 | | | 4.75-5.50 | | | | | | | |
| 18 | 0.94 | | | 4.94 | | | | | | | |
| 19 | 0.88 | | | 5.24 | | | | | | | |
| 20 | | | 0.45 | 17.5 | 5.0 | 3.5 | | | | | |
| 21 | | | 0.42 | 17.6 | 5.1 | 3.4 | | | | | |
| 22 | | | 0.15 | 15.0 | 3.0 | 3.0 | | | | | |
| 23** | | | | ≤0.5 | | ≤0.5 | | | | | |
| 24 | | | | 0.42 | | 0.36 | | | | | |
| 25** | | | | | | ≤0.05 | | | | ≤0.15 | |
| 26 | | | | | | 0.02 | | | | 0.09 | |
| 27 | | | | | | 0.03 | | | | 0.1 | |
| 28** | | | | | ≤0.05 | ≤0.05 | ≤0.05 | | | ≤0.10 | |
| 29 | | | | | 0.02 | 0.03 | 0.02 | | | 0.08 | |
| 30 | | Bal* | | | | | | | | 5.2 | % Zr = 0.3 |
| 31 | | Bal* | | | | | | | | 15.0 | % Zr = 0.27 |
| 32 | | Bal* | | | | | | | | 30.0 | % Zr = 0.22 |
| 33 | | Bal* | | | | | | | | 9.3 | % Zr = 0.3 |
| 34 | | Bal* | | | | | | | | 18.6 | % Zr = 0.24 |
| 35 | | Bal* | | | | | | | | 24.0 | % Zr = 0.28 |
| 36** | | | | | | | | | | 5.0-30.2 | % Zr = 0.16-0.21 |
| 37 | | 4.5 | | 0.002 | <0.001 | <0.001 | 0.009 | | | 0.036 | % Sc = 0.66; % Zr = 0.37; % Pb < 0.001 |
| 38 | | 4.4 | | 0.002 | <0.001 | <0.001 | 0.009 | | | 0.036 | % Sc = 0.6; % Zr = 0.37; % Pb < 0.001 |
| 39 | | | | 9.4 | Bal* | | | | | | % B = 1.8 |
| 40 | | | | 9.2 | Bal* | | | | | | % B = 1.4 |
| 41 | | | | 9.4 | Bal* | | | | | | % B = 1.2 |
| 42** | | | | 8.8-9.2 | Bal* | | | | | | % B ≤ 2.0 |
| 43 | | | | | | Bal* | | | | | % Ag = 3.5 |
| 44 | | | | | | Bal* | | | | | % Cu = 0.7 |
| 45 | | | | | | Bal* | | | | | % Ag = 3.8; % Cu = 0.7 |
| 46 | | | | | | Bal* | | | | | % Cu = 0.8 |
| 47 | | | | | | Bal* | | | | | % Ag = 2.9 |
| 48 | | | | | | Bal* | 0.3 | | | | |
| 49 | | | | | | Bal* | 0.1 | | | | |
| 50 | | | | | | Bal* | 0.2 | | | | |
| 51 | | | | | | Bal* | 0.4 | | | | |
| 52 | | | | 19.6 | Bal* | | | | | | |
| 53** | 0.05 | 0.20-0.8 | | | | 4.5-5.5 | | | | 0.25 | % Ag = 0.15-0.60 |
| 54** | | 0.7-0.11 | | | | 4.8-5.4 | | | | 0.25 | % Ag = 0.40-0.7; % Zr = 0.08-0.15 |
| 55 | | | | | | 0.02 | | | | 0.09 | % Li = 0.07 |
| 56 | | | | | | 0.03 | | | | 0.1 | % K = 88 ppm |
| 57 | | | | 0.46 ppm | 0.03 | 0.02 | 0.02 | | | 0.09 | |
| 58 | | | | | 0.06 | 0.02 | 0.02 | | | 0.09 | |
| 59** | | ≤9.8 | | | | ≤2.2 | | | | ≤0.15 | % SC ≤ 3.9 |
| 60 | | | | | | | 8.20 | 0.16 | | | % Zr = 3.85 |
| 61 | | | | | | | | | | | % Zr = 1.3 |
| 62 | | | | | | | 8.6 | 0.14 | | | % Zr = 3.21 |

TABLE 3-continued

Compositions (weight %).

| # | | | | | | | | | |
|---|---|---|---|---|---|---|---|---|---|
| 63 | | | | | | | | | % Zr = 1.2 |
| 64 | | | | | | | | | % Zr = 1.2 |
| 65** | | | | | | | | | % Zr ≤ 3.9 |
| 65** | | <0.9 | | <1.4 | | | | | % Li = Bal* |
| 67** | | <1.2 | | <1.6 | | | | | % Ge = Bal* |
| 68 | | | | 0.02 | | | | 0.08 | % Li = 0.009 |
| 69 | | 0.05 | 0.16 | 0.2 | | | | 0.5 | % Li = 0.06; % Zr = 0.09 |
| 30 | | 0.03 | 0.08 | 0.1 | | | | 0.09 | % Li = 0.07; % Zr = 0.08 |
| 71 | 0.55 | | 4.82 | | | | | | |
| 72 | 2.21 | | 10.46 | 0.14 | 0.11 | 0.01 | 0.09 | | % Ta = 0.28; % Hf = 0.16 |
| 73** | | | 27.0-30.0 | <0.5 | | | <0.25 | | % B <0.01 |
| 74 | | | 29.4 | 0.4 | | | 0.11 | | % B = 0.03 |
| 75 | | | 28.2 | 0.3 | | | 0.09 | | % B = 0.006 |
| 76 | | | | | | | | | % Li = Bal* |
| 77 | | | | | | | | | % Li = Bal* |
| 78** | | | | | | | | | % Li = Bal* |
| 79 | | | | | | 0.02 | 0.03 | | % Li = Bal* |
| 80 | | | | 0.8 | | | 0.03 | | % Li = Bal* |
| 81 | | | | 0.33 | | | 0.05 | | % Li = Bal* |
| 82 | | | | | 9.5 | | | | % Pd = 15.5; % Au = Bal* |
| 83 | | | | | 8.5 | | | | % Pd = 15.1; % Au = Bal* |
| 84 | | | | | | 6.0 | 0.02 | | % In = 3.0; % Ag = Bal* |
| 85 | | | | | 5.0 | 25.0 | | 1.0 | % Ag = Bal* |
| 86 | | | 3.7 | | | | | | % Ag = Bal* |
| 87 | | 0.3 | | Bal* | | | 0.06 | <0.1 | |

*Trace elements below 0.9% by weight in total.
**10 compositions were checked within the especified range.

The invention claimed is:

1. A method for producing metal based alloy powders by means of centrifugal atomization in a closed chamber comprising the steps of:
   a) providing a composition comprising at least one metal,
   b) melting the composition, and
   c) atomizing the molten composition by means of centrifugal atomization with an atomizing disk;
   wherein the atmosphere in the dosed atomization chamber is pressurized and/or cooled; and wherein the contact angle between the molten composition and the atomizing disk is above 96° and smaller than 168°, measured using the sessile drop method.

2. The method according to claim 1, wherein the molten composition is over-heated at a temperature of at least 52° C. above Tm and below 396° C.+Tm, Tm being the melting temperature of the composition to be atomized in degree Celsius (° C.).

3. The method according to claim 1, wherein the atomizing disk is ceramic and is supported by a metallic cage structure.

4. The method according to claim 1, wherein the atomization chamber comprises at least one bearing with an angular contact of 15.5° or more and 34° or less.

5. The method according to claim 1, wherein the atomization chamber comprises at least one bearing comprising at least one ring, wherein the hardness of the ring is 54 HRc or more after being exposed at 85° C. or more during 35 minutes or more.

6. The method according to claim 1, wherein the surface tension between the molten composition and the atomizing disk surface is above 780 mN/m and below 1750 mN/m measured using the sessile drop method.

7. The method according to claim 1, wherein the atomization chamber comprises an oxygen trap and the oxygen content is maintained below 280 ppm by volume before the atomization starts.

8. The method according to claim 1, wherein the composition provided in step a) is selected from an iron-based alloy, an aluminum-based alloy, a nickel-based alloy, a copper-based alloy, a cobalt-based alloy, a magnesium-based alloy, a silver-based alloy, a germanium-based alloy, a gold-based alloy and/or a lithium-based alloy.

9. The method according to claim 1, wherein vacuum is applied in the chamber once the metal has been molten and previous to atomization.

10. The method according to claim 1, wherein the melting chamber comprises at least one oxygen trap.

11. The method according to claim 1, wherein a cooling gas is introduced in the atomization chamber during the atomization process.

12. A method for producing, metal-based alloy powders by means of centrifugal atomization in a closed chamber comprising the steps of:
   a) providing a composition comprising at least one metal,
   b) melting the composition, and
   c) atomizing the molten composition by means of centrifugal atomization with an atomizing disk;
   wherein the atmosphere in the closed atomization chamber is pressurized and/or cooled, and wherein the atmosphere in the chamber is modified by introducing a gas and/or a liquid, trapping the oxygen, changing the temperature and/or changing the pressure, so that there is an increase of surface tension between the molten composition and the atomizing disk which is at least 55 mN/m with respect to the surface tension in air.

13. The method according to claim 12, wherein the molten composition is over-heated at a temperature of at least 52° C. above m and below 396° C. +Tm, Tm being the melting temperature of the composition to be atomized in degree Celsius (° C.).

14. The method according to claim 12, wherein the atomizing disk is ceramic and is supported by a metallic cage structure.

15. The method according to claim 12, wherein the atomization chamber comprises at least one bearing with an angular contact of 15.5° or more and 34° or less.

16. The method according to claim 12, wherein the atomization chamber comprises at least one hearing comprising at least one ring, wherein the hardness of the ring is 54 HRc or more after being exposed at 85° C. or more during 35 minutes or more.

17. The method according to claim 12, wherein the surface tension between the molten composition and the atomizing disk surface is above 780 mN/m and below 1750 mN/m measured using the sessile drop method.

18. The method according to claim 12, wherein the atomization chamber comprises an oxygen trap and the oxygen content is maintained below 280 ppm by volume before the atomization starts.

19. The method according to claim 12, wherein the composition provided in step a) is selected from an iron-based alloy, an aluminum-based alloy, a nickel-based alloy, a copper-based alloy, a cobalt-based alloy, a magnesium-based alloy, a silver-based alloy, a germanium-based alloy, a gold-based alloy and/or a lithium-based alloy.

20. The method according to claim 12, wherein a cooling gas is introduced in the atomization chamber during the atomization process.

* * * * *